(12) United States Patent
Shinoda et al.

(10) Patent No.: US 11,535,941 B2
(45) Date of Patent: Dec. 27, 2022

(54) STRUCTURE, LAMINATED BODY THEREOF, AND MANUFACTURING METHOD AND MANUFACTURING DEVICE THEREOF

(71) Applicant: NATIONAL INSTITUTE OF ADVANCED INDUSTRIAL SCIENCE AND TECHNOLOGY, Tokyo (JP)

(72) Inventors: Kentaro Shinoda, Tsukuba (JP); Takanori Saeki, Tsukuba (JP); Masakazu Mori, Tsukuba (JP); Jun Akedo, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 16/751,941

(22) Filed: Jan. 24, 2020

(65) Prior Publication Data
US 2020/0157690 A1    May 21, 2020

Related U.S. Application Data

(63) Continuation of application No. PCT/JP2018/027780, filed on Jul. 24, 2018.

(30) Foreign Application Priority Data

Jul. 26, 2017  (JP) .............................. JP2017-144933
Jul. 26, 2017  (JP) .............................. JP2017-144934
(Continued)

(51) Int. Cl.
*C23C 24/04*    (2006.01)
*C23C 4/01*     (2016.01)
(Continued)

(52) U.S. Cl.
CPC ............... *C23C 24/04* (2013.01); *B23B 9/00* (2013.01); *B32B 5/18* (2013.01); *B32B 9/00* (2013.01);
(Continued)

(58) Field of Classification Search
CPC ........... C23C 24/04; C23C 4/01; C23C 4/134; B32B 9/00; B32B 5/18; B23B 9/00;
(Continued)

(56) References Cited

U.S. PATENT DOCUMENTS 6,280,802 B1    8/2001  Akedo et al.
2012/0240538 A1*  9/2012  Isoda ................. B01D 39/2072
                                                      55/486
(Continued)

FOREIGN PATENT DOCUMENTS

EP    2502662 A1 *  9/2012  .......... B01D 39/2072
EP    2832416 A1 *  2/2015  .......... B01D 46/2451
(Continued)

OTHER PUBLICATIONS

Anunmana et al, Residual stress in glass: indentation crack and fractography approaches, Dent Mater. Nov. 2009 ; 25(11):1453-1458, (Year: 2009).*

(Continued)

*Primary Examiner* — Nathan L Van Sell
(74) *Attorney, Agent, or Firm* — Hauptman Ham, LLP

(57) ABSTRACT

A problem to be solved by the present invention is that there is no method for forming a dense structure on a porous structure at low cost. In addition, another object is to provide a high quality and inexpensive structure of a brittle material and a laminate thereof as an intermediate layer for facilitating formation of a dense structure on a porous structure. A structure is provided having a brittle particle assembly having a plurality of brittle particles, wherein the brittle
(Continued)

particle assemblies are arranged adjacently to each other, and the brittle particles having a brittle material region in the periphery are crosslinked (connected) by the brittle material region to bond the brittle particles to each other, and thereby form a brittle material crosslinked structure region preventing the mobility of the brittle particles.

18 Claims, 36 Drawing Sheets

(30) Foreign Application Priority Data

Nov. 1, 2017 (JP) .............................. JP2017-212171
Nov. 1, 2017 (JP) .............................. JP2017-212207

(51) Int. Cl.

| | |
|---|---|
| C23C 4/134 | (2016.01) |
| C08K 3/28 | (2006.01) |
| C08K 3/40 | (2006.01) |
| C08K 3/14 | (2006.01) |
| C08K 3/00 | (2018.01) |
| C08K 3/16 | (2006.01) |
| B32B 5/18 | (2006.01) |
| C04B 32/00 | (2006.01) |
| C08K 3/38 | (2006.01) |
| B23B 9/00 | (2006.01) |
| B32B 9/00 | (2006.01) |
| C08K 3/02 | (2006.01) |
| C08K 3/22 | (2006.01) |

(52) U.S. Cl.
CPC .............. *C04B 32/005* (2013.01); *C08K 3/00* (2013.01); *C08K 3/14* (2013.01); *C08K 3/16* (2013.01); *C08K 3/28* (2013.01); *C08K 3/38* (2013.01); *C08K 3/40* (2013.01); *C23C 4/01* (2016.01); *C23C 4/134* (2016.01); *C03C 2214/04* (2013.01); *C08K 2003/023* (2013.01); *C08K 2003/2227* (2013.01); *C08K 2003/2244* (2013.01); *Y10T 428/29* (2015.01); *Y10T 428/31504* (2015.04)

(58) Field of Classification Search
CPC ... C08K 3/28; C08K 3/40; C08K 3/14; C08K 3/00; C08K 3/16; C08K 3/38; C08K 2003/2244; C08K 2003/2227; C08K 2003/023; C04B 32/005; C03C 2214/04; Y10T 428/31504; Y10T 428/29
See application file for complete search history.

(56) References Cited

U.S. PATENT DOCUMENTS

| | | |
|---|---|---|
| 2012/0258253 A1 | 10/2012 | Helmick et al. |
| 2013/0105806 A1 | 5/2013 | Liu et al. |
| 2015/0068176 A1 | 3/2015 | Kasuga et al. |

FOREIGN PATENT DOCUMENTS

| | | | |
|---|---|---|---|
| JP | 2000-212766 A | | 8/2000 |
| JP | 2001-247979 A | | 9/2001 |
| JP | 3256741 B2 | * | 2/2002 |
| JP | 2002-194560 A | | 7/2002 |
| JP | 2004075523 A | * | 3/2004 |
| JP | 2004-107757 A | | 4/2004 |
| JP | 2008-88559 A | | 4/2006 |
| JP | 2008-291291 A | | 12/2008 |
| JP | 2012-97353 A | | 5/2012 |
| JP | 2012-219375 A | | 11/2012 |
| JP | 2014-95137 A | | 5/2014 |
| JP | 2015-505791 A | | 2/2015 |
| JP | 2015-175315 A | | 10/2015 |
| JP | 5946179 B2 | | 7/2016 |
| WO | WO-0127348 A1 | * | 4/2001 ............. C03C 17/23 |
| WO | WO-0234966 A1 | * | 5/2002 ............. C23C 24/04 |
| WO | WO-0236855 A1 | * | 5/2002 ............. C23C 24/04 |

OTHER PUBLICATIONS

Shahien et al., "Comparative Study of Ceramic Coatings Deposited by Fine Particle Spray Processes." Proceedings paper of CMCEE 2018, Jul. 2018.

Shahien et al., "Comparative Study of Ceramic Coatings Deposited by Fine Particle Spray Processes." Poster presented at CMCEE 2018, Jul. 2018.

International Search Report issued for corresponding International Patent Application No. PCT/JP2018/027780 dated Sep. 4, 2018, along with an English translation.

Written Opinion issued for corresponding International Patent Application No. PCT/JP2018/027780 dated Sep. 4, 2018, along with an English translation.

Herman, "Plasma-sprayed Coatings", Scientific American, Sep. 1988, vol. 259, No. 2, pp. 112-117, cited in the Specification.

Thornton, "High Rate Thick Film Growth", Ann. Rev. Mater. Sci. 1977, vol. 7, pp. 239-260, cited in the Specification.

Akedo, "Aerosol Deposition of Ceramic Thick Films at Room Temperature: Densification Mechanism of Ceramic Layers", J. Am. Ceram. Soc., vol. 89, No. 6, 2006, pp. 1834-1839, cited in the Specification.

Papyrin et al., Cold Spray Technology, ScienceDirect, 2006, Elsevier, cited in the Specification.

Drexler et al., "Jet Engine Coatings for Resisting Volcanic Ash Damage", Advanced Materials, vol. 23, 2011, pp. 2419-2424, cited in the Specification.

Batista et al., "Evaluation of laser-glazed plasma-sprayed thermal barrier coatings under high temperature exposure to molten salts", Surface & Coatings Technology 200 (2006), pp. 6783-6791, cited in the Specification.

Shinoda et al., "Development of Hybrid Aerosol Deposition Method and its Application to Delight Design." Journal of Japan Thermal Spray Society, 54(3), 2017, pp. 108-112, with a partial English machine translation.

Shinoda, "Development of basic technologies for advanced coatings and their application to coating engineering." Presentation slides presented at AIST Young Scientists' Meeting on Electronics and Manufacturing, Aug. 23, 2017, with a partial English machine translation.

Akedo et al., "Hybrid Coating Technologies." Ceramics Japan: Bulletin of the Ceramic Society of Japan, 52(10), 2017, pp. 687-691, with a partial English machine translation.

Shinoda et al., "Development of Hybrid Aerosol Deposition (HAD)." Bulletin of the Ceramic Society of Japan, 52(10), 2017, pp. 703-706, with a partial English machine translation.

Saeki et al., "Microstructure and insulation properties of ceramic coatings obtained by plasma-assisted aerosol deposition method." Presentation slides presented at The 54th Autumn Lecture Conference of the Japan Electronic Materials Technology Association, Nov. 2, 2017, and the conference program, with a partial English machine translation.

Shinoda, "Microstructural characterization of ceramic coatings obtained by hybrid aerosol deposition." Proceedings paper of The 106th National Lecture Conference of the Japan Thermal Spray Society, Nov. 21, 2017, and the conference program, with a partial English machine translation.

Shinoda, "Microstructure and characterization of ceramic coatings obtained by hybrid aerosol deposition." Presentation slides presented at The 106th National Conference of the Japan Thermal Spray Society, Nov. 22, 2017, with a partial English machine translation, with a partial English machine translation.

(56) References Cited

OTHER PUBLICATIONS

Matsuo et al., "Optical emission spectroscopy of mesoplasma for plasma-assisted aerosol deposition." Proceedings paper of The 34th International Japan-Korea Seminar on Ceramics, Nov. 22, 2017, and the conference program.
Matsuo et al., "Optical emission spectroscopy of mesoplasma for plasma-assisted aerosol deposition." Poster presented at The 34th International Japan-Korea Seminar on Ceramics, Nov. 23, 2017, and the conference program.
Kuroyanagi et al., "Experimental simulation of fracture and deformation of fine ceramic particles in Aerosol deposition by in situ compression test." Proceedings paper of The 34th International Japan-Korea Seminar on Ceramics, Nov. 22, 2017, and the conference program.
Kuroyanagi et al., "Study on room temperature deformation phenomenon in Aerosol deposition by compression of fine ceramic particles." Poster presented at The 34th International Japan-Korea Seminar on Ceramics, Nov. 2017, and the conference program.
Shinoda et al., "Microstructural Characterization of Ceramic Films Fabricated by Plasma-Assisted Aerosol Deposition Method." Proceedings paper of The 34th International Japan-Korea Seminar on Ceramics, Nov. 2017, and the conference program.
Shinoda et al., "Microstructural Characterization of Ceramic Films Fabricated by Plasma-Assisted Aerosol Deposition Method." Presentation slides of The 34th International Japan-Korea Seminar on Ceramics, Nov. 2017, and the conference program.
Akedo et al., "Fundamentals of fine ceramic coating and its application fields." Thermal Spray Technology, 37(3), 2018, pp. 93-97, with a partial English machine translation.
Serizawa et al., "Fundamentals of Phase Diagrams for Thermal Spray Engineers." Journal of Japan Thermal Spray Society, 55(1), 2018, pp. 9-13, with a partial English machine translation.
Shinoda, "Trends in Particle Spraying Process and Development of Aerosol Deposition Method." Presentation slides presented at the 3rd Annual Conference 2017 of Surface Modification Technology Study Committee, Feb. 6, 2018, with a partial English machine translation.
Shinoda, "Trends in Particle Spraying Process and Development of Aerosol Deposition Method." Digest of presentation slides presented at the 3rd Annual Conference 2017 of Surface Modification Technology Study Committee, Feb. 6, 2018, with a partial English machine translation.
Shinoda et al., "Aerosol-deposition method." In The Japan Welding Engineering Society (Ed.) Multidimensional Adaptive Manufacturing, 2018, pp. 125-142, with a partial English machine translation.
Shinoda, "Multidimensional Additive Manufacturing: Aerosol-Deposition Method." Brochure of 30th Anniversary Symposium of the Research Committee on Surface Modification Technology, Mar. 1, 2018, with a partial English machine translation.
Shinoda et al., "Hybrid aerosol deposition methods and ceramic coatings." Journal of Japan Welding Society, 87(2), 2018, pp. 44-51, with a partial English machine translation.
Shinoda, "Hybrid aerosol deposition: development of new ceramic coating process between thermal spray and aerosol deposition." Proceedings paper of University of Toronto MIE Distinguished Lecture Series, Mar. 2018.
Shinoda, "Hybrid Aerosol Deposition: Development of New Ceramic Coating Process Between Thermal Spray and Aerosol Deposition." Presentation slides presented at University of Toronto MIE Distinguished Lecture Series, Mar. 2018.
Kuroyanagi et al., "Experimental Simulation of Aerosol Deposition by In-Situ Compression Test of Ceramic Particles." Poster presented at The 137th Annual Conference of The Surface Finishing Society of Japan, Mar. 12, 2018, with a partial English machine translation.
Matsuo et al., "Spectral diagnosis of mesoplasmas for studying plasma support in aerosol deposition." Poster presented at The 137th Annual Conference of The Surface Finishing Society of Japan, Mar. 12, 2018.

Akedo et al., "Overview and Role of the Advanced Coating Technology Research Center." Thermal Spraying Technique, 37(4), 2018, pp. 79-86, with a partial English machine translation.
Shahien et al., "Direct Spraying of Fine Ceramic Particles in Thermal Spray." Proceedings paper of International Thermal Spray Conference 2018, May 2018.
Shahien et al., "Direct Spraying of Fine Ceramic Particles in Thermal Spray." Poster presented at of International Thermal Spray Conference 2018, May 2018.
Shinoda et al., "A New Deposition Mechanism of Ceramic Coatings by Fine Solid Particle Spray with the Assistance of Mesoplasma Flow." Proceedings paper of International Thermal Spray Conference 2018, May 2018.
Shinoda et al., "A New Deposition Mechanism of Ceramic Coatings by Fine Solid Particle Spray with the Assistance of Mesoplasma Flow." Presentation slides presented at International Thermal Spray Conference 2018, May 2018.
Shinoda, "Ceramic Coatings Fabricated by Fine Powder Spray via Mesoplasma Flow." Presentation slides presented at Plasma Workshop at AIST, May 14, 2018.
Kuroyanagi, "In-situ Compression Test of Ceramic Particles for the Elucidation of Room Temperature Impact Consolidation." Proceedings paper of The 107th National Lecture Conference of Japan Thermal Spray Society, Jun. 6, 2018, and the conference program, with a partial English machine translation.
Kuroyanagi, "In-situ Compression Test of Ceramic Particles for the Elucidation of Room Temperature Impact Solidification Phenomenon." Presentation slides presented at The 107th National Lecture Conference of Japan Thermal Spray Society, Jun. 6, 2018, and the conference program, with a partial English machine translation.
Shinoda et al., "Dense Ceramic Coatings Deposited by Aerosol Deposition for Multilayered Architecture Towards Thermal/Environmental Barrier Coatings." Proceedings Paper of Thermal Barrier Coatings V, Aug. 2018, and the conference program.
Shinoda et al., "Dense Ceramic Coatings Deposited by Aerosol Deposition for Multilayered Architecture Towards Thermal/Environmental Barrier Coatings." Poster presented at Thermal Barrier Coatings V, Aug. 2018, and the conference program.
Akedo et al., "Principles and Features of the Aerosol Deposition and Optical MOD Methods." Thermal Spraying Technique, 38(1), 2018, pp. 106-113, with a partial English machine translation.
Kuroyanagi, "Experimental simulation of fracture and deformation of fine ceramic particles by in situ compression test for aerosol deposition process." Poster presented at 6th International Indentation Workshop, Aug. 2018.
Shinoda et al., "Deposition Mechanism of Ceramic Coatings by Fine Solid Particle Spray with the Assistance of Mesoplasma Flow." Proceedings paper of CMCEE 2018, Jul. 2018.
Shinoda et al., "Deposition Mechanism of Ceramic Coatings by Fine Solid Particle Spray with the Assistance of Mesoplasma Flow." Presentation slides presented at CMCEE 2018, Jul. 2018.
Kuroyanagi et al. "Fracture and Deformation of Fine Ceramic Particles During in situ Compression Test for Aerosol Deposition Process." Proceedings paper of CMCEE 2018, Jul. 2018.
Kuroyanagi et al. "Fracture and Deformation of Fine Ceramic Particles During in situ Compression Test for Aerosol Deposition Process." Poster presented at CMCEE 2018, Jul. 2018.
Matsuo et al. "Optical emission spectroscopy of mesoplasma flow for plasma-assisted aerosol deposition." Proceedings paper of CMCEE 2018, Jul. 2018.
Matsuo et al. "Optical emission spectroscopy of mesoplasma flow for plasma-assisted aerosol deposition." Poster presented at CMCEE 2018, Jul. 2018.
Office Action issued for corresponding Korean Patent Application No. 10-2020-7005584 dated Jun. 8, 2021, along with an English machine translation.
Office Action dated Dec. 14, 2021, for corresponding Korean Patent Application No. 10-2020-7005584 along with an English translation.
Office Action dated Jun. 21, 2022, for corresponding Japanese Patent Application No. 2019-532653, along with an English machine translation.

(56) References Cited

OTHER PUBLICATIONS

Office Action dated Nov. 8, 2022 for corresponding Japanese Patent Application No. 2019-532653, along with an English machine translation (12 pages).

* cited by examiner

FIG. 6A
FIG. 6B
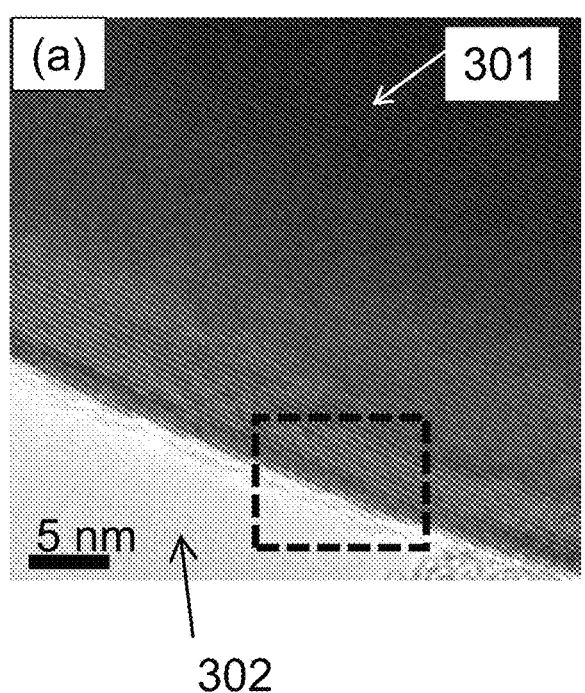
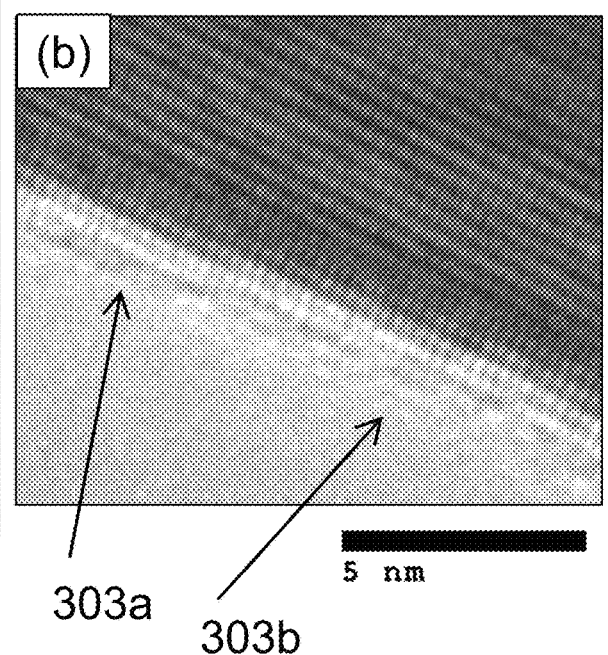

1101a  1101b 1201a  1201b

1010

1021

1030

After collision crushing deformation

Plasma exposure · surface activation

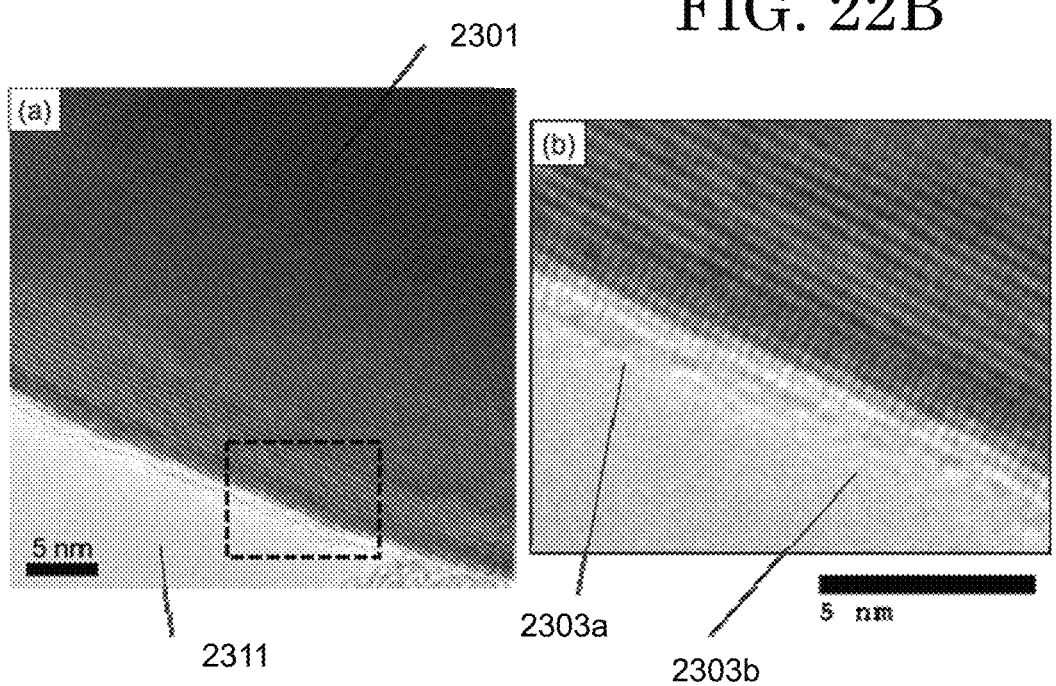

1605
1604

1600

1705
1704

1700

1800

1800

3100

Horizontal direction

STRUCTURE, LAMINATED BODY THEREOF, AND MANUFACTURING METHOD AND MANUFACTURING DEVICE THEREOF

CROSS REFERENCE TO RELATED APPLICATIONS

This application is based upon and claims the benefit of priority from the prior Japanese Patent Application No. 2017-144933, filed on Jul. 26, 2017, the prior Japanese Patent Application No. 2017-144934, filed on Jul. 26, 2017, the prior Japanese Patent Application No. 2017-212171, filed on Nov. 1, 2017, the prior Japanese Patent Application No. 2017-212207, filed on Nov. 1, 2017, and PCT Application No. PCT/JP2018/027780, filed on Jul. 24, 2018, the entire contents of which are incorporated herein by reference.

FIELD

One embodiment of the present invention relates to a brittle material structure including a brittle particle aggregate in which fine particles of a brittle material are aggregated, a laminated structure thereof and a manufacturing method thereof. In addition, one embodiment of the present invention relates to a structure for forming a structure by spraying aerosolized fine particles on a base material, and a method of manufacturing the same and a manufacturing device thereof.

BACKGROUND

Since structures of brittle materials such as ceramics, alloy particles and resins which are brittle, and laminates thereof and laminates made of brittle materials are generally high in hardness, excellent in wear resistance, heat resistance, and corrosion resistance, therefore, these are used in a wide range of fields such as general-purpose industrial devices such as optical components and industrial machines, information devices such as smartphones and personal computers and the electronic components which form them, automobiles, gas turbines for power generation and jet engines for aerospace, kitchen supplies and home appliances, energy-related members such as solar cells, fuel cells and lithium ion batteries, and medical members such as dentures and implants. However, structures of brittle materials and laminates thereof generally have brittle properties near room temperature, making it difficult to process using plastic deformation such as metals and plastics, and cutting work is also difficult due to high hardness. Therefore, when forming a structure of a brittle material and especially a laminate thereof, a raw material powder is generally molded and then sintered, or is melted using some form of thermal energy and is manufactured in a state where it is easy to flow, or is finely divided and is generally formed into a highly reactive state. For example, a sintering method or a zone melting method are known as a method for producing a brittle material structure, and methods for producing a laminate thereof are known such as gas phase methods such as sputtering, physical vapor deposition, and chemical vapor deposition, a melting method represented by a thermal spraying method, a chemical solution method, a printing method, and an aerosol deposition method.

A sintering and printing method is used for manufacturing a brittle material structure by generally molding powder particles of sub micrometer to micrometer levels as raw materials as they are used or in a paste form, heating and holding to a temperature below the melting point called the sintering temperature. During sintering, since it is necessary to heat and hold a member at a high temperature, the thermal effects on the surroundings are unavoidable, therefore there are certain limitations especially when manufacturing composite structures with different members such as metals and resins and when manufacturing a laminate on the different members.

Therefore, a thermal spraying method is known as a means for manufacturing a structure or a laminate of a brittle material which limits the thermal influence on these different kinds of members. In a thermal spraying method, a target brittle material is formed into powder particles of several micrometers to several tens of micrometers, and is injected into a thermal plasma or a high-speed combustion flame and sprayed on a target base material. The powder particles which are injected at this time are exposed to a high temperature and a high speed thermal plasma or combustion flame, melted by heating, accelerated, and collided with the base material. Particles which have been partially or completely melted by the heat source and become molten droplets, are flattened and rapidly cooled at the time of collision to become pancake-like particles called splats which have an aspect ratio which is collapsed in the direction of the collision and the basic unit of the lamination. Therefore, although the thermal spraying method is an excellent method for producing a thick film structure made of a brittle material, since it is a process which involves a phase transformation by melting and solidification, it is not possible to maintain the initial crystalline state of the raw material during melting and cracks occur during rapid solidification which makes it difficult to produce a dense structure (for example, H. Herman, Scientific American 259 [3] (1988) 112-117). Therefore, for example, the flying speed of the fine particles is increased higher than that of a conventional thermal spraying method, or the raw material fine particles are made finer than the raw material fine particles used in the conventional thermal spraying method and other methods as a device for increasing the density of a structure formed by a thermal spraying method.

On the other hand, there is known a technique called sputtering or a physical vapor deposition method in which a raw material is sublimated and turned into a vapor state to produce a laminate, or a chemical vapor deposition method in which a brittle material is formed while being synthesized by a chemical reaction. In these methods, the brittle material which is used as a raw material is sublimated into a gaseous phase in a high vacuum, and supersaturated particles are deposited on a base material to form a structure. Although it is advantageous for forming a dense film, it is difficult to form a thick structure because the formation speed is generally low. In addition, when laminated at a high speed, it is difficult to form a dense film, and a columnar crystal structure which reminds one of feathers and cauliflower is formed (for example, J. A. Thornton, Annual Review of Materials Science 7 (1977) 239-260).

On the other hand, an aerosol deposition method is known as a technique for spraying a brittle material in a solid state to form a structure of the brittle material and a laminate thereof. In this method, a brittle material as a raw material is sprayed as an aerosol in a vacuum as fine particles of 1 μm or less, and the structure of the brittle material and the laminate thereof are formed using a room temperature impact consolidation phenomenon which is observed when the particle size is smaller than about 1 μm. Although the aerosol deposition method is a very interesting technique, there are problems such as a difficulty to obtain a self-supporting structure because it utilizes the phenomenon that occurs with collision phenomenon, and dependency on the surface hardness and smoothness of the mating material, and slower formation rate compared to the thermal spraying method (for example, J. Akedo, Journal of the American Ceramic Society 89 [6] (2006) 1834-1839).

On the other hand, a technique called cold spray is known. Although this method is a lamination method in which particles are plastically deformed by energy at the time of collision and adheres, it is an excellent formation method for ductile materials which can be plastically deformed, but it is inherently difficult to apply to the brittle materials which are intended in the present invention (for example, A. Papyrin et al., Cold spray technology, Elsevier (2006)).

On the other hand, in the application region of the brittle material described at the start, the demand for a structure of a brittle material such as a ceramic material and a laminate thereof have been increasing along with the sophistication of the application. For example, in a turbine member for use in aircraft jet engines, the problem whereby a porous thermal barrier coating is damaged by a glassy deposit called CMAS included in volcanic ash, dust and the like is becoming more serious and the brittle material structure that prevents such penetration is required (for example, J. M. Drexler et al., Advanced Materials 23 (2011) 2419-2424).

In addition, in energy-related members such as battery materials, a brittle material structure which also acts as a permeation prevention layer is required as a solid electrolyte for a porous electrode material which needs to transmit gas and fuel. In addition, in medical members, there is also a need for a ceramic structure which is a brittle material for obtaining a smooth surface with respect to a porous material such as artificial bone. In addition, in an electrically insulating material, a ceramic structure which is a brittle material for securing an insulation property on an electrode material is also required.

In addition, in recent years, there has been a technique called an additive manufacturing technique or a three-dimensional printing technique which has attracted attention. This technique is a technique for manufacturing a three-dimensional structure by decomposing a complicated three-dimensional structure into a layer structure and stacking the two-dimensional laminate. In this technique, since the layers are superimposed, a problem whereby surface roughness due to a step between the layers occurs in principle. Although post-processing is relatively easy in the case of a resin and a metal, post-processing is difficult in three-dimensional modeling of ceramics because of high hardness.

To summarize these common issues, it is necessary to solve the problem of forming a dense structure made of brittle material for preventing penetration of permeable components and electrical insulation on a porous structure intended for permeation of a fluid such as gas and thermal shock resistance. However, in reality, it is difficult to form a dense structure on a porous structure at low cost and by the means described above.

For example, in the thermal spraying method, it is possible to form a thick film structure made of a brittle material on a porous structure. However, cracks occurring due to rapid solidification are usually included in the thick film structure, and a dense structure cannot be obtained. In order to solve this problem, there is a method of glazing a deposited thermal sprayed film using a laser (for example, C. Batista et al., Surface and Coatings Technology 200 [24] (2006) 6783-6791). However, since laser glazing essentially involves phase transformation, cracks occur due to shrinkage during rapid solidification and cooling, and although a highly dense structure can be obtained locally, as a whole, a sealing function cannot be sufficiently exhibited.

The aerosol deposition method is for obtaining a dense structure with no thermal history by converting fine particles into an aerosol, injecting aerosol from a nozzle at high speed at normal temperature and reduced pressure to a base material, and colliding the kinetic energy of the fine particles with each other or between the fine particles and the base material. In the aerosol deposition method, since a brittle material can be deposited without phase transformation, a dense brittle material structure can be manufactured. However, when it is laminated on a porous structure, there is a problem whereby the pores become drifts and the powder accumulates which forms a compact at the pores. Therefore, it is difficult to laminate a dense brittle material structure on a porous structure using the aerosol deposition method.

On the other hand, the structure formed by the conventional aerosol deposition method has a joining region between fine particles that is uniform and that does not include an amorphous phase or the like. The structure formed by the conventional aerosol deposition method has a high adhesion between the fine particles and the base material due to a structure called the anchor layer, which is formed by the fine particles penetrating into the base material when the fine particles collide with the base material. A method of activating particles by irradiating ultrafine particles or a base material with a high-energy beam has been proposed in a deposition method represented by the aerosol deposition method in which an ultrafine particle material is accelerated, collides with a base material, and is deposited.

In the Japanese Laid Open Patent Application No. 2001-247979, ultrafine particles and the base material are irradiated with an ion beam, atom beam and molecular beam, or high-energy beam which is a high-energy atom and molecule such as a low-temperature plasma without melting or decomposing the ultrafine particles to activate the ultrafine particles by removing the contaminant layer and oxide layer or amorphizing, thereby realizing a strong bond between the ultrafine particles and the base material or the ultrafine particles at a low temperature even if the collision occurs at a low speed. A method for forming a thin film having dense and excellent physical properties and good adhesion to a base material while maintaining the crystallinity of fine particles is disclosed.

Japanese Laid Open Patent Application No. 2000-212766 discloses a method of irradiating a high energy beam before ultrafine particles reach a base material. In particular, it is effective to set the irradiation energy to 1 kW or less.

In the Japanese Laid Open Patent Application No. 2008-88559, a method for forming a structure on a base material surface has been proposed in which energy irradiation is performed in order to remove impurities on the surface of fine particles of a brittle material under a reduced pressure atmosphere, fine particles from which the impurities have been removed are aerosolized, collided, and crushed and deformed.

There is no specific description regarding the structure in any one of the Japanese Laid Open Patent Application No. 2001-247979, Japanese Laid Open Patent Application No. 2000-212766 and Japanese Laid Open Patent Application No. 2008-88559, and it is clear that the inventions are not intended for a specific structure. In addition, since the target material is also a base material and a target like plate shaped mating material is also intended, it is clear that that the laminated structure is intended to be laminated and the target of a flat material, and that formation of a dense structure on a porous structure is not intended.

From the above, it is generally difficult to stack a dense structure on a porous structure. In addition, any method which essentially tries to obtain a dense structure while maintaining the crystallinity of the raw material particles, a practical mechanical strength, uniformity and formation of a large-area thick layer could not be achieved at the same time while supporting a practical film-formation rate and usage efficiency of a raw powder.

SUMMARY

In addition, one problem to be solved by the present invention is that there is no method for forming a dense structure on a porous structure at low cost. In addition, another object of the present invention is to provide a high quality and inexpensive structure of a brittle material and a laminate thereof as an intermediate layer for facilitating formation of a dense structure on a porous structure.

On the other hand, in a conventional thermal spraying method or the thermal spraying method in which the above-described artifices are used, the formed brittle material structure includes many pores and gaps due to poor gas-liquid displacement in the interface or the like where the fine particles are bonded by rapid melting and condensation, because all of the fine particles are melted and the material flow due to heat is utilized. In addition, cracks occur in the structure during rapid melting and condensing and it is difficult to form a homogeneous and dense structure. In addition, the structure formed by the conventional thermal spraying method has a layered structure with the particles having a pancake-like shape called a splat with an aspect ratio collapsed in the collision direction due to brittle fine particles in the molten droplet state flattening and quenching at the time of collision, and it is difficult to form a structure having an isotropic structure. In addition, when the raw material fine particles are re-solidified in the conventional thermal spraying method, for example, a structure is formed of $Al_2O_3$ fine particles comprised of only the α phase as a starting material, but the structure is transformed into $Al_2O_3$ containing the γ phase, and the crystal structure of the raw material fine particles is accompanied by a crystal phase transformation so that the crystal structure derived from the raw material fine particles cannot be maintained, and the functionality derived from the raw material fine particles from which the structure should have been obtained is reduced.

In the conventional aerosol deposition method, since the material flow due to the collision pressure, which occurs when the fine particles collide with each other or with the base material, is utilized, the crystal structure of the raw material particles is maintained, and a dense structure is formed. As a result, the active area of the surface of the fine particles formed by collision crushing which contributes to the joining between the fine particles and between the fine particles and the base material is small, and as a result, the utilization efficiency of the raw material fine particles is low, and the speed at which the structure is formed is not as high as the thermal spray method, and thus the conventional aerosol deposition method was not practical for use in large structures and the like.

Furthermore, there are restrictions on the shape of the base material and the material of the base material that can be used for the structure which is a problem common to the conventional thermal spraying method and the conventional aerosol deposition method described above. For example, the thermoplastic resin base material has a large thermal damage by the conventional thermal spraying method, while the aerosol deposition method has a small collision pressure required to form a joining region, and it is difficult to obtain a structure in each case. Even if a structure is obtained, in order to guarantee the adhesion of the joining area between the base material and the fine particles, the surface of the base material is made uneven in the conventional spraying method, or the surface of the base material is smoothed in the conventional aerosol deposition method. In addition, a pretreatment step for the base material is required, for example, to provide an underlayer made of a material different from the raw material fine particles. As described above, in the conventional method, it is generally difficult to form a structure which maintains the characteristics of the raw material fine particles regardless of the material and shape of the base material.

Therefore, another object of the present invention is to maintain the characteristic function of the fine particles as the raw material without causing heat and physical damage to the fine particles and the base material which form the structure, and to form a structure having excellent mechanical and electrical properties and a crystal structure with good coverage and adhesion. Another object of the present invention is to provide a firm forming method to maintain the characteristic function of the fine particles as a raw material without causing heat and physical damage to the fine particles and the base material forming the structure, and to achieve excellent mechanical and electrical properties and a crystal structure having good coverage and adhesion. Another object of the present invention is to provide a film forming device to maintain the characteristic function of the fine particles as a raw material without causing heat and physical damage to the fine particles and the base material forming the structure, and to achieve excellent mechanical and electrical properties and a crystal structure having good coverage and adhesion.

[Brittle Material Crosslinked Structure Region]

In the present, invention, in order to provide a high-quality and inexpensive brittle material structure and a laminate thereof, by forming a structure linking brittle material particles as a main phase with a brittle material region named as a brittle material crosslinked structure region with free energy higher or the same as that of the brittle material particles as the main phase, is formed, and a brittle material structure as an intermediate between a porous structure and a dense structure can be produced. More specifically, a structure is provided including a brittle material particle aggregate having a plurality of brittle material particles. The brittle material particles are arranged adjacent to each other, and brittle material particles which include a brittle material region around the brittle material particle are crosslinked (connected) by the brittle material regions, thereby the brittle material particles can be bonded to each other, and movement of the brittle material particles can be prevented so that a stable structure can be formed. It is possible to easily obtain a crosslinked structure while maintaining brittle material regions in a higher free energy than that of the brittle material particles. After this bonding, the bonding state is quenched and preserved, so that the free energy of the brittle material crosslinked structure region is higher or equal to the free energy of the brittle material particles. An example of such a state is amorphous. It has been found that the problem described above can be solved by using the structure according to one embodiment of the present invention. FIG. 1 and FIG. 2 are schematic views at the time when the brittle material particle aggregate according to one embodiment of the present invention is viewed in a cross section. Refer to FIG. 1. A plurality of brittle material particles 102 and a brittle material crosslinked structure region 101 existing on the surface of the brittle material particle 102 are present, and adjacent brittle material particles 102 are crosslinked (connected) via the brittle material crosslinked structure region 101. A gap 103 may also exist between brittle material particles 102.

In one embodiment of the present invention, the brittle material crosslinked structure region may have a three-dimensional network structure between the brittle particles.

In one embodiment of the present invention, the brittle material crosslinked structure region may be mainly amorphous.

In one embodiment of the present invention, the brittle material crosslinked structure region may be substantially uniform on the brittle particle surface.

In one embodiment of the present invention, the brittle material crosslinked structure region may be arranged with a gap.

In one embodiment of the present invention, a thickness of the brittle material crosslinked structure region may be 100 nm or less In one embodiment of the present invention, the brittle material crosslinked structure region may be formed from the same element as the constituent element of the brittle particle.

In one embodiment of the present invention, the size of the brittle particles may be less than 5 μm.

In one embodiment of the present invention, the hardness of the structure may be 0.1 or more and less than 1 with respect to the hardness of the brittle particles.

A laminated structure is provided having the structure according to one embodiment of the present invention arranged on a base material.

In one embodiment of the present invention, the brittle particles may have a flat shape perpendicular to the base material.

In one embodiment of the present invention, the base material may be a porous body.

In one embodiment of the present invention, the fine particles may have a crystallite size after deformation of 1 nm or more and 300 nm or less.

In one embodiment of the present invention, the structure has the following relationship 0.02<internal compressive stress/Vickers hardness<0.5.

In one embodiment of the present invention, the value of the short side/long side of the fine particles may become a value of the brittle particles in the vicinity of the base material>a value of the fine particles in the surface vicinity of the laminated structure.

In one embodiment of the present invention, the laminated structure may have a withstand voltage of 20 kV/mm or more in either DC or AC measurement.

In one embodiment of the present invention, a manufacturing method of a laminated structure is provided including crushing agglomerated particles in which primary particles in brittle particles of a raw material are agglomerated into primary particles, activating a surface of the primary particles to generate an active region, ejecting the primary particles arranged with a plurality of the active regions to the base material, and joining the primary particles arranged with the plurality of active regions via the active region.

In one embodiment of the present invention, in the method of manufacturing a laminated structure, an active region is formed on the primary particle surface by a collision crushing effect of the primary particles and a thermal effect of a plasma.

In one embodiment of the present invention, a manufacturing device of a structure is provided having an aerosol generator, a crusher, a plasma generator and a nozzle connected to the plasma generator, wherein the crusher is arranged at a front stage of the plasma generator, and the crusher crushes agglomerated particles sent from the aerosol generator in which primary particles are agglomerated, and the crusher sends the primary particles to the plasma generator.

BRIEF DESCRIPTION OF DRAWINGS

FIG. 4A is an annular dark field image by a scanning transmission electron microscope;

FIG. 6A is a scanning electron microscope image of a cross section of a raw material alumina powder;

FIG. 6B is an enlarged image of a region indicated by a dotted line in FIG. 6A;

FIG. 22A shows a surface observation image using raw material fine particles according to one example of the present invention;

FIG. 22B shows a surface observation image using raw material fine particles according to one example of the present invention;

Figure 1:
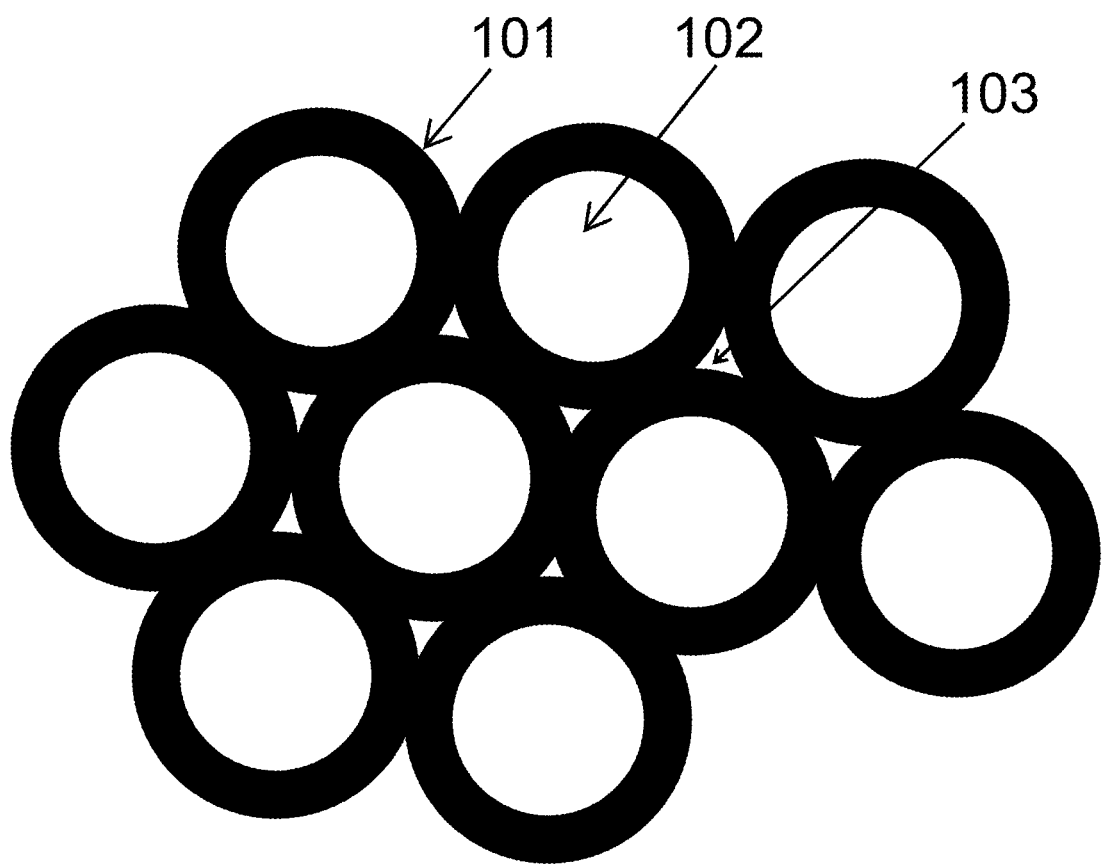
FIG. 1 is a schematic view of a brittle fine particle aggregate according to one embodiment of the present invention.

REFERENCE SIGNS LIST plasma-assisted ultrafine particle structure forming device, 101 brittle material crosslinked structure region, 102 brittle material particle, 103 gap, 104 crosslinked structure, 105 brittle material particle, 106 brittle material particle, 107 brittle material crosslinked structure region having an amorphous structure, 111 film forming chamber, 112 nozzle, 113 coil, 114 vacuum pipe, 115 vacuum pump, 116 aerosol generator, 117 conveying pipe, 118 pressure gauge, 119 base material, 120 brittle material particle, 121 surface-activated ultrafine particle, 122 brittle material structure, 201 brittle material particle, 202 three-dimensional network, 301 alumina particle, 302 space, 303a outermost surface of particle, 303b outermost surface of particle, 1001 brittle material structure, 1002 base material, 1010 single crystal fine particle, 1013 active region, 1021 fine particle, 1021a fine particle, 1021b fine particle, 1022 crystallite, 1023 active region, 1030 agglomerate powder, 1031 raw material fine particle, 1031 polycrystalline fine particle, 1032 crystallite, 1033 active region, 1040 fine particle, 1041 raw material fine particle, 1044 active region formed by collision crushing, 1045 inactive region, 1050 fine particle, 1053 active region, 1054 active region formed by collision crushing, 1080 plasma, 1100 structure, 1101 fine particle, 1101a fine particles, 1101b fine particle, 1102 crystallite, 1103 active region, 1104 base material, 1200 structure, 1201 fine particle, 1201a fine particle, 1201b fine particle, 1202 crystallite, 1203 active region, 1204 base material, 1205 coating part, 1206 crystallite, 1211 surface layer, 1212 surface layer of fine particle, 1300 structure, 1301 fine particle, 1302 crystallite, 1303 active region, 1304 base material, 1307 gap, 1501 raw material particle, 1600 structure, 1604 base material, 1605 coating layer, 1700 structure, 1704 base material, 1705 coating layer, 1800 structure, 1804 base material, 1805 coating layer, 1905a coating layer part, 1905b coating part, 1921a cellophane tape, 1921b polyimide tape, 2000 structural body manufacturing device, 2101 plasma generation gas cylinder, 2102 gas conveying pipe, 2103 aerosol generator, 2104 aerosol conveying pipe, 2105 crushing device, 2106 aerosol conveying pipe, 2107 structure manufacture part, 2108 plasma generator power supply, 2109 plasma generator, 2110 nozzle, 2111 base material, 2112 stage, 2113 vacuum pump, 2301 raw material fine particle, 2302 fine particle, 2303 active region, 2305 coating layer, 2307 structure, 3004 base material, 3005 coating part, 3014 base material, 3105 coating part, 3100 inclined structure, 3104 base material, 3105 coating part, 3113 surface layer vicinity, 3114 base material interface vicinity, 3121 fine particle, 3122 crystallite, 3123 active region

EMBODIMENTS

A structure, a laminate thereof, a manufacturing method thereof and a manufacturing device according to the present invention are explained below with reference to the drawings. Furthermore, the structure, the laminate, the manufacturing method thereof, and the manufacturing device of the present invention should not be interpreted as being limited to the description of the following embodiments and examples. Furthermore, in the drawings referred to in this embodiment and examples described later, the same parts or parts having similar functions are denoted by the same reference numerals, and an explanation thereof will not be repeated.

The present inventors have proposed that if an intermediate structure that connects a dense structure and a porous structure can be manufactured cheaply, then a dense structure can be formed on the porous structure via the intermediate structure. In addition, if it becomes possible to laminate a dense structure on a porous structure, the range of applications of brittle materials such as ceramics and alloy materials can be greatly expanded, which should contribute to the development of industry. Therefore, if the steps of a ceramic structure film capable of being smoothed can be provided on a surface, it can greatly contribute to the realization of a three-dimensional modeling technology of ceramics.

[Brittle Material Crosslinked Structure Region]

Figure 2:
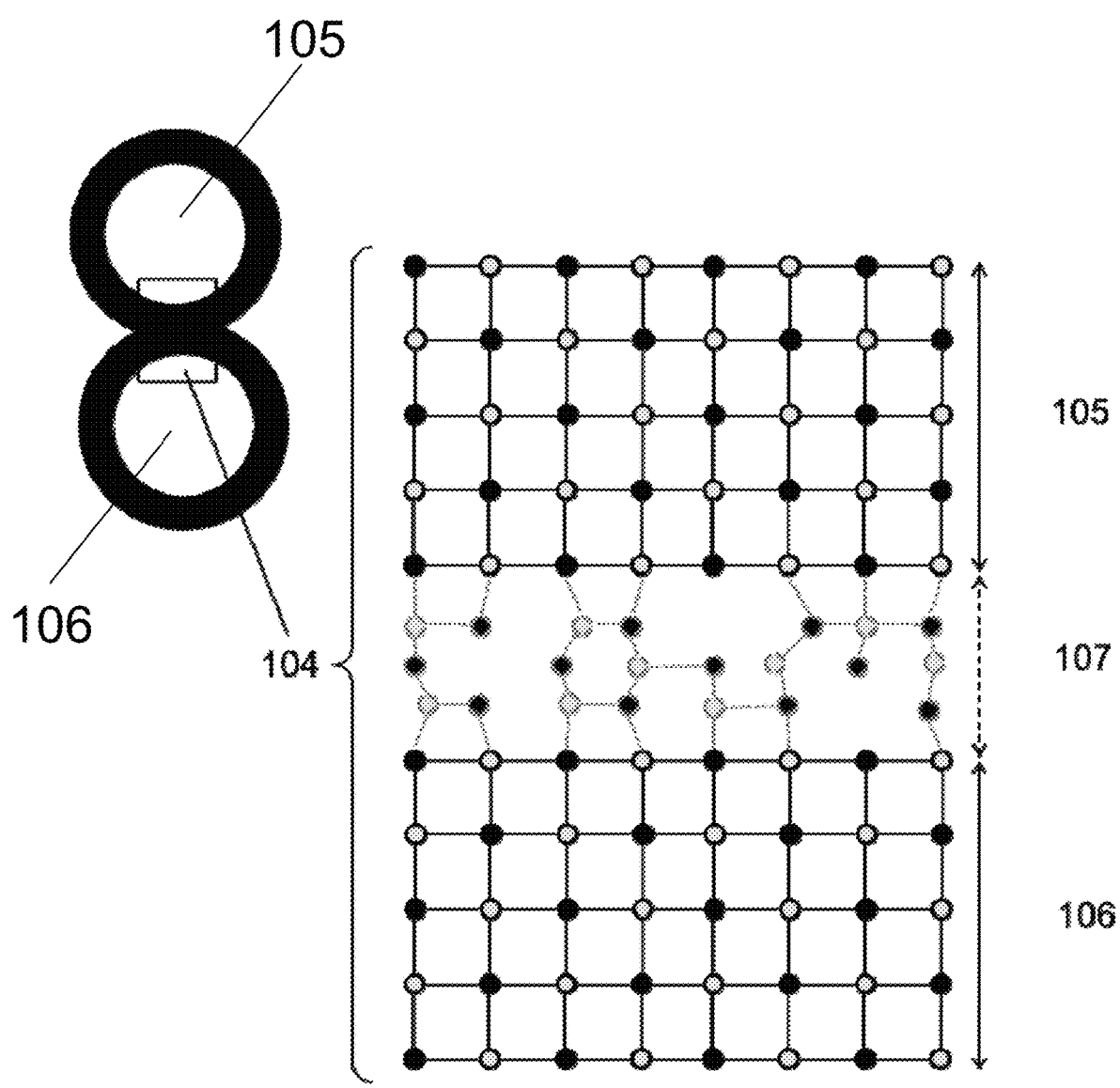
FIG. 2 is a schematic view of a brittle fine particle aggregate according to one embodiment of the present invention.

In the present invention, in order to provide a high-quality and inexpensive brittle material structure and a laminate thereof, by forming a structure linking brittle material particles as a main phase with a brittle material region named as a brittle material crosslinked structure region with free energy higher or the same as that of the brittle material particles as the main phase, is formed, and a brittle material structure as an intermediate between a porous structure and a dense structure can be produced. More specifically, a structure is provided including a brittle material particle aggregate having a plurality of brittle material particles. The brittle material particle aggregates are arranged adjacent to each other, and brittle material particles which include a brittle material region around the brittle material particle are crosslinked (connected) by the brittle material regions, thereby the brittle material particles can be bonded to each other, and movement of the brittle material particles can be prevented so that a stable structure can be formed. It is possible to easily obtain a crosslinked structure while maintaining brittle material regions in a higher free energy than that of the brittle material particles. After this bonding, the bonding state is quenched and preserved, so that the free energy of the brittle material crosslinked structure region is higher or equal to the free energy of the brittle material particles. An example of such a state is amorphous. It has been found that the problem described above can be solved by using the structure according to one embodiment of the present invention. FIG. 1 and FIG. 2 are schematic views at the time when the brittle material particle aggregate according to one embodiment of the present invention is viewed in a cross section. Refer to FIG. 1. A plurality of brittle material particles 102 and a brittle material crosslinked structure region 101 existing on the surface of the brittle material particle 102 are present, and adjacent brittle material particles 102 are crosslinked (connected) via the brittle material crosslinked structure region 101. A gap 103 may also exist between brittle material particles 102.

FIG. 2 is an enlarged view of the same part as the crosslinked structure 104 part. Refer to FIG. 2. A brittle material particle 105, a brittle material particle 106, and a brittle material crosslinked structure region 107 which is a region including an amorphous structure are present, and it is schematically shown that the brittle material particle 105 and the brittle material particle 106 are crosslinked (connected) by the brittle material crosslinked structure region 107 which is a region having an amorphous structure. FIG. 1 and FIG. 2 represent a two-dimensional view of a three-dimensional cross-linked state, and actually brittle material particles further exist in a FIG. 1 deeper side and FIG. 2 deeper side, and brittle material cross-linked structure regions form a three-dimensional network structure. Furthermore, in the drawing, although it appears that the brittle material crosslinked structure region exists in the whole periphery of a brittle material particle, the embodiment is not necessarily limited to such a structure, and the brittle material crosslinked structure may also exist on at least a part of the periphery of the brittle material. It is preferred that the brittle material crosslinked structure region is exists in the whole periphery of the brittle material. Furthermore, although amorphous means that the structural elements are in a noncrystalline state without long-term periodicity, it can also be defined as a state in which the ratio of a metal element to a nonmetal element such as oxygen, nitrogen, carbon, boron or fluorine is different from the ratio of the metal element to a nonmetal element such as oxygen, nitrogen, carbon, boron and fluorine in the brittle material particle.

The degree of freedom of the structure can be increased by adopting a three-dimensional network structure in the brittle material crosslinked structure region. In addition, it is possible to improve adhesion between the brittle material particles by uniformly covering the surface of the brittle material particles with the brittle material region. At this time, when the thickness of the brittle material region is 100 nm or less, it is preferable that the relative level of the brittle material particles with respect to the brittle material crosslinked structure region is increased.

[Definition of Brittle Material]

The brittle material in the present specification is a material in which ductile deformation or plastic deformation is unlikely to occur when a structure is manufactured at around room temperature, and generally refers to a material in which plastic working is difficult. For example, examples include ceramics such as oxides, nitrides, carbides, borides, and fluorides, glass, intermetallic compounds, high-molecular polymer materials, and semiconductors such as silicon.

[Definition of Brittle Material Powder]

According to one embodiment of the present invention, a structure is provided having a brittle particle assembly having a plurality of brittle particles, wherein the brittle particles are arranged adjacently to each other, and the brittle particles having a brittle material region in the periphery are crosslinked (connected) by the brittle material region to bond the brittle particles to each other, and thereby form a brittle material crosslinked structure region preventing the mobility of the brittle particles.

[Gap]

Furthermore, the structure according to one embodiment of the present invention is excellent in that gaps are formed in the brittle material crosslinked structure region to be able to control the effective elastic modulus and hardness of the brittle particle aggregate structure. At this time, by setting a gap by at least 1 µm or less, it is possible to improve sealing. At this time, the Vickers hardness of the brittle material structure is 0.1 or more with respect to the Vickers hardness of the main phase brittle particles and the strength of the structure can be suitably maintained. At this time, by adjusting the Vickers hardness of the brittle material structure to be less than 1 with respect to the Vickers hardness of the main phase brittle particles, it is possible to obtain a structure with excellent compliance. In the case when it is difficult to measure the Vickers hardness of the brittle material particles, the Vickers hardness of a dense bulk structure manufactured by sintering the brittle material particles can be used as a reference. Although an example of Vickers hardness has been given, similar evaluations can be made by other mechanical properties such as effective elastic modulus, thermal conductivity, and electrical characteristics such as an impedance measurement. The effective elastic modulus is preferably adjusted to be less than 1 with respect to the elastic modulus of the main phase brittle particles, so that it is possible to obtain a structure with excellent compliance. At this time, 0.01 or more is preferred because the strength as a structure can be maintained. Since the brittle material structure according to one embodiment of the present invention has excellent compliance, it is also effective as a high-temperature sealing material particularly under thermal shocks.

[Constituent Elements]

It is preferred from the viewpoint of stability that the brittle material structure region is formed from the same element as the brittle particles. In particular, in the case when the metal elements which form the brittle particles are composed of two or more types, it is preferred from the viewpoint of stability that the composition ratio of the metal elements is the same or substantially the same.

Since the brittle material structure according to one embodiment of the present invention has a brittle material crosslinked structure region, the elastic modulus can be adjusted, and it is easy to form a three-dimensional surface. Therefore, it can be easily formed on various base materials such as metals, ceramics, polymer, composite materials and the like. This works particularly effectively when the base material is a porous body such as a thermal spray coating, and can provide a sealing function.

In addition, it can be used as an intermediate layer, and further forming a brittle material structure according to one embodiment of the present invention on a porous base material and fabricating a dense structure thereon further enhances the sealing function. At this time, by applying the assist of collision energy, the brittle material particles can be formed into a flat shape perpendicular to the base material which further improves the sealing properties.

[Manufacturing Method of a Structure]

The structure according to one embodiment of the present invention can be manufactured, for example, by laminating brittle material particles which have surfaces activated by plasma. At this time, more specifically, a plasma or laser having high energy is uniformly irradiated to the periphery of the brittle material particles of several µm or less as the main phase. By activating the surface while keeping the central part of the brittle material particles below the phase transformation temperature, a phase having a high degree of activation is uniformly deposited on the surface of the brittle material particles by energy irradiation. At this time, the plasma and laser irradiation field can be used as an acceleration source of the brittle material particles by leaving the field in a fluid state. The brittle material regions having a high activation level react with each other to form a three-dimensional network by colliding and stacking these highly activated particles. At this time, the brittle material particles, which are the main phase, can maintain the state of the raw material and can maintain the crystal phase which was initially prepared. In addition, by passing the brittle material particles in a state where the properties as a thermal fluid are further imparted to the plasma having a high electron temperature, the collision is performed much easier with the surface activated while the central part is kept below the phase transformation temperature.

Figure 3:
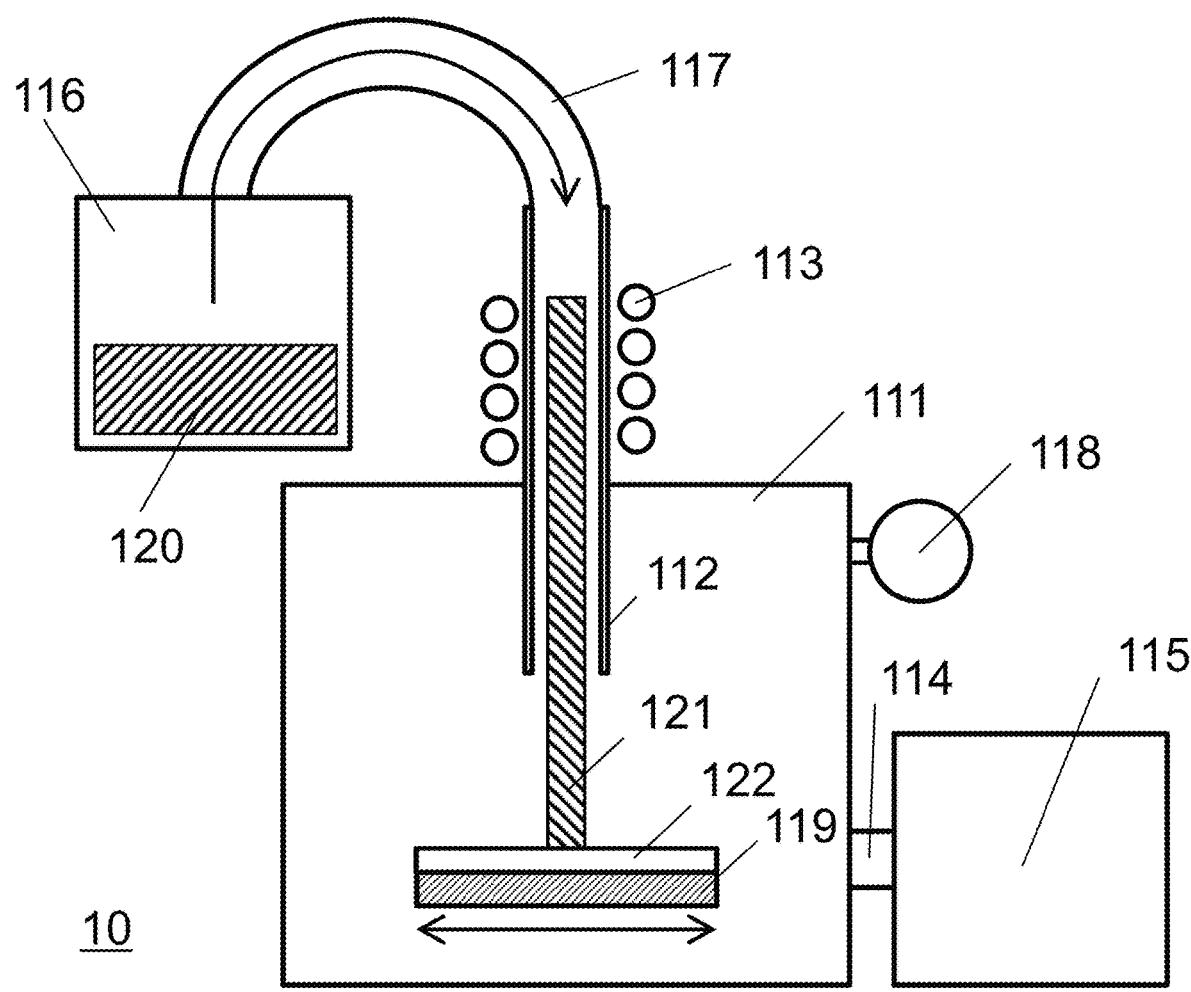
FIG. 3 is a structural explanatory view of a plasma-assisted ultrafine particle structure formation device 10 used for forming a brittle material structure according to one embodiment of the present invention.

FIG. 3 is a schematic view of a device which is used for forming a brittle material structure according to one embodiment of the present invention. The device has a film forming chamber 111. A nozzle 112 is attached to the film forming chamber 111. A coil 113 for flowing a current to generate a high-frequency plasma is attached to the nozzle 112. Further, a vacuum pipe 114 and a vacuum pump 115 are connected to the film forming chamber 111. The nozzle 112 is connected to an aerosol generating device 116 which is installed outside the film forming chamber 111 via a conveying pipe 117 for transporting ultrafine particles. In addition, a pressure gauge 118 for measuring pressure is attached to the film forming chamber 111. The pressure inside the film formation chamber 111 is reduced by the vacuum pipe 114 and the vacuum pump 115, and the pressure at the time of film formation is read by the pressure gauge 118. A base material 119 is arranged in the film forming chamber 111. The base material 119 can be fixed or variable in position with respect to the nozzle 112.

Using the device as formed above, the brittle material structure is formed by the following operation. By operating the vacuum pump 115, the inside of the film forming chamber 111 is kept in a reduced pressure state by the vacuum pipe 114. In this state, a gas such as helium or argon is caused to flow through the nozzle 112, and a current is caused to flow through the coil 113 to generate inductively coupled high-frequency plasma within the nozzle 112. The aerosol generator 116 is operated to aerosolize the ultrafine particles which are ultrafine brittle material particles 120 as a raw material to generate ultrafine particle aerosols. Furthermore, the generated ultrafine particle aerosol is transported to the nozzle 112 via the conveying pipe 117. The surface of each of the transported ultrafine particle aerosols is activated by inductively coupled high-frequency plasma within the nozzle 112 to become surface-activated ultrafine particles 121. The surface-activated ultrafine particles 121 are introduced into reduced pressure film forming chamber and is blown onto the base material 119 via the nozzle 112. The active ultrafine particles 121 which are blown are deposited on the base material 119, and activated-surfaces of the ultrafine particles are strongly bonded with other to create a three-dimensional network of surface-active brittle structures. At this time, a three-dimensional network surface activated structure including brittle material particles in a surface-activated three-dimensional network is formed because the surface-activated part originally exists on the surface of each ultrafine particle. In addition, gaps are generated in the surface-activated three-dimensional network, and it is possible to control the amount of gaps according to a filling rate of the brittle material particles. At this time, a structure in which the gaps are filled with a surface-activated material can also be obtained. By using helium as a plasma gas, it is possible to form a more dense structure compared with using an argon gas.

Here, although the inductively coupled high-frequency plasma is used, a DC plasma may also be used. In addition, a capacitively coupled high-frequency plasma may also be used. It is important to keep the electron temperature of the plasma at a high level, and to keep the plasma gas as a fluid or a hot fluid so that it becomes a source for accelerating or heat-accelerating the brittle material particles.

Although an example of the aerosolization method has been introduced as an introduction form of the brittle material fine particles, a suspension in which the fine particles are dispersed in a solvent may be used.

By adding the assist of the collision energy when forming the brittle material structure region according to one embodiment of the present invention, it is possible to add the assist of an impact solidification phenomenon at room temperature, and it is possible to obtain a more dense structure. At this time, the brittle material particle which allows a state in which they are flattened in a perpendicular direction with respect to the base material. Since the deformation of the brittle material particles is the deformation of the solid phase particles, and the flat aspect ratio is smaller than the flatness of the molten droplet of the thermal spraying. When the brittle material particles are deformed, the crystallite size becomes finer. Furthermore, when forming the brittle material structure region according to one embodiment of the present invention, by increasing relatively the assist amount of collision energy, it is possible to form an inclined structure in which the gap amount decreases upwardly.

By applying an assist of thermal energy at the time of forming the brittle material structure region according to one embodiment of the present invention, it is possible to add an assist in a semi-molten state, and it is also possible to increase the degree of freedom of a three-dimensional formation.

On the other hand, considering the problems described above of the conventional method, it allows only the outmost layer of the fine particles or the base material to easily join the fine particle and the fine particle, or the fine particle and the base material at a range that does affect the thermal history of the fine particles or the base material used in the structure, thereby it is possible to form a dense structure which maintains the crystalline structure of the raw material fine particle which is the problem in the conventional thermal spraying method by joining the fine particles with each other or the fine particles and the base material, and applying compression stress to a joining region. In addition, it is possible to realize a high usage efficiency of the raw particles and speed up the structure formation which is the problem of the conventional aerosol method. In addition, if the fine particles is joined each other or to the base material described above, a good coatability and adhesiveness can be ensured not only between the fine particles but also between the fine particle and the base material without considering a material and shape of the base material. In addition, formation of the dense structure without considering the material and shape of the base material can greatly enlarge the application range of the ceramics and alloy materials and can contribute to industrial developed.

In one embodiment of the present invention, in order to solve the problems mentioned above, it was found that production of an active region in the outermost region of fine particles and a base material so that joining the fine particles with each other or the fine particles and the base material is encouraged without causing thermal and physical damage, for example, in a range where the raw material fine particles are not melted. Furthermore, it was found that it is possible to form a structure having a compressive residual stress by applying a compressive stress to a joining region via the generated active region. Preferably, by applying a uniform compressive stress to the joining region, it is possible to form a uniform, homogeneous and dense structure having a compressive residual stress showing an isotropic structure while maintaining the crystal structure of the raw material fine particles.

More specifically, high-speed high-energy beams which is high-energy atoms or molecules such as ion beams, atom beams and molecular beams and low-temperature plasma are irradiated to the outmost surface layer of the fine particle and base material described above, and a surface active region is formed in which a contaminant layer and an oxide layer formed due to water molecules attached to the fine particles and the surface of the base material are removed so that the raw material particles and the base material are not completely dissolved or decomposed. At the same time, the collision pressure between the fine particles and between the fine particles and the base material promotes a reduction of the crystallite size by crushing the raw material fine particles which forms an active region by the crushed fine particles. In addition, fine particles which have an active surface region including the finely divided raw material fine particles are joined by the material flow and the densification of the covering part in the structure is realized.

The surface of the fine particles and the surface of the base material in which the crystal structure of the raw material particles is almost maintained, and in a state where the surface of the fine particles and the surface of the base material are easily bonded, are adjacent to each other due to the collision pressure, and thereby a joining region joined via the surface active region is formed between the fine particles and between particles and the base material. Furthermore, the joining region includes a state in which the crystal structure is disordered due to, for example, electronically exciting the outmost layer of the fine particles and the base material, or includes an active region in which the surface of the fine particles is melted, and the thickness of the joining region which includes the active region is 30 nm or less. In addition, although the active region is formed at the junction between fine particles and the mechanical strength of the bonding between the crystal grains is reduced, the crystal grains themselves are refined by the collision pressure, so that many dislocations are introduced into the crystal grains, and a structure with a high compression residual stress is formed so that it is possible to realize a high mechanical strength structure as a whole.

In the joining region between the fine particles and between the fine particles and the base material, the elements which form the raw material fine particles and the base material are included, thereby the fine particles are joined to each other or the fine particles and the base material by a chemical bond such as a covalent bond or an ionic bond according to a type of the raw material fine particle or a type of the base material which forms the joining region, or a combination of the fine particle and the base material. Since the active region described above is provided only to the outmost layer of the raw material fine particles and the outmost layer of the base material, as a result, a structure can be produced in which the crystal structure of the raw material fine particles which have the joining region described above can be maintained.

Here, in the present specification, a brittle material is a material in which ductile deformation or plastic deformation is unlikely to be expected when a structure is manufactured at around room temperature, and generally indicates a material that is difficult to plastically process. For example, ceramics such as oxides, nitrides, carbides, and borides, glass, intermetallic compounds and semiconductors such as silicon are exemplified. In the present specification, the base material is a brittle material, a metal, a polymer, or a porous material of these materials. In addition, in the present specification, the raw material fine particles can be applied not only to brittle material particles such as ceramic fine particles, but also to metal fine particles and high molecular weight polymer fine particles and the like.

In the obtained structure, since the crystallites cannot be enlarged by heat even if the crystallites are refined by collision pressure with respect to the fine particles, the volume of the fine particles after deformation is the volume of the fine particles of the starting material. The crystal size of the fine particles after deformation has a crystallite of 1 nm to 300 nm. By imparting compressive residual stress to the structure, the joining region of the fine particles is strengthened, and the range of the hardness of the structure is Hv200 or more and Hv1500 or less in Vickers hardness.

Here, the total energy required to form the structure is defined as the surface activation energy of the active region provided to the outmost layer of the fine particles generated by being electronically and/or thermally exposed to plasma and the like, and kinetic energy of the fine particles described above. The surface activation energy of the fine particles described above is energy used to join between the fine particles via the active region including the amorphous phase and energy for promoting the joining. The kinetic energy of the fine particles described above introduces displacement into the interior of the crystal by crushing collision between the fine particles (crystal refining), and gives strength to the joining between fine particles and between fine particles and a base material in order to provide compression residual stress to the joining between fine particles. In the structure provided with compression residual stress according to the present embodiment, a value calculated by setting the internal compression stress within the structure as a numerator and the mechanical strength (Vickers hardness) of the coating part of the structure as a denominator is defined as a value which represents the joining strength of fine particles. Although the mechanical strength and the compression stress of the coating part are influenced by the base material which forms the structure, since the numerator and denominator already include that influence, the defined value is a value which reflects the joining strength between fine particles. In the structure according to an embodiment of the present invention, it satisfies 0.02<internal compression stress/the Vickers hardness, more preferable 0.02<internal compression stress/Vickers hardness<0.5. At this time, the Vickers hardness can be determined, for example, by reducing the MPa. In addition, the internal compression stress can be assumed from the peak shift of an X-ray diffraction.

Figure 11:
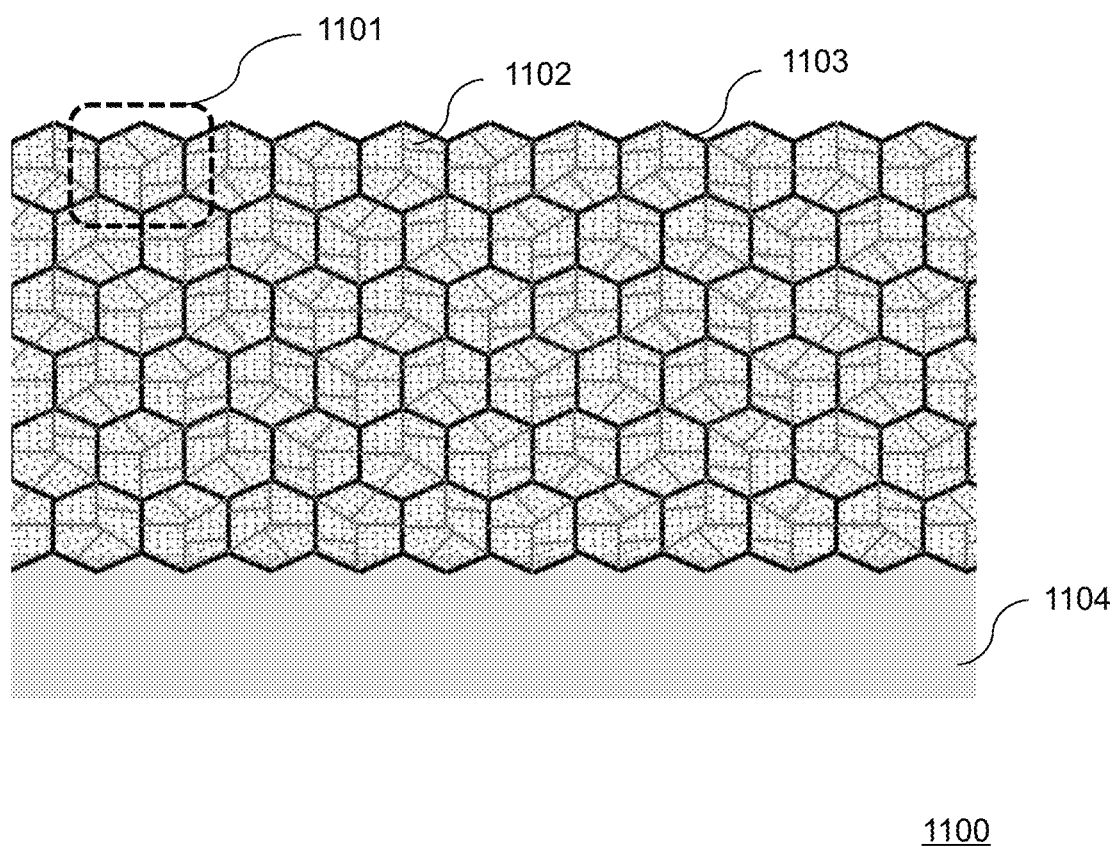
FIG. 11 is a cross-sectional model of a structure 1100 according to one embodiment of the present invention.

FIG. 11 is a cross-sectional model of a structure 1100 according to an embodiment of the present invention. The structure 1100 includes a base material 1104, and fine particles 1101 having a deformed surface shape deposited on the base material 1104. The fine particle 1101 bonds with other adjacent fine particle 1101 via a joining region which is arranged with an active region 1103 including an amorphous phase. The structure 1100 is obtained in the case when, for example, a large amount of kinetic energy is used in the ratio of the surface activation energy of the fine particles 1101 to the kinetic energy of the fine particles 1101.

By increasing the ratio of kinetic energy to the energy required to form the structure 1100, the material flow with the raw material fine particles proceeds, and a dense structure can be obtained. In addition, by increasing the ratio of kinetic energy, obtained structure 1100 introduces the displacement into the crystal particle by crystal crushing and colliding (crystal refining) of the fine particles 1101, by imparting a high compression residual stress to the joining between fine particles 1101, a high density structure 1110 with a stronger joining between fine particles can be obtained. By a fine particle as a starting raw material, the fine particles 1101 included in the structure 1100 are collided and crushed (crystal refining), and the crystallite 1102 is generated within the fine particle 1101. That is, the fine particles 1101 are formed by a plurality of crystallites 1102. In addition, the fine particles 1101 are transformed by high compression stress.

Figure 12A:
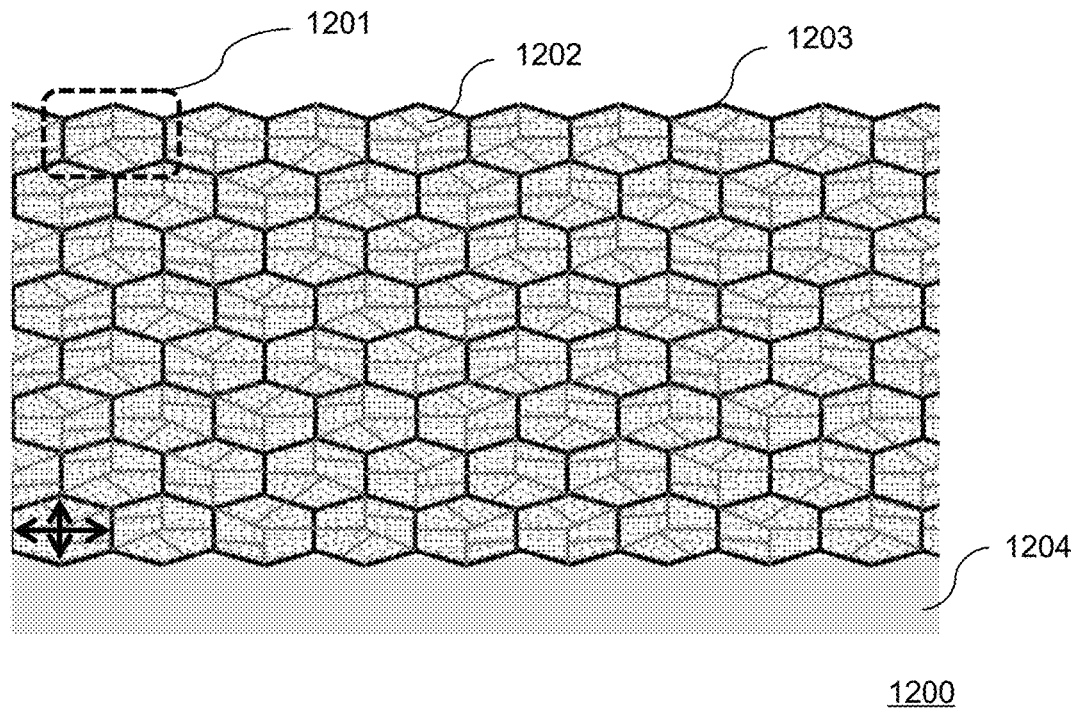
FIG. 12A is a cross-sectional model of a structure 1200 according to an embodiment of the present invention.
Figure 12B:
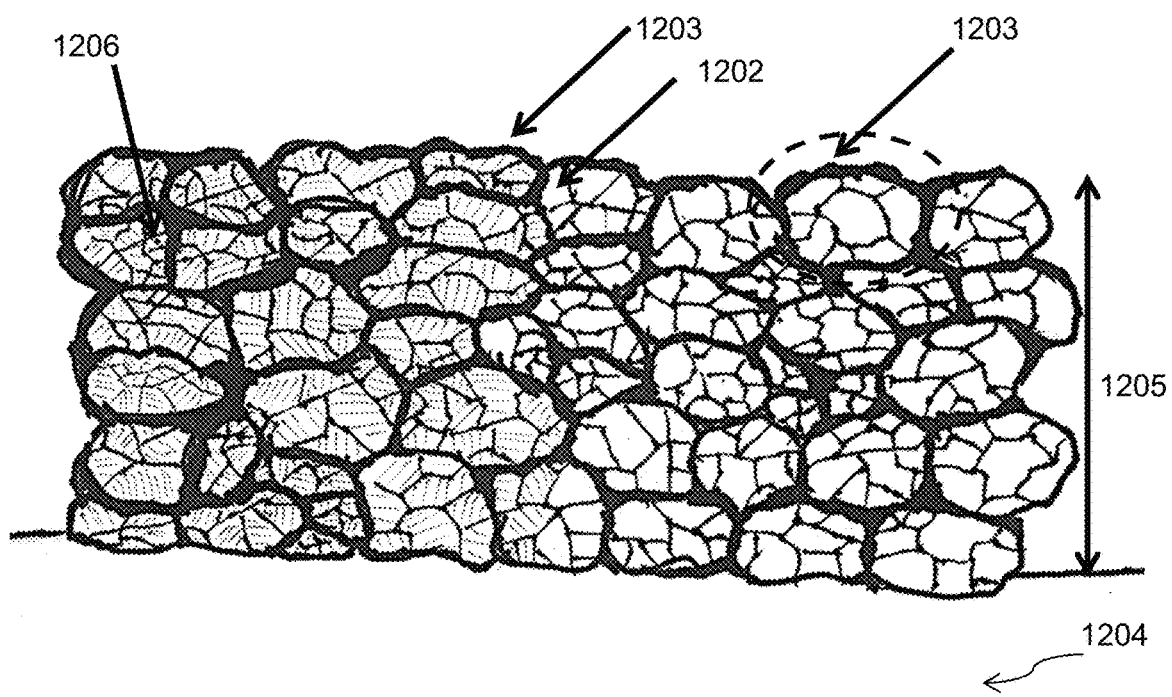
FIG. 12B is a cross-sectional model for explaining details of a fine particle 1201 having a deformed surface shape formed on a base material 1204 by deposition.

FIG. 12A is a cross-sectional model of a structure 1200 according to an embodiment of the present invention and FIG. 12B is a cross-sectional model for explaining the details of the fine particles 1201 having a deformed surface shape arranged by being deposited on the base material 1204. The structure 1200 is arranged with a base material 1204 and fine particles 1201 having a deformed surface shape deposited base material 1204, and adjacent fine particles 1201 are bonded via a joining region including an active region 1203 including an amorphous phase. The fine particles 1201 are deposited on the base material 1204 and form the coating part 1205. The structure 1200 is obtained in the case where the density of the obtained structure is increased by using a large amount of kinetic energy in the ratio of the surface activation energy of the fine particles 1201 to the kinetic energy of the fine particles 1201 and giving the particle size distribution to the raw material fine particles.

In FIG. 12A and FIG. 12B the fine particles 1201 after deformation have crystallites 1202 of 1 nm or more and 300 nm or less. The volume of the fine particles 1201 after the deformation has the volume of the fine particles of the starting material. An active region 1203 containing an amorphous phase is arranged on the fine particle surface layer. In the case when the obtained structure 1200 has a high compressive residual stress, the fine particles 1201 in the structure 1200 become finer, and the fine particles 1201 may be accompanied by deformation. The base material 1204 which forms the structure is arranged with a joining region with the active region 1203 including the amorphous phase of the surface layer of the fine particles 1201. Fine crystallites 1206 exist in the joining region of the fine particles 1201. The base material 1204 is, for example, a brittle material, a metal, a polymer or a porous material of a material. In the joining region including the amorphous phase, depending on the combination of the raw material fine particles and the material of the base material 1204 which form the interface, an interface is formed where the fine particles 1201 are bonded and the fine particles 1201 are bonded to the base material 1204, for example, by a chemical bond such as a covalent bond and an ion bond. The joining between the fine particles 1201 and the joining between the fine particles 1201 and the base material 1204 are reinforced by the bonding described above, and the compressive stress applied to each joining region enhances the mechanical strength of the joining region.

The deformation of the fine particles 1201 is in the range of 0.1 to 0.99, in the case when it is calculated by dividing the short side as the numerator and the long side as the denominator, for example, by using the long side (horizontal arrow in FIG. 12A) and the short side (vertical arrow in FIG. 12A) of one fine particle 1201 shown in FIG. 12A, then the volume value of the deformed fine particles 1201 has the volume of a starting material before the deformation as described above.

Figure 13:
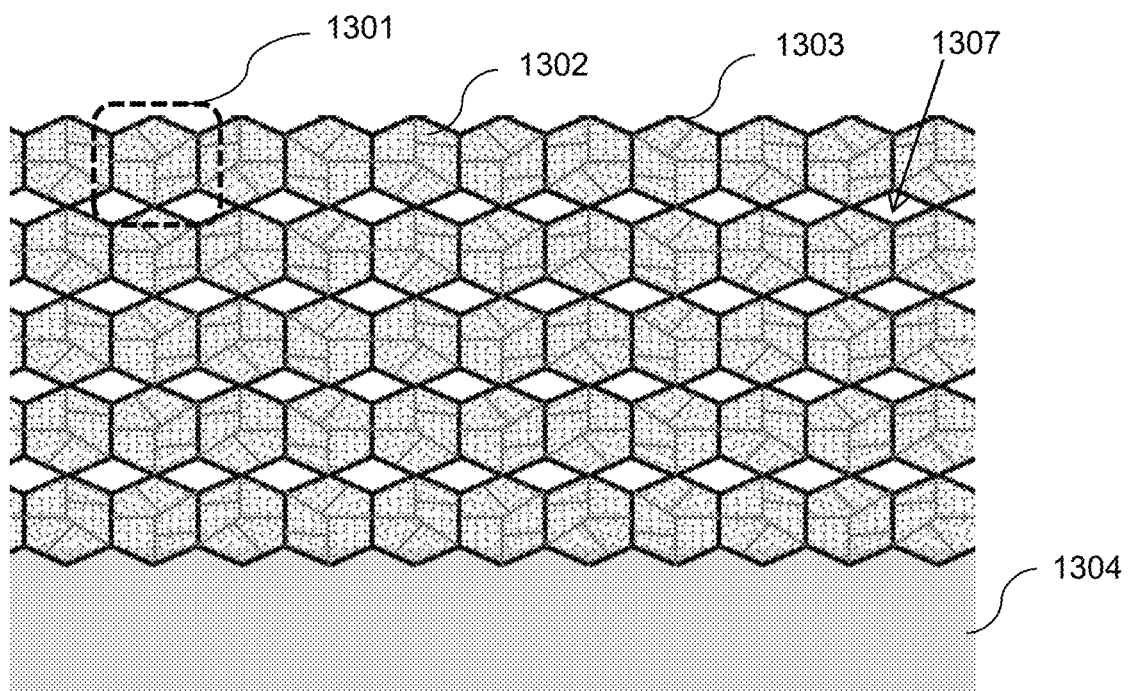
FIG. 13 is a cross-sectional model of a structure 1300 according to one embodiment of the present invention.

FIG. 13 is a cross-sectional model of a structure 1300 according to an embodiment of the present invention. The structure 1300 is arranged with a base material 1304 and fine particles 1301 having a deformed surface shape, which are arranged by being deposited on the base material 1304. The fine particle 1301 is bonded to the adjacent fine particle 1301 via a joining region including an active region 1303 including an amorphous phase. The fine particles 1301 have crystallites 1302. In addition, the structure 1300 includes gaps 1307 which are not bonded to the adjacent fine particles 1301 via the joining region including the active region 1303 including the amorphous phase. The structure 1300 is obtained when, for example, a small amount of kinetic energy is used in the ratio of the surface activation energy of the fine particles 1301 to the kinetic energy of the fine particles. By reducing the ratio of the kinetic energy to the energy required to form the structure 1300, the obtained structure has a low degree of collisional crushing of fine particles (crystal refining) and dislocation into the inside of the crystal grain and the compressive residual stress applied to the joining between the fine particles are reduced. However, the joining between the fine particles is strengthened by the surface activation energy of the fine particles, and a low-density structure can be obtained. In the structure 1300 in this case, the fineness of the fine particles is smaller compared to that of the structure 1100, and the deformation of the fine particles is smaller than that of the structure 1100, and hardly deforms.

Figure 14A:
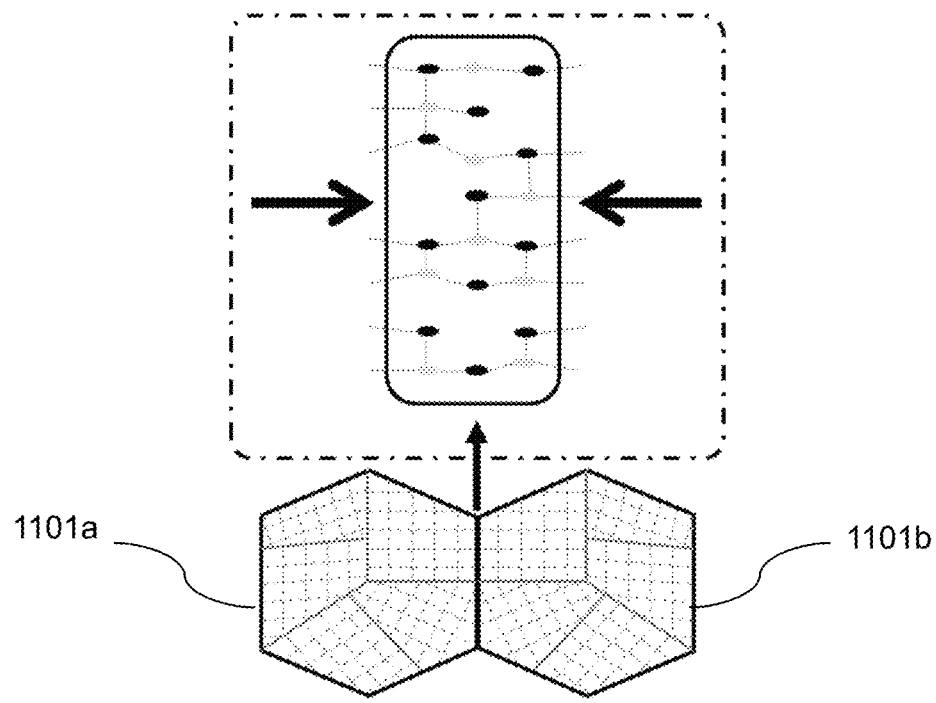
FIG. 14A is an enlarged view of a joining region between fine particles in a structure 1100 according to an embodiment of the present invention.
Figure 14B:
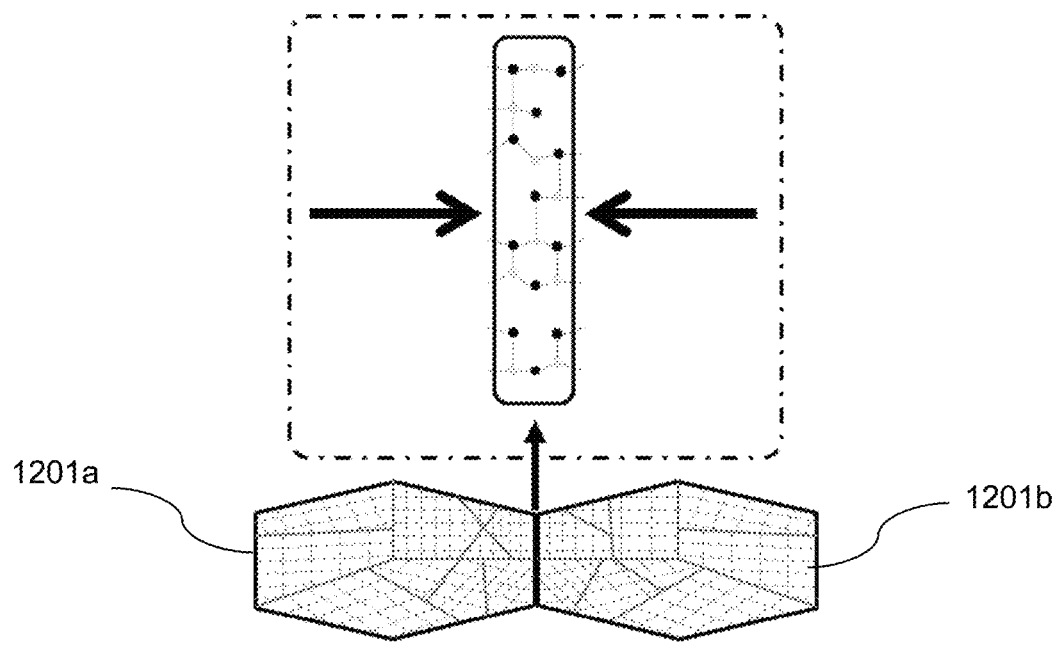
FIG. 14B is an enlarged view of a joining region of the fine particles in a structure 1200 according to an embodiment of the present invention.

FIG. 14A is an enlarged view of a joining region between fine particles in the structure 1100 according to an embodiment of the present invention. FIG. 14B is an enlarged view of a joining region between fine particles in the structure 1200 according to an embodiment of the present invention. The joining regions between fine particles in the structures shown in FIG. 14A and FIG. 14B are regions where the active regions of the outmost layer of the fine particles are bonded, and in FIG. 14A and FIG. 14B, the bonds between the atoms (indicated by circles in the frames of FIG. 14A and FIG. 14B are further broken or stretched by the high-temperature electrons and ions in the broken line frame. The joining region where the active region including the amorphous phase of each of the outmost layers of the fine particles is in a state where the crystal structure is disordered is enlarged. The fine particles 1101a and the fine particles 1101b in the structure 1100 apply a compressive stress indicated by an arrow shown in FIG. 14A to the bonding region of the structure 1100. With respect to the outmost region of the structure 1200, the fine particles 1201a and the fine particles 1201b in the structure 1200 apply compressive stress shown by an arrow in a broken line frame of FIG. 14B to the joining region by fine particle refined by collision crushing. In addition, at this time, the fine particles 1201a and 1201b in the structure 1200 are deformed by compressive stress, so that the fine particles 1201a and 1201b in the structure 1200 are more deformed than the fine particles 1101a and 1101b in the structure 1100. In addition, the compressive stress represented by the arrow is larger in the structure 1100 than in the structure 1200. For example, the fine particles 1101 and the bonding region between the fine particles 1101 in the dense structure having a high compressive residual stress of the structure 1100 introduce displacement into the crystal grains by collision crushing (crystal refining) of the fine particles 1201 as the structure 1200, and high compressive residual stress is provided to the joining between the fine particles, and the joining between the fine particles 1101 is strengthened.

Figure 15A:
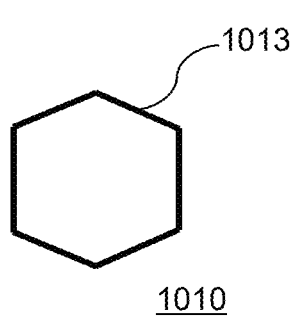
FIG. 15A shows a single crystal fine particle 1010 as a hexagonal single crystal.
Figure 15B:
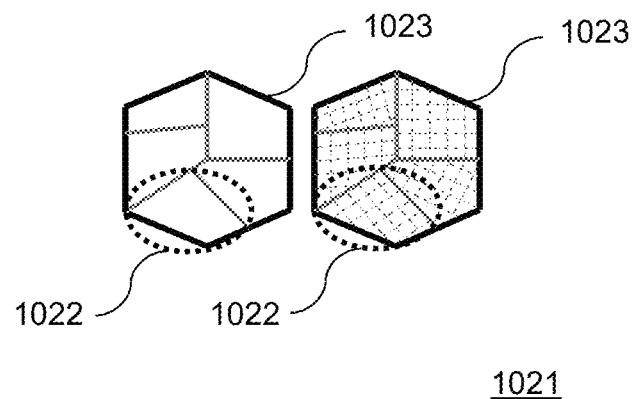
FIG. 15B shows a hexagonal polycrystalline fine particle 1021 having a crystallite 1022.
Figure 15C:
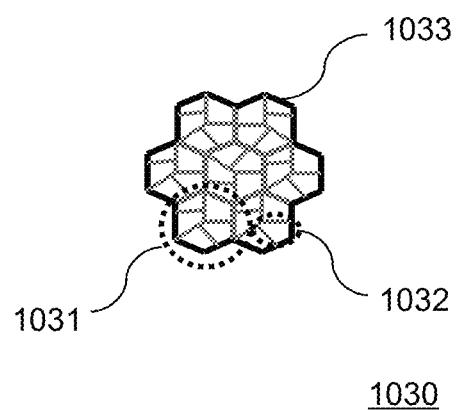
FIG. 15C shows aggregated powder 1030 in which hexagonal polycrystalline fine particles 1031 having a crystal 1032 are aggregated.

Here, FIG. 15A to FIG. 15C are referred to. FIG. 15A to FIG. 15C are cross-sectional models of fine particles having an active region including an amorphous phase formed by the method of manufacturing a structure according to the present invention. FIG. 15A shows the single crystal fine particles 1010 as a hexagonal single crystal, FIG. 15B shows a hexagonal polycrystalline fine particle 1021 having crystallites 1022, and FIG. 15C shows an agglomerated powder 1030 in which hexagonal polycrystalline fine particles 1031 having crystallites 1032 are arranged.

Figure 16A:
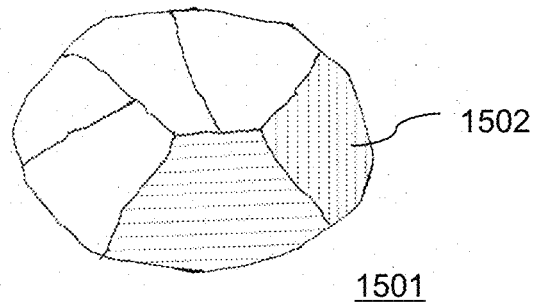
FIG. 16A shows raw material particulates 1501 used to form a structure according to an embodiment of the present invention.
Figure 16B:
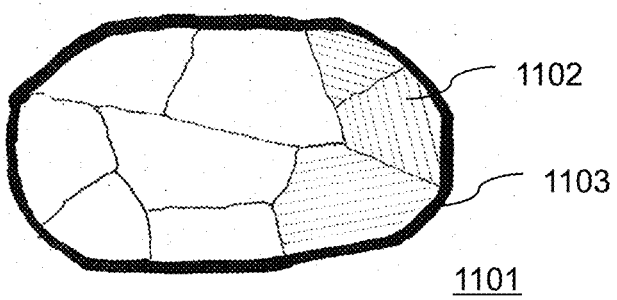
FIG. 16B shows fine particles 1101 having a small deformation used to form a structure according to an embodiment of the present invention.
Figure 16C:
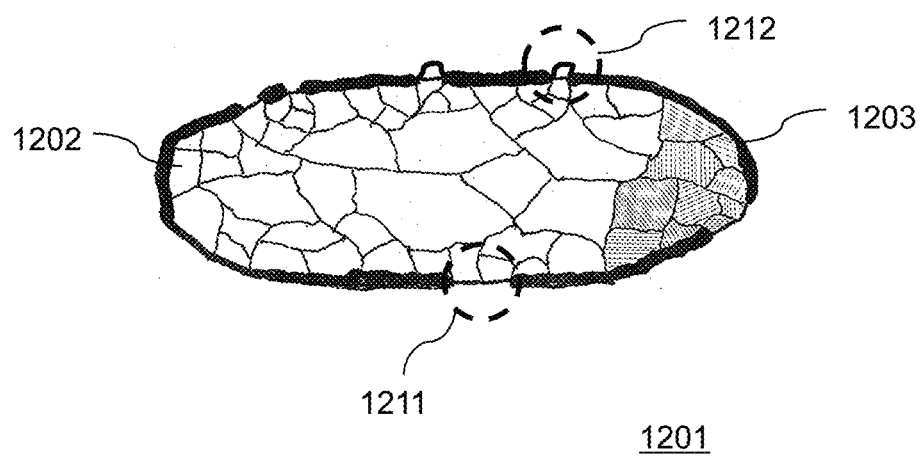
FIG. 16C shows particulates 1201 having large deformation in the structure according to one embodiment of the present invention.

FIG. 16 is a cross-sectional model for explaining the details of the structure of the fine particles according to one embodiment of the present invention. FIG. 16A shows a raw material fine particle 1501 used to form a structure according to one embodiment of the present invention, and FIG. 16B shows a fine particle 1501 having small deformations which forms the structure according to one embodiment of the present invention, FIG. 16C shows fine particles 1201 having large deformations in the structure according to the embodiment of the present invention. The raw material fine particles shown in FIG. 16A to FIG. 16C may be not only the polycrystalline fine particles 1021 shown in FIG. 15B, but also single crystal fine particles 1010 or an aggregated powder 1030 obtained by aggregating the raw material fine particles 1031. The fine particles are deformed by applying compressive stress. The deformed fine particles 1101 in FIG. 16B and the deformed fine particles 1201 in FIG. 16C have the same volume as the raw material fine particles 1501 in FIG. 16A. When an index indicating the deformation of the fine particle is calculated by dividing the short side as a numerator and the long side as a denominator, the numerical value is in the range of 0.1 to 0.99. The surface layer of the fine particles in FIG. 16B and FIG. 16C has an active region including an amorphous phase generated by plasma or the like. In the case when the deformation of the fine particles is large, at the same time, the crystallites in the fine particles are refined by collisional crushing, and are provided with dislocations, strains, and the like, and the crystal lattice spacing is reduced. In the case when a strong compressive stress is applied, the fine particle surface layer in FIG. 16C becomes a surface layer 1211 having an amorphous phase generated by plasma or the like and a surface generated by collision crushing of the fine particles. For example, due to strong compressive stress, a part of the amorphous phase generated by plasma or the like on the surface of the fine particles in FIG. 16C is cracked, and the fine particles also become the fine particle surface layer 1212 in which crystallites in the fine particles appear on the surface. In the structure according to the present invention, fine particles having the characteristics shown in FIG. 16B and FIG. 16C and a structure in which fine particles are mixed are formed.

In the case when the starting material for forming the structure according to the embodiment described above is the single crystal fine particles 1010, although the active region 1013 can be formed on the surface by the method for manufacturing the structure according to the present invention, the miniaturization of the single crystal fine particles 1010 does not progress as much as the polycrystalline fine particles 1021, and the compressive stress applied to the joining region is small. For this reason, the mechanical strength of the structure when single crystal fine particles 1010 is used as a starting material is lower than that of the structure when the polycrystalline fine particles 1021 are used as a starting material. In addition, the aggregated powder 1030 in which the polycrystalline fine particles 1031 are aggregated is used as a starting material which forms the structure according to the embodiment of the present invention, since the range of the active region 1033 activated by plasma or the like is determined by the surface of the aggregated powder 1030, and a part of the collision crushing of the fine particles is used for crushing the agglomerated powder 1030, the structure in which the agglomerated powder 1030 is used as a starting material has a lower mechanical strength than that of the structure when the polycrystalline fine particles 1021 are used as a starting material. Depending on the physical properties of the starting materials, the mechanical strength of the structure increases in the order of the starting material: aggregated particles<single crystal fine particles<polycrystalline fine particles. In the case where the fine particles are agglomerated when forming the structure, a method of dissolving the agglomerated state of the fine particles using a crusher or the like is added to the aerosolized fine particles in advance, so that the active region 1023 is formed on the surface of the polycrystalline fine particles 1021, and the mechanical strength and uniformity of the obtained structure are further enhanced.

[Manufacturing Method of a Structure]

Figure 17:
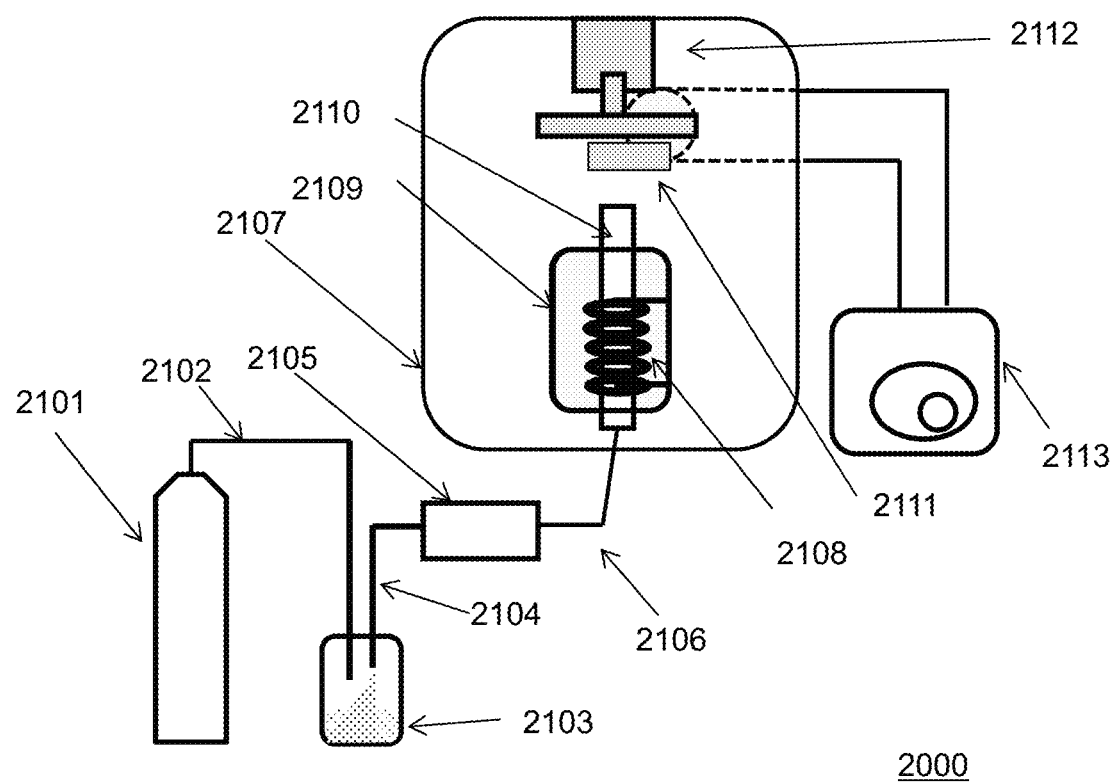
FIG. 17 is a schematic view of a structure manufacturing device 2000 according to an embodiment of the present invention.
Figure 18:
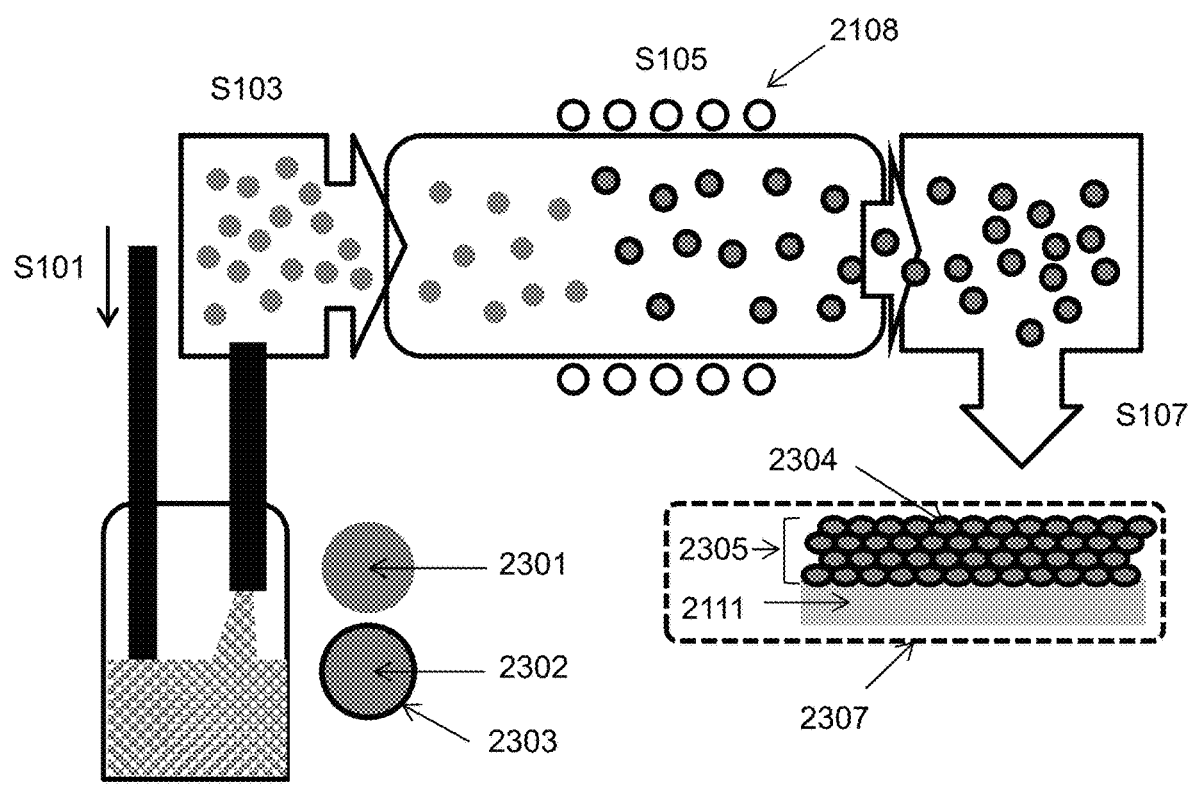
FIG. 18 is a diagram for explaining a method of manufacturing a structure according to an embodiment of the present invention.

The structure according to the present invention described above can be manufactured using, for example, a structure manufacturing device 2000 shown in FIG. 17. In addition, an embodiment of a method of manufacturing a structure according to the present invention is described with reference to the procedure shown in FIG. 18. The structure manufacturing device 2000 includes, for example, an aerosol generator 2103, a structure manufacturing part 2107, and a plasma generator power supply 2108. In addition, it is preferred that the device 2000 for manufacturing a structure includes a crushing device 2105 that disintegrates aggregated particles in raw material fine particles and secondary particles formed by granulation into primary particles. An aerosol generator 2103 is connected to plasma generation gas cylinder 2101 via a gas conveying pipe 2102. The aerosol generator 2103 is connected to a crushing device 2105 via an aerosol conveying pipe 2104. The crushing device 2105 is connected to the structure manufacturing part 2107 via the aerosol conveying pipe 2106.

A plasma generator 2109 is arranged in the structure manufacturing part 2107, and an aerosol conveying pipe 2106 is connected to one end of the plasma generator 2109. A nozzle 2110 is arranged at the other end of the plasma generator 2109. As the plasma generator 2109, for example, an induction coil can be used. A stage 2112 is arranged in the structure manufacturing part 2107 at a position facing the nozzle 2110, and a base material 2111 is arranged on the stage 2112 so as to face the nozzle 2110. A vacuum pump 2113 which decompresses and deairs the inside of the structure manufacturing part 2107 is connected to the structure manufacturing part 2107. It is preferred that the crushing device 2105 is arranged in front of the plasma generator 2109.

The raw material fine particles 2301 are supplied with an inert gas such as argon or helium from a plasma generation gas cylinder 2101 by the aerosol generator 2103 (S101), mixed with the supplied gas species and stirred to form an aerosol. (S103). Next, an active region 2303 is continuously generated in the outmost layer of the fine particles by electronically exciting the surface of the fine particles using a non-thermal equilibrium plasma generated in the aerosol transport path in the plasma generator 2109 or the nozzle 2110 in a temperature range equal to or lower than the melting point of the fine particles. (S105). In the aerosol transport path in the plasma generator 2109, for example, the area immediately below the induction coil has the highest energy, and the fine particles are transported inside the plasma, which is a high energy space, and an active region is formed in the surface layer of the fine particles, which are transported for $10^{-2}$ seconds, preferably between $10^{-3}$ and $10^{-5}$ seconds. It is preferable that the high energy space in the aerosol transport path in the plasma generator 2109 that provides an active region to the surface layer of the fine particles has a temperature lower than the melting point of the raw material fine particles. The aerosol containing the fine particles 2302 arranged with the active region 2303 is ejected to the base material 2111 (S107). The fine particles 2302 reach the base material 2111 and form a joining region in which the fine particles 2302 join with each other and the fine particles 2302 and the base material 2111 are respectively joined through the active regions by the surface activation energy of the fine particles 2302 and the kinetic energy of the fine particles 2302. The plasma used to generate the active region of the fine particle surface has a plasma flame that reaches the base material, but preferably does not cause thermal damage to the base material. The active region of the surface layer of the fine particles generated by the plasma is maintained until the fine particles reach the base material by flying in the plasma flame, and the fine particles join with each other or the fine particles and the base material are joined via the active region generated by the plasma and the active region generated by the collision and crushing of the fine particles. In this way, the fine particles 2302 are deposited on the surface of the base material 2111 to form the coating layer 2305 so that the structure 2307 can be manufactured.

According to an embodiment of the present invention, joining between fine particles by a joining region through an active region including an amorphous phase provided to the surface of a fine particle or a base material by a plasma or the like, and introducing displacements inside the crystal grains by collision and crushing of the fine particles (crystal refining) and applying high compressive stress to the joining between the fine particles to strengthen the joining between the fine particles, the mechanical strength of the structure is improved. According to one embodiment of the present invention, an active region is formed on the surface of the primary particles by the effect of collision and crushing of the primary particles and assisting the thermal effect of the plasma. In addition, according to one embodiment of the present invention, the active area of the primary particle surface is increased by using the thermal effect of plasma for the collision and crushing effect of the primary particles, and the usage efficiency of the raw material fine particles used for forming the structure is increased.

In the conventional thermal spraying method, in the case when forming a dense structure, it was necessary to melt the all of the particles and promote the material flow by heat, so the thickness of the amorphous phase formed in the joining region between the particles was made extremely thin which was not easy. On the other hand, according to the embodiment of the present invention, it is possible to precisely generate a joining region between particles.

Figure 19A:
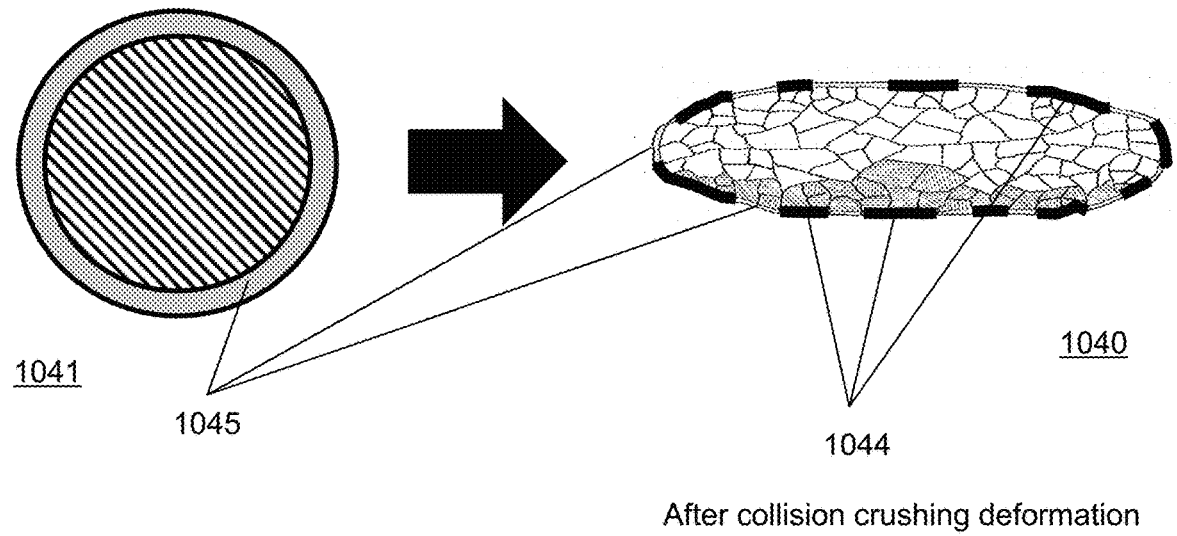
FIG. 19A is a cross-sectional model in which the raw material fine particles 1041 of the conventional aerosol deposition method are collided and crushed and deformed.
Figure 19B:
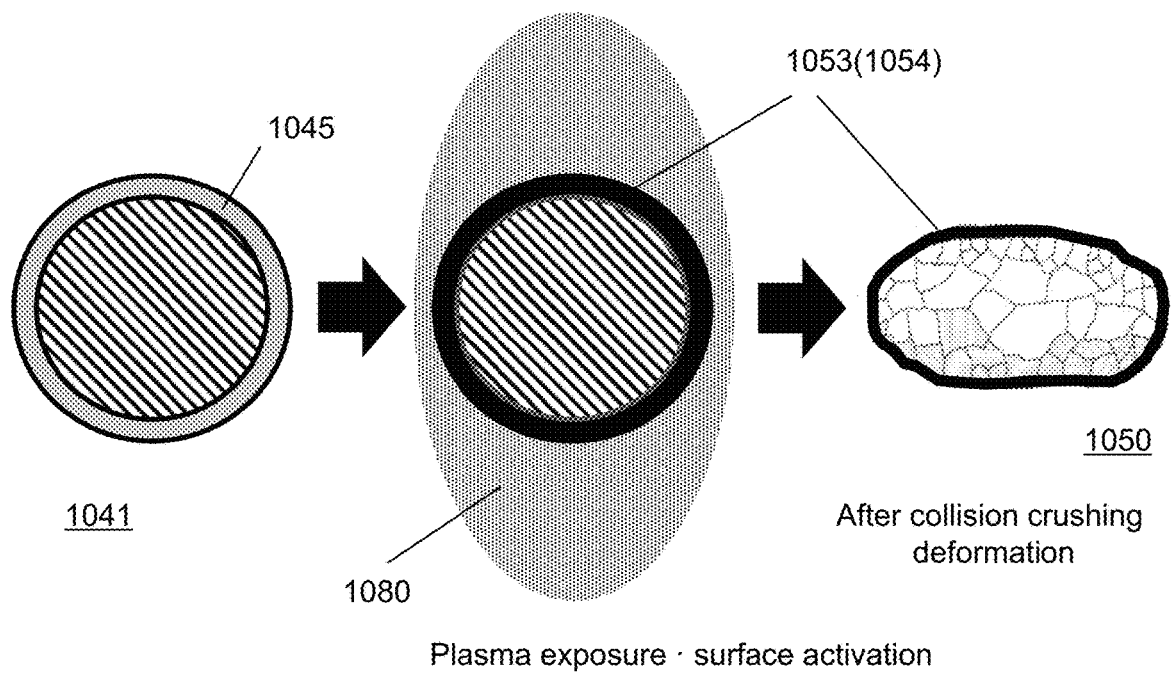
FIG. 19B is a cross-sectional model in which the raw material fine particles 1041 according to the manufacturing method according to the embodiment of the present invention are collided and crushed and deformed.
Figure 20A:
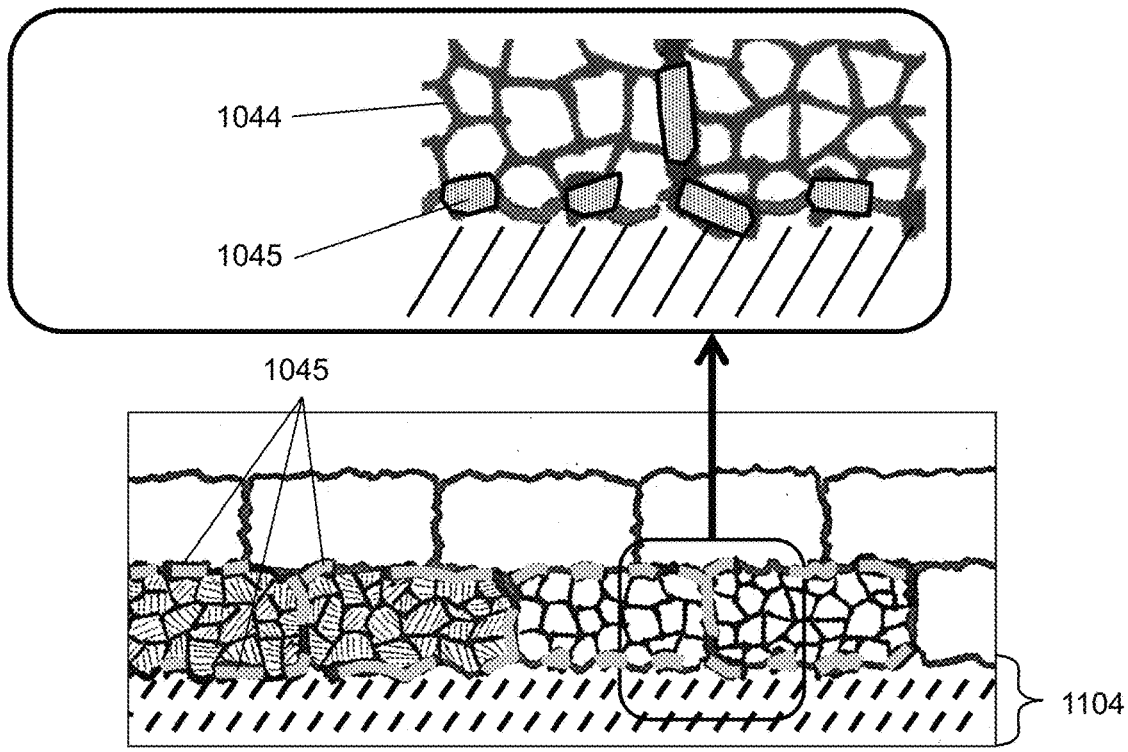
FIG. 20A is a cross-sectional model of a particle-to-particle bonding and a particle/base material bonding by a conventional aerosol deposition method.
Figure 20B:
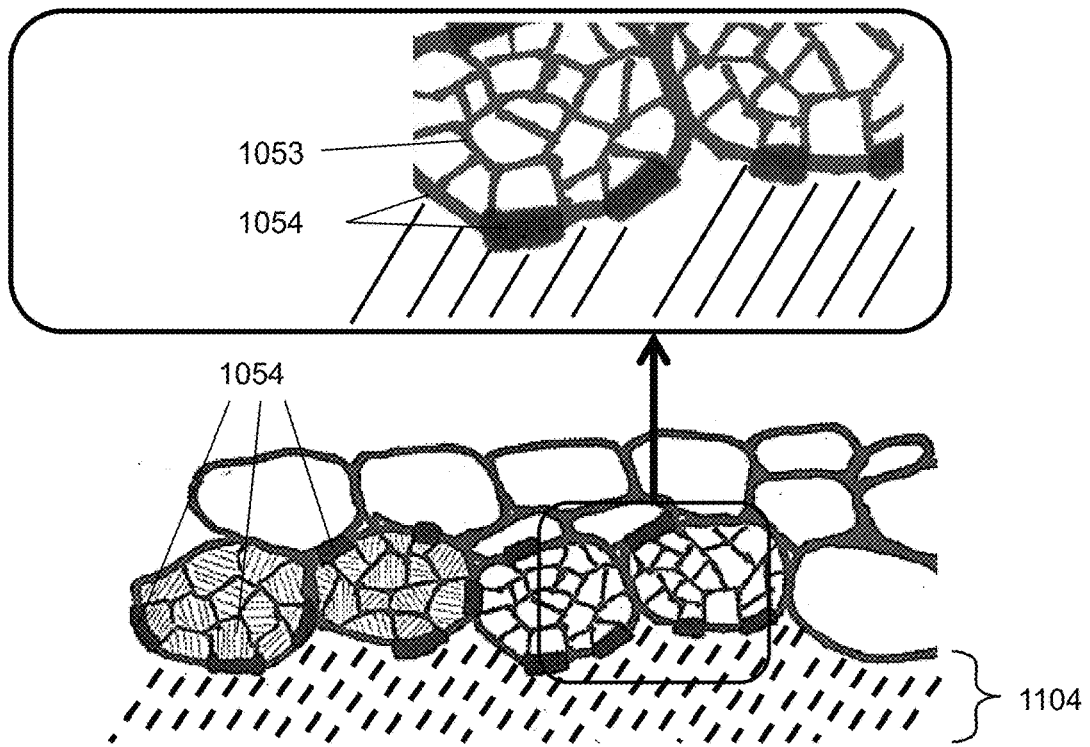
FIG. 20B is a cross-sectional model of a particle-to-particle bonding and a particle/base material bonding according to the embodiment of the present invention.

FIG. 19A is a cross-sectional model of a fine particle 1040 obtained by crushing and deforming raw material fine particles 1041 by a conventional aerosol deposition method, and FIG. 19B is a cross-sectional model of fine particle 1050 obtained by crushing and deforming raw material fine particles 1041 obtained by a manufacturing method according to an embodiment of the present invention. In addition, FIG. 20A is a cross-sectional model of the interparticle bond and the particle/base material bonding by a conventional aerosol deposition method, and FIG. 20B is a cross-sectional model of the interparticle bond and the particle/base material bonding by the manufacturing method according to one embodiment of the present invention. According to one embodiment of the present invention, in the conventional aerosol deposition method, as shown in FIG. 19A and FIG. 20B, a crushed surface formed by collision crushing is set as an active region (new surface) 1044 and used to form interparticle bonds and particle/base material bonding. As a result, the inactive region 1045 corresponding to the particle surface before the crushing remains inactive even after the particle crushing, and the surface of the crushed and refined particles is not completely activated. Therefore, there is an inactive region 1045 on a part of the surface of the particles finely divided by crushing and when such inactive region surfaces come into contact with each other or when one of the contact surfaces is inactive, a strong bond cannot be formed, and the finely divided particles repel each other or the finely divided particles and the base material repel, and do not contribute to the formation of the structure. As a result, the utilization efficiency of the raw material fine particles for forming the structure is low, which is a serious problem in practical use. According to one embodiment of the present invention, as shown in FIG. 19B and FIG. 20B, the surface of the inactive raw material particles before crushing is exposed to plasma 1080, thereby becoming activated in advance, and when the raw material particles which have surfaces activated in this way are refined by collision crushing, the surfaces of the refined particles all become active regions 1053 and 1054, and the densification proceeds due to a flow of the fine particles. Only by contacting the fine particles with all the activated surfaces or the fine particles and the base material, a strong bond is easily formed, the utilization efficiency of the raw material powder involved in the formation of the structure is greatly improved, and not only a dense film but also a porous film can be formed with good controllability. As a result, as shown in FIG. 20B, by joining via the active region 1053 which contributes to the joining of the surface of the fine particles formed by collision crushing and the active region 1054 containing the amorphous phase of the surface layer of the fine particles formed by exposure to plasma, it is possible to form a structure having practical a use efficiency of the raw material powder and forming speed and practical strength and density.

In the conventional aerosol deposition method, the shape of the base material joined to the structure is preferred to be a planar shape, and the structure is formed on the base material having a complicated shape by devising a manufacturing process. If the material has sharp edges or edges with a small radius of curvature, the impacting particles will not receive sufficient vertical impact compressive force and the active area will not form due to particle crushing. Rather it repels and cannot form a film or structure or a shear force acts between the particles and the base material, the particles are not crushed and the base material is etched, or the internal stress increases due to the repeated compressive force applied to the deposited coating and the surface of the structure. In addition to the weak bonding force, peeling of the coating or the structure from the base material was also a problem. According to an embodiment of the present invention, by joining the fine particles to each other or the fine particles and the base material through not only the active region generated by collision crushing of the fine particles, but also the active region including an amorphous phase generated by plasma or the like, the internal stress of the structure can be relaxed and precisely adjusted. In addition, by increasing the area of the active region that contributes to the joining between the particle surface and the base material surface, the structure can be directly formed without the need for a pre-process on the base material. For example, the structure can be formed on an edge part of a base material, on a circle or a sphere, and the like.

Furthermore, even on the surface of a base material having an uneven shape such as a porous base material, the structure can be directly formed without the need for a pre-process or the like, because the area of the active region that contributes to the joining between the surface of the fine particles and the surface of the base material can be increased by joining the fine particles to each other or the fine particles and the base material via an active region including an amorphous phase generated by plasma or the like and an active region generated by collision and crushing of fine particles. In addition, in the conventional aerosol deposition method, it is not easy to apply high compressive residual stress to the structure by crushing and crushing fine particles due to the shape of the base material such as unevenness and it was not easy to form a structure directly due to peeling between the fine particles and between the fine particle and the base material. However, according to one embodiment of the present invention, joining between the fine particles by a joining region via an active region containing an amorphous phase provided on the surface of a fine particle or a base material surface, and displacements are introduced into the inside of the crystal grains by collision crushing (crystal refining) of fine particles, and a high compressive stress is applied to the joining between fine particles to strengthen the joining between fine particles. In this way, a structure having a compressive residual stress can be directly formed. In addition, in one embodiment of the present invention, in the joining region between the fine particles and the base material, the temperature of the surface of the raw material particles exposed to the plasma is brought close to the thermoplastic temperature of the resin base material, etc. and thereby the structure can be directly formed on the resin base material without any pre-process.

Furthermore, according to the present invention, by providing a thickness to the joining region which has the structural features described above, by providing a particle size distribution to the raw material fine particles, and by continuously providing a compressive residual stress in the structure, a structure having a continuously inclined structure can be formed. According to one embodiment of the present invention, for example, a high-density structure from a low-density base material surface on the porous base material can be formed by providing an active region on the surface of the fine particles, and setting a value of a short side of the deformable fine particles in the structure/long side as a value of fine particles near the interface of the base material>the value of fine particles near the surface layer of the structure. Furthermore, according to an embodiment of the present invention, by utilizing an active region of the fine particle surface that does not contribute to the joining between the fine particle surfaces or between the fine particle surface and the base material surface, it is possible to form a structure that maintains a high reaction characteristic field of the surface chemical reaction such as a gas replacement reaction, an adsorption reaction and a reforming reaction at a high density.

Furthermore, according to the present invention, by providing a thickness to the joining region which has the structural features described above, by providing a particle size distribution to the raw material fine particles, and by providing a compressive residual stress in the structure, it is possible to form a structure having a smaller thickness than a bulk material or the thermal spray coating and having high insulating properties and thermal properties.

EXAMPLES

Although the present invention is explained below in more detail with reference to examples, the present invention is not limited to these examples.

The basic structure of the plasma-assisted ultrafine particle structure forming device 10 used in this embodiment is the same as that shown in FIG. 3. Therefore, repetitive descriptions will be omitted. The coil for generating the inductively coupled high-frequency plasma has three to four turns. The inside diameter of the nozzle where the high-frequency plasma is generated is 8 mm to 27 mm. The opening shape of the nozzle used for spraying the ceramic fine particles on the base material is a square of 1 mm×10 mm or a circle of 5 mm to 27 mm. Argon, helium, nitrogen, dry air, or a mixed gas of argon and oxygen was used as a plasma gas species. The gas flow rate was 0.5 to 40 SLM (standard condition L/min). The power was in the range of 0.5 to 6 kW. The pressure in the film forming chamber was in the range of 20 Pa to 2 kPa.

In addition, the plasma flow and the flow of particles in the plasma were simulated using commercially available high-frequency plasma analysis software. The reference temperature was measured using a thermocouple. Raw material particles include α-alumina (AL160-SG manufactured by Showa Denko, AA-02-5 manufactured by Sumitomo Chemical, Taimicron, abrasive powder manufactured by Fujimi Incorporated), and yttria-stabilized zirconia (8YSZ manufactured by DAIICHI KIGENSO KAGAKU KOGYO CO., LTD., 8YSZ manufactured by Tosoh Corporation) was used. Stainless steel, resin, aluminum, and a glass substrate were used as the base material.

Example 1

Figure 4A:
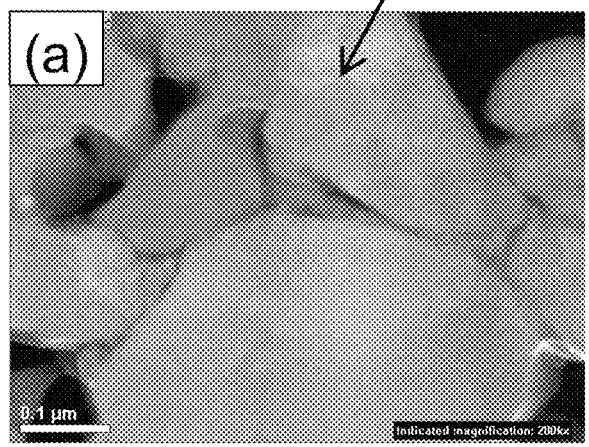
FIG. 4A is a scanning transmission electron microscope image and a mapping diagram of an electron energy loss spectroscopic method of a cross section of a structure obtained in accordance with one embodiment of the present invention.
Figure 4B:
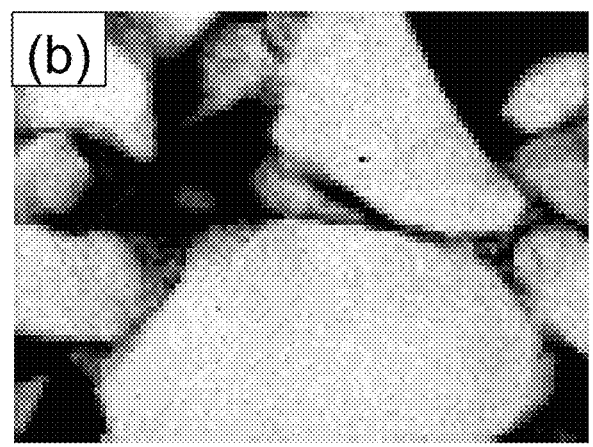
FIG. 4B is a mapping result of α alumina by electron energy loss spectroscopy.
Figure 4C:
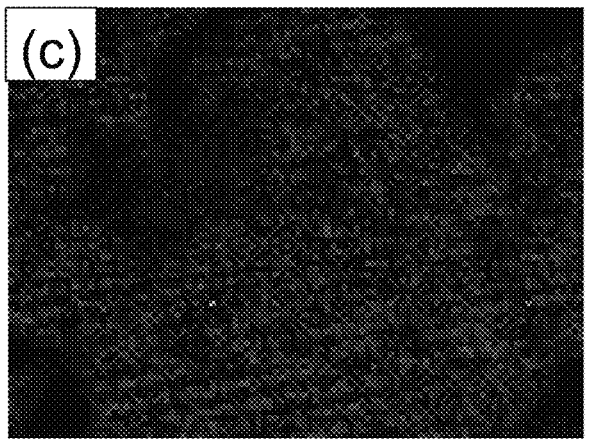
FIG. 4C is a mapping result of γ alumina by electron energy loss spectroscopy.
Figure 4D:
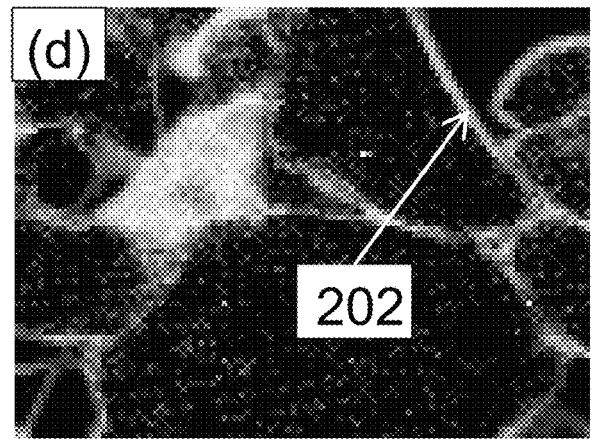
FIG. 4D is a mapping result of amorphous alumina by electron energy loss spectroscopy.

The results of film formation when α-alumina particles (AL160-SG manufactured by Showa Denko) are used as raw material particles and a stainless steel substrate is used as a base material in the manufacturing method described above are shown. The distance between the nozzle and the base material was 20 mm, the nozzle inner diameter was 10 mm, and argon was used as the plasma gas. The indicated value of the thermocouple at the film forming position was approximately 200° C. FIG. 4A to FIG. 4D are a scanning transmission electron microscope image of a cross section of the structure obtained at this time and a mapping diagrams of electron energy loss spectroscopy. That is, FIG. 4A is an annular dark-field image by a scanning transmission electron microscope. FIG. 4B shows a mapping result of α-alumina by electron energy loss spectroscopy, FIG. 4C shows a mapping result of γ-alumina by electron energy loss spectroscopy, and FIG. 4D is a mapping result of amorphous alumina by energy loss spectroscopy. The thickness of the sample was reduced to 80 nm, observed with a scanning transmission electron microscope, and an electron energy loss spectrum from the cross section was obtained. The identification of α-alumina, γ-alumina, and amorphous alumina was determined by performing a comparison and fitting with each reference data in the range of 75 eV to 90 eV in the electron energy loss spectrum. From this result, it can be seen that a three-dimensional network 202 of an amorphous alumina phase which is an activated phase having a thickness of about 20 nm is formed between the brittle material particles 201 (FIG. 4D). The gap between the particles is approximately 50 nm or less. As shown in the schematic diagram in FIG. 2, amorphous exists between particles of alumina, which is a brittle material, and has a cross-linking structure connecting brittle material particles. In addition, it was shown that the three-dimensional network 202 was a structure in which α-alumina as the brittle material particles 201 was present (FIG. 4A and FIG. 4D). At this time, as is apparent from FIG. 4C, no γ-alumina was contained.

Figure 5:
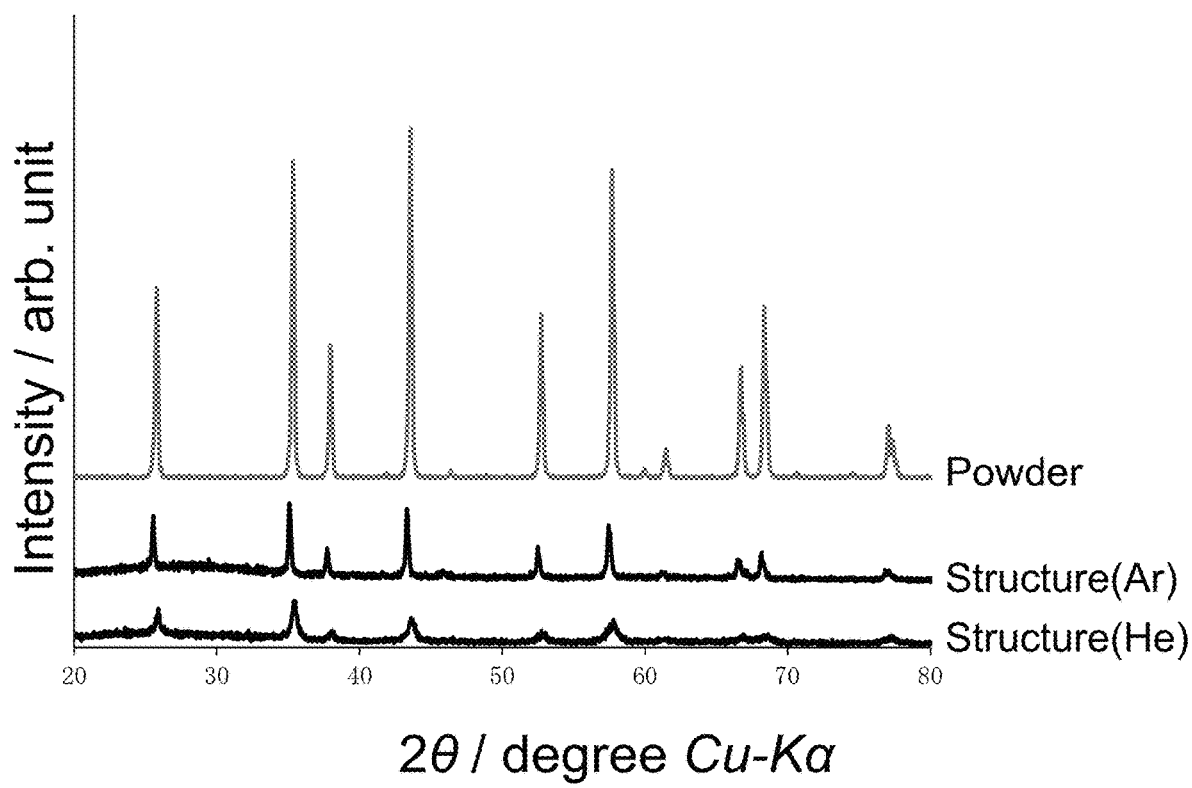
FIG. 5 is an x-ray diffraction result of raw material particles, a structure (argon gas), and a structure (helium gas) according to one embodiment of the present invention.

FIG. 5 shows an X-ray diffraction result when a structure is formed on a glass base material under the same conditions (structure (Ar)). For comparison, the results of X-ray diffraction of α-alumina particles (AL160-SG manufactured by Showa Denko) and the results of X-ray diffraction when helium gas was used as the plasma gas (structure (He)) are also shown. The crystal structures of the powders and structures were analyzed by X-ray diffraction (XRD, Rigaku RINT-2550V, CuKa, 40 kV, 200 mA). In the case where argon gas was used for the plasma gas (structure (Ar)) and the case where helium gas was used for the plasma gas (structure (He)), the same peak as that of the powder of α-alumina was observed. As the result of the electron energy loss spectroscopy, only α-alumina was observed, and γ-alumina was not observed. At this time, the crystallite size of the brittle material particles when argon gas was used as the plasma gas was about 50 nm when calculated using Scherrer's formula. When the crystallite size of the brittle material particles when helium gas was used as the plasma gas was calculated using Scherrer's formula, it was about 20 nm, and the crystallite size tended to be smaller than that of the raw material powder.

Film hardness was measured using hardness tester (SHIMADZU, DUH-211) in which a dynamic hardness tester is equipped with a Vickers indenter, and a Vickers hardness at this time was Hv300. The hardness of this structure corresponds to a value of about 0.2 with respect to the Vickers hardness of the brittle material particles.

Comparative Example 1

FIG. 6 shows a scanning transmission electron microscope image of a cross section of α-alumina particles (AL160-SG3 manufactured by Showa Denko) as raw material particles. The X-ray diffraction result of the raw material particles was α-alumina as shown in FIG. 5. Parallel lattice fringes can be observed up to the outermost surface 303a and the outermost surface 303b of the alumina particles 301 exhibiting crystallinity, and it is clear that the surface is crystalline and amorphous alumina is not present in the initial raw material powder. Even if such raw material particles were laminated as they were, the particles did not bond with each other, resulting in only a green compact.

Comparative Example 2

Figure 7:
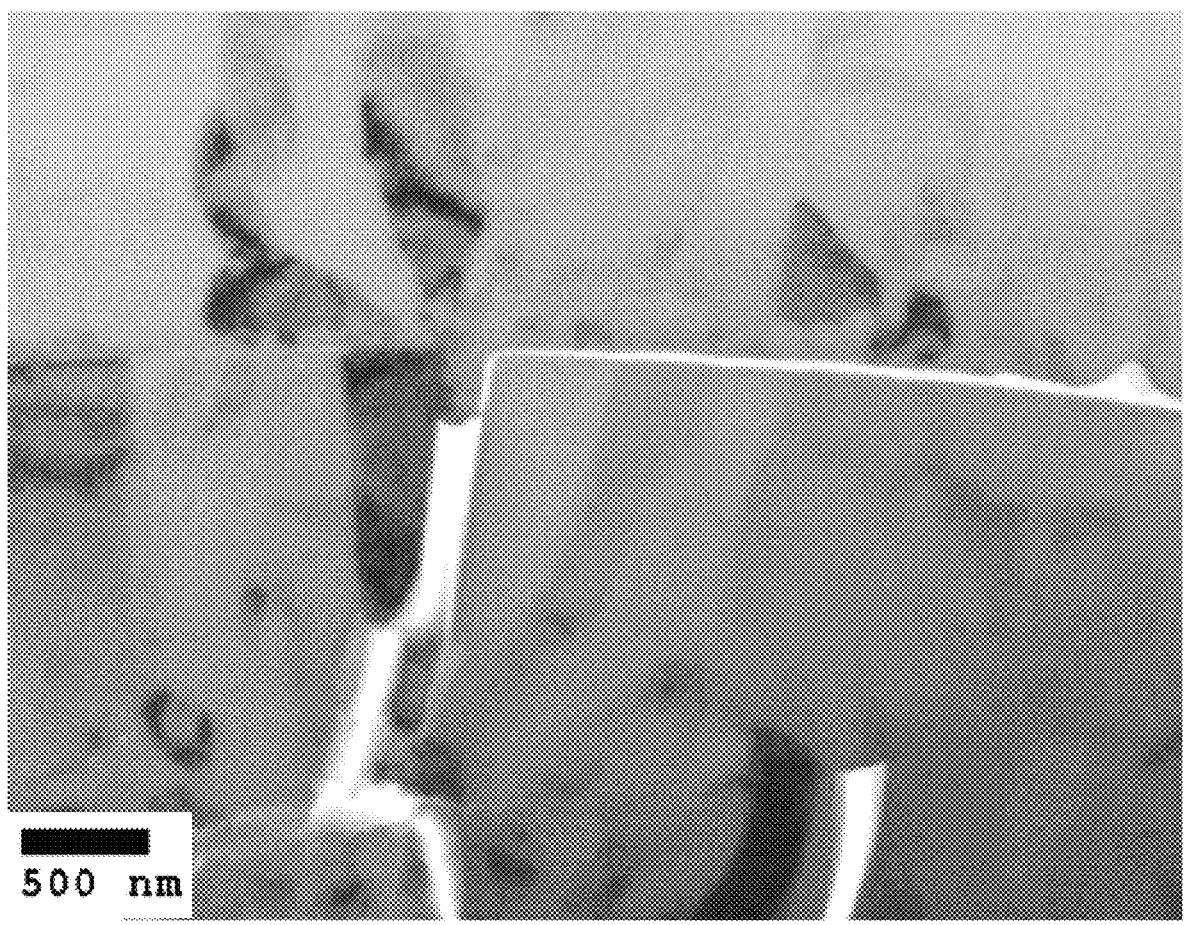
FIG. 7 is a transmission electron microscope image of a cross section of a thermal sprayed alumina membrane.

FIG. 7 shows a scanning transmission electron microscope image of a cross section of the structure obtained when α-alumina particles (manufactured by Fujimi Incorporated) are sprayed by ordinary plasma spraying. Since the inside of the particles is melted by the plasma and flattened at the time of collision, the brittle material particles which form the particles take an anisotropic shape which is flattened in the direction of collision, and an isotropic structure cannot be formed. In addition, it can be seen that, because of rapid cooling and solidification due to heat removal to the base material, crystal growth occurs in each brittle material particle parallel to the heat removal direction. As a result of electron energy loss spectroscopy and X-ray diffraction, the brittle material particles were γ-alumina, having a different crystal structure from the initial raw material brittle material particles, and could not maintain the initial crystal structure.

Example 2

Figure 8:
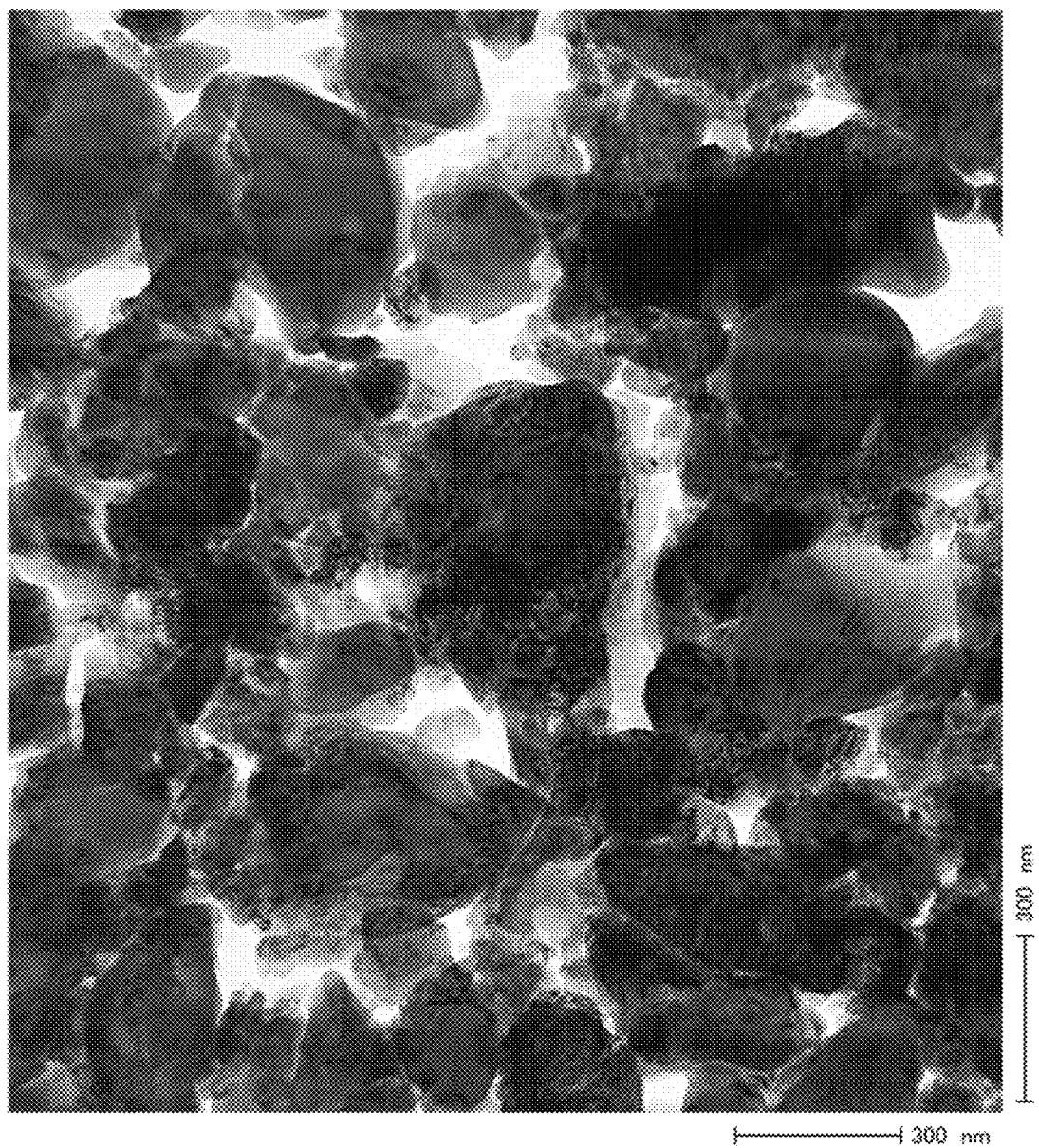
FIG. 8 is a transmission electron microscope image of a cross section of a structure according to one embodiment of the present invention.

Yttria-stabilized zirconia particles (8% by weight, manufactured by DAIICHI KIGENSO KAGAKU KOGYO CO., LTD., average particle size: 3 μm) were used as raw material particles, and a stainless steel base material was used as a base material. The plasma was generated at a power of 6 kW by flowing 10 SLM of argon gas. At this time, the pressure in the film forming chamber was about 400 Pa. The distance between the nozzle and the base material was 200 mm, and the inner diameter of the nozzle was 27 mm. FIG. 8 is a scanning transmission electron microscope image of a cross section of the structure obtained at this time. It can be seen that the structure is the same as that of the first embodiment. The Vickers hardness of the structure of Example 2 was 620 Hv, because the powder was not simply a compact and the particles were similarly bonded in a three-dimensional network structure. This value corresponds to a relative hardness of about 0.5 with respect to a Vickers hardness of the brittle material particles.

Comparative Example 3

The structure was formed under the conditions of Example 2 except that the pressure was 2 kPa, and the resulting structure was a green compact.

Example 3

The procedure was performed under the conditions of Example 1 except that the gaseous species was changed to helium. According to the X-ray diffraction result (FIG. 5) of the obtained structure, it was α-alumina, and the Vickers hardness was 1230 Hv. This value corresponds to a value of about 0.7 to 0.8 with respect to the Vickers hardness of the brittle material particles.

Example 4

Figure 9:
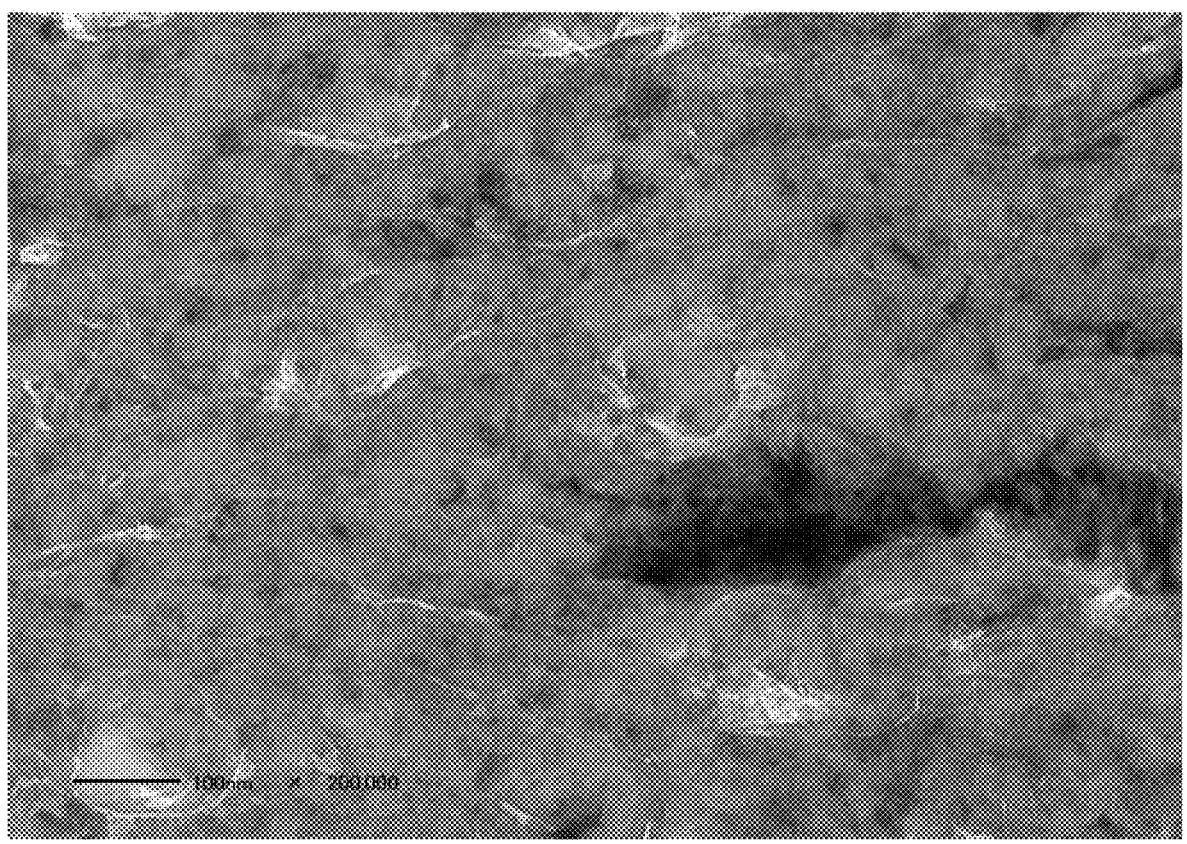
FIG. 9 is a transmission electron microscope image of a cross section of a structure according to one embodiment of the present invention.

FIG. 9 shows a transmission electron microscope image of the structure obtained under the same conditions. The base material surface is present on the lower side of the figure, and the shape of the brittle material particles flattened in the direction perpendicular to the base material can be formed while the basic structure was maintained by combining the main brittle material particles of the structure of Example 4 with the room temperature impact solidification phenomenon using energy at the time of collision, and densification can be achieved.

Example 5

Figure 10:
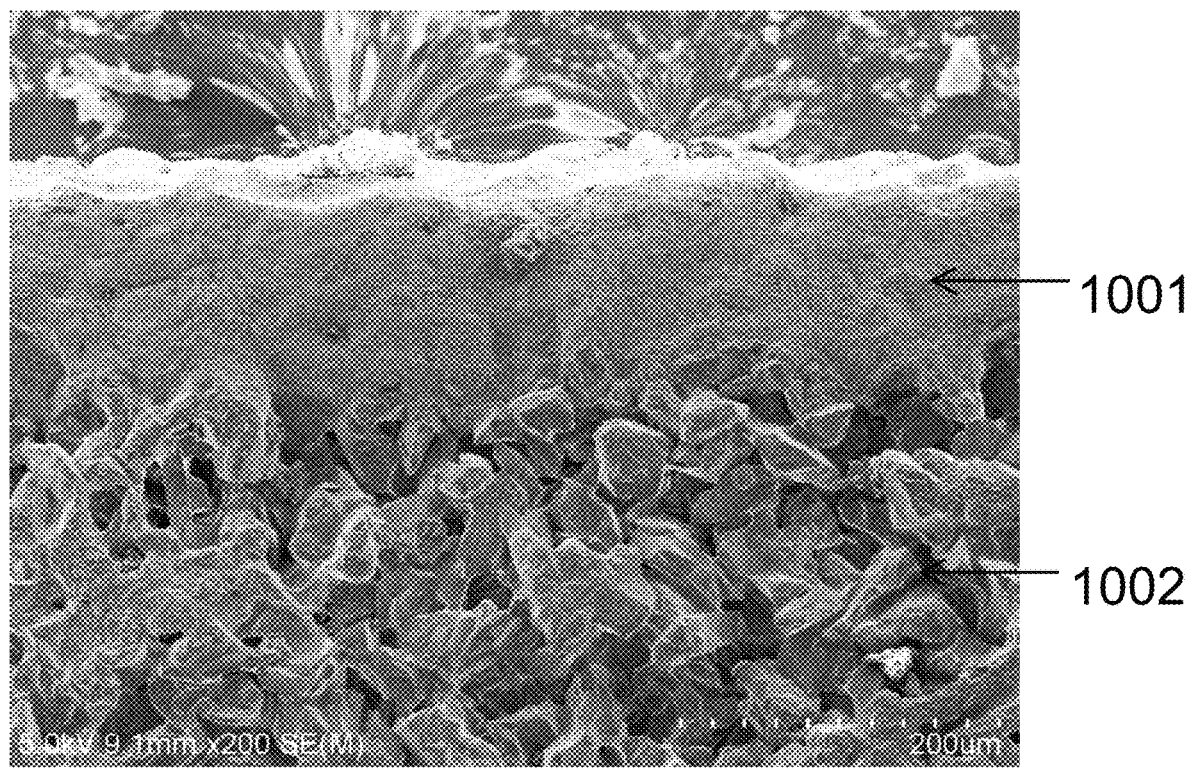
FIG. 10 is a scanning electron microscope image of a cross section of a laminate according to one embodiment of the present invention.

The results of film formation when α-alumina particles (AL160-SG3 manufactured by Showa Denko) are used as the raw material particles and a porous ceramic base material having an average pore diameter of 20 μm is used as the base material in the above manufacturing method are shown. Plasma was generated at a power of 1 kW by flowing 10 SLM of argon gas. FIG. 10 shows a cross-sectional scanning electron microscope image of a laminate in which a brittle material structure 1001 is deposited on a porous base material 1002. It can be seen from the structure of Example 5 that a sealing structure of a porous base material was produced.

Example 6

Yttria-stabilized zirconia particles (8% by weight, manufactured by DAIICHI KIGENSO KAGAKU KOGYO CO., LTD., average particle size: 5 μm) were used as raw material particles, and a stainless steel base material was used as a base material. The plasma was generated at a power of 6 kW by flowing 10 SLM of argon gas. At this time, the pressure in the film forming chamber was about 300 Pa. The distance between the nozzle and the base material was 200 mm, and the inner diameter of the nozzle was 27 mm. The Vickers hardness of the structure of Example 6 was about 940 Hv or more and 1400 Hv or less. This value corresponds to a relative hardness of about 0.7 or more and 1.1 or less with respect to the Vickers hardness of the brittle material particles.

Example 7

The film formation results when α-alumina particles (AL160-SG manufactured by Showa Denko) are used as the raw material particles are shown. The distance between the nozzle and the base material was 20 mm, the nozzle inner diameter was 10 mm, and argon was used as the plasma gas. The insulation characteristics of the structure were measured by a two-terminal method by depositing a gold electrode (1 mm$^2$) on the structure by a sputtering method using an apparatus (Model No. 6252 Rev. C) manufactured by TOYO Corporation. The volume resistivity was $10^{12}$ Ω·cm or more and $10^{15}$ Ω·cm or less, and the withstand voltage was 50 kV/mm or more and 200 kV/mm or less Example 8

Helium was used as the plasma gas under the same conditions as in Example 7. The insulation characteristics of the structure were measured by a two-terminal method by depositing a gold electrode (1 mm$^2$) on the structure by a sputtering method using an apparatus (Model No. 6252 Rev.

C) manufactured by TOYO Corporation. The volume resistivity was $10^{12}$ Ω·cm or more and $10^{15}$ Ω·cm or less, and the withstand voltage was 100 kV/mm or more and 300 kV/mm or less.

Figure 36:
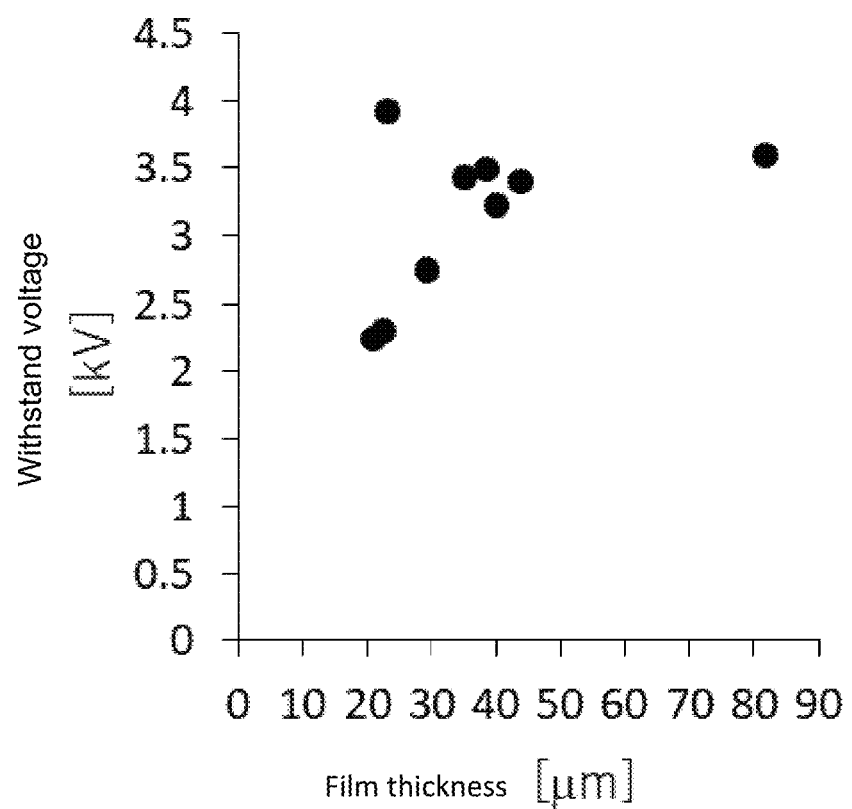
FIG. 36 is a diagram showing the relationship between film thickness and withstand voltage of a structure according to an example of the present invention manufactured using argon gas (gas flow rate 20 L/min).

Furthermore, the withstand voltage test can be performed with direct current or alternating current and in this example, even when argon gas is used, the structure in which the coating layer is laminated can be realized with more than 20 kV/mm of the withstand voltage in both direct current and alternating current measurements. For example, when the gas flow rate was set to 20 L/min and the plasma power was set to 0.5 kW to 2 kW using argon gas, a withstand voltage of 2 kV or more was exhibited even with a film thickness of about 20 μm (FIG. 36). A structure having a high compressive residual stress is formed with the collision crushing of the fine particles (crystal refining). As a result, a structure having a higher insulating property than a bulk alumina sintered body generally showing an electric field strength of 12 to 15 kV/mm is formed.

The structure according to one embodiment of the present invention can secure a high withstand voltage of 1 kV or more, preferably 2 kV or more, even if the insulating layer is formed of a thin coating layer having a thickness of 50 μm or less. As a result, by using the structure according to the example of the present invention, it is possible to form a high-withstand-voltage circuit board having a lower thermal resistance (good heat dissipation) than a bulk material or a thermal sprayed coating. It is suitable as a heat dissipation board for vehicle-mounted power modules and high power LEDs.

Figure 21A:
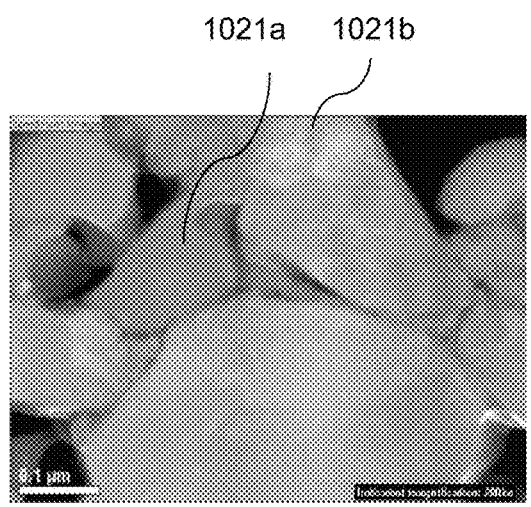
FIG. 21A shows a scanning transmission electron microscope image of fine particles according to an example of the present invention.
Figure 21B:
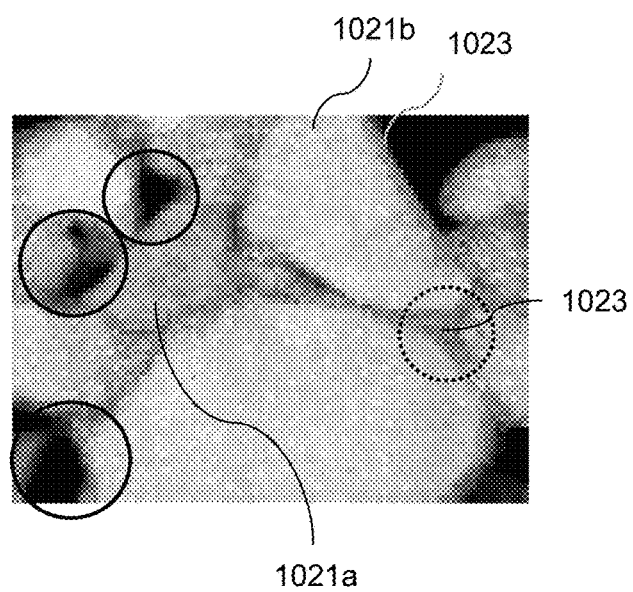
FIG. 21B shows a mapping diagram of an electron energy loss spectroscopic method.

FIG. 21A and FIG. 21B are a scanning transmission electron microscope image and electron energy loss spectroscopy mapping of fine particles in a structure showing the characteristics of a structure according to one example of the present invention when α-$Al_2O_3$ is used as the raw material fine particles. FIG. 21A shows a scanning transmission electron microscope image of the fine particles, and FIG. 21B shows a mapping diagram of electron energy loss spectroscopy. For comparison with the fine particles in the structure, a surface observation image using the raw material fine particles described above is shown in FIG. 22A and FIG. 22B. The raw material fine particles $Al_2O_3$ are generally brittle materials having a high melting point of 2000° C. or higher which makes the α phase most stable. Further, when melted $Al_2O_3$ is rapidly solidified as in a conventional thermal spraying method, $Al_2O_3$ having a γ phase is included in the structure. The fine particles 1021a and 1021b in the structure shown in FIG. 21 have an α phase as a main phase similar to α-$Al_2O_3$ used as a starting material shown in FIG. 21A and FIG. 21B. The active region 1023 is generated as observed as an amorphous phase in which the entire outmost layer of the fine particles was about 30 nm. In the fine particles 1021a shown in FIG. 21A and FIG. 21B, since an amorphous phase is provided in the fine particle surface layer, the active region 1023 including the amorphous phase which does not contribute to the joining of the fine particle surface layer which does not join to other fine particles is observed. For example, a space existing in the structure, such as a space indicated by a black frame in FIG. 21B, is surrounded by an active region 1023 including an amorphous phase formed on the surface layer of the fine particles. Furthermore, as shown by a dotted line in FIG. 21B, for example, in a dense structure, fine particles are closely adjacent to each other, and the entire periphery thereof is surrounded by an active region 1023 including an amorphous phase of the fine particles. In the fine particles 1021b shown in FIG. 21A and FIG. 21B, since the active region 1023 including the amorphous phase is arranged on the fine particle surface layer, the amorphous phase is observed to surround the fine particles. However, in this example, since only the α phase was observed without including the γ phase inside the fine particles, the fine particles were not affected by heat. By comparing FIGS. 21A and 21B and FIGS. 22A and 22B, the fine particles 1021 generate the active region 1023 during the process of forming the structure, and the fact that the fine particles are joined to each other through the active region is indicated in the joining region of fine particles in FIG. 17. In the case when an active region 1023 is generated on the surface layer of the fine particles 1021 by plasma or the like and the fine particles are joined to each other via the active region 1023, for example, there are three adsorbed waters (physical adsorbed water, chemically adsorbed water, surface hydroxyl group), and by removing the surface hydroxyl group released at 1000° C. or higher, an electronically excited active region 1023 including an amorphous phase observed in FIG. 21A and FIG. 21B can be obtained. In addition, the structure of the present example can be obtained by activating the fine particles by a heat source such as plasma at 2000° C. or lower, which is lower than the melting point temperature of $Al_2O_3$, or within a contact time in which alumina does not melt.

Figure 23A:
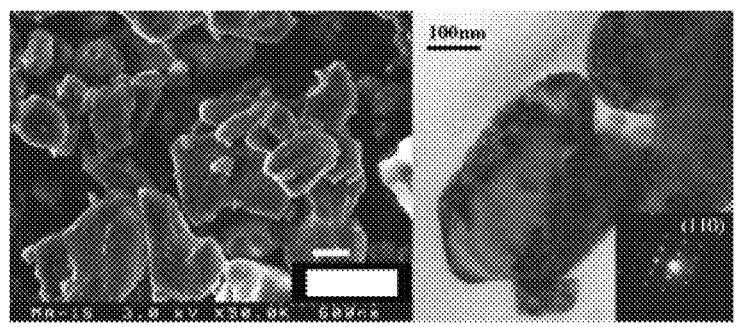
FIG. 23A shows α-$Al_2O_3$ used as a starting raw material according to an example of the present invention.
Figure 23B:
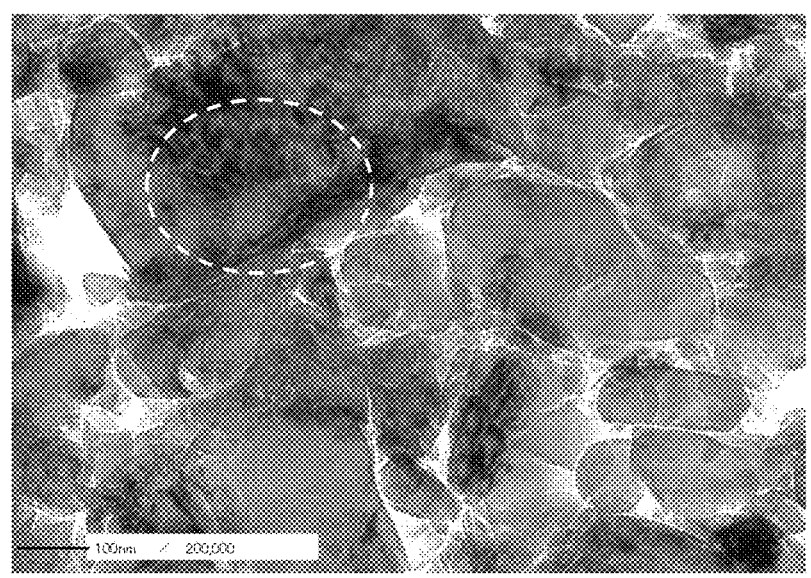
FIG. 23B shows a cross-sectional transmission electron microscope image of the structure according to the present invention formed using fine particles.
Figure 23C:
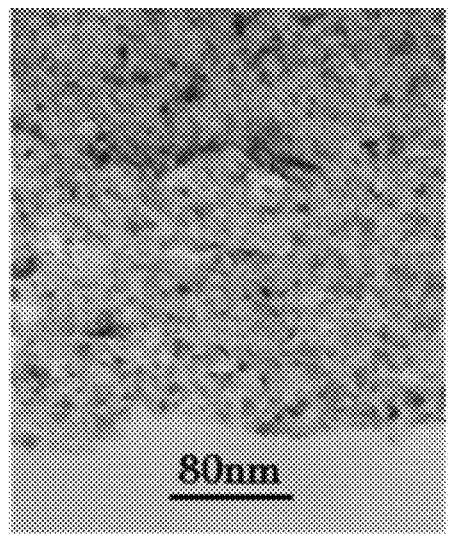
FIG. 23C shows a cross-sectional transmission electron microscope image of a structure formed by an aerosol deposition method using a starting raw material as a comparison.

FIG. 23A and FIG. 23B show α-$Al_2O_3$ used as a starting material (FIG. 23A), a cross-sectional transmission electron microscope image of a structure according to the present invention formed using fine particles (FIG. 23B), and a comparison. A cross-sectional transmission electron microscope image (FIG. 23C) of a structure formed by aerosol deposition using a starting material is shown. In this example, the fine particles have an active region containing an amorphous phase as described above, and the case where the crystallite diameter of the starting material is maintained, in addition to the case described above, miniaturization of fine particles such as in the aerosol deposition may occur. When forming the structure of the present example, when a large amount of kinetic energy is used in the ratio of the surface activation energy of the fine particles to the kinetic energy of the fine particles, displacements are introduced into the crystal grains by collisional crushing of the fine particles (crystal refining). In addition, a high compressive residual stress is applied to the joining between the fine particles, and a high-density structure in which the joining between the fine particles is strengthened can be obtained. In a part surrounded by a broken line in FIG. 23B, displacements are introduced into crystal grains by collisional crushing of the fine particles (crystal refining), and a high compressive residual stress is applied to the joining between the fine particles. Distortion inside the fine particles is observed, indicating that the joining between them has been strengthened. The crystallite diameter of the fine particles contained in the structure shown in FIG. 23B (for example, the part of FIG. 23B surrounded by a dotted line) indicates that the crystallite diameter is reduced due to the collision pressure against the fine particles. However, enlargement of the crystallite diameter due to heat cannot occur. In addition, since the collision crushing (crystal refining) of the fine particles due to the collision pressure is mitigated by the active region including the amorphous phase given to the fine particle outmost layer, the collision crushing (crystal refining) of the fine particles does not proceed as much as in the aerosol deposition method using only the collision pressure to be compared and referred. Therefore, the crystallite diameter of the fine particles in the structure according to the present example does not increase with respect to the fine particles as the starting material, and has a crystallite diameter of 1 nm to 300 nm.

Example 9

In order to form the structure according to the present invention, an example in which $\alpha$-$Al_2O_3$ is used for the fine particles and SUS304 is used for the base material to form the structure in a reduced pressure environment is explained. Helium gas was used as the gaseous species that aerosolizes fine particles, feeds and transports them, generates non-equilibrium plasma that activates the surface of the fine particles at a temperature below melting point, and accelerates and ejects fine particles that serve as impact forces on the base material. The high-frequency input power for generating non-equilibrium plasma was in the range of 0.5 to 2 kW. The hardness of the structure was measured using a hardness tester in which a dynamic hardness tester (SHIMADZU DUH-211) is equipped with a Vickers indenter.

Figure 24A:
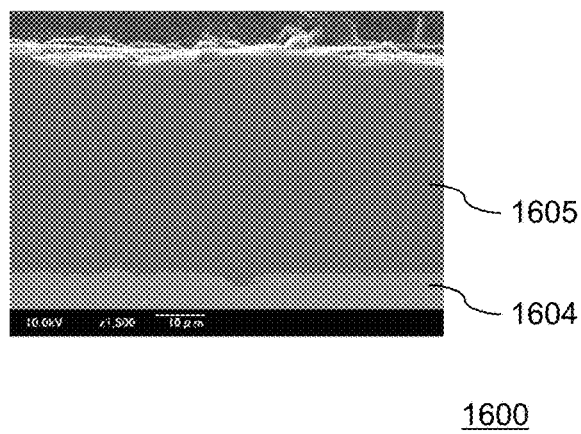
FIG. 24A shows a cross-sectional SEM image of a structure invention 1600 according to an example of the present invention.
Figure 25:
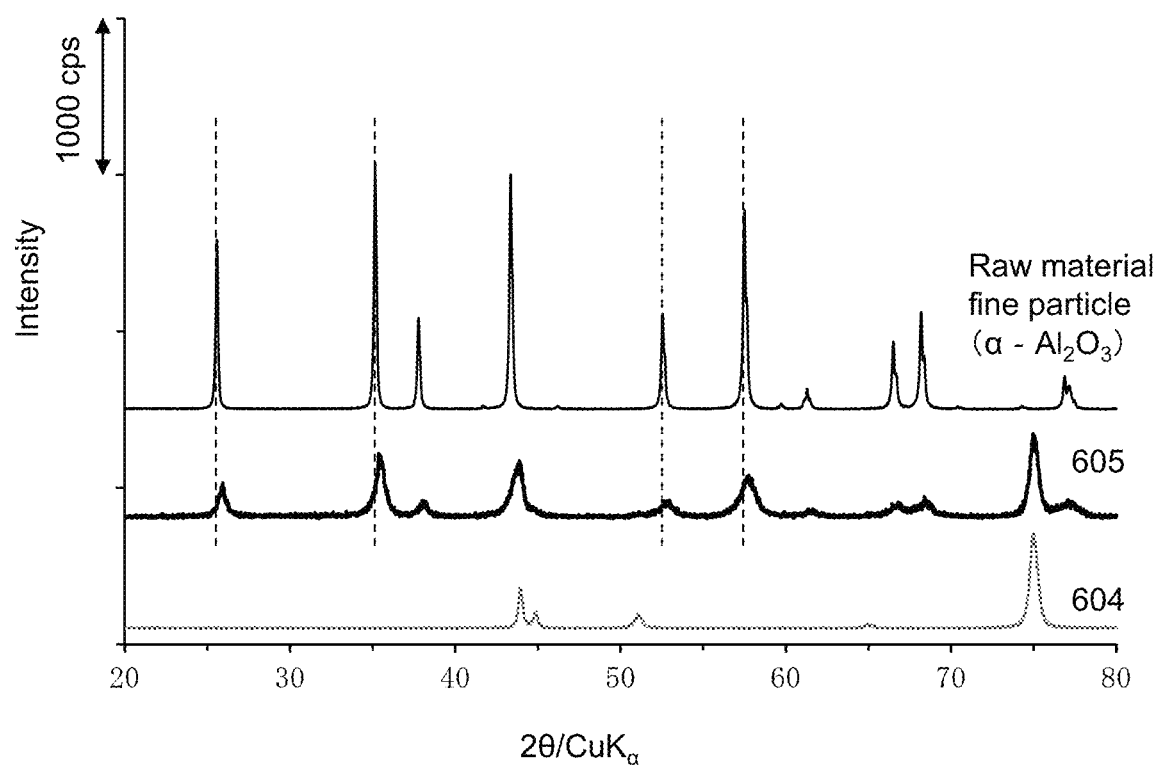
FIG. 25 shows an x-ray diffraction pattern of a structure 1600 according to one example of the present invention.

FIG. 24A shows a cross-sectional scanning electron microscope (SEM) image of the obtained structure 1600. In the structure 1600, it was observed that a coating layer 1605 was formed on a base material 1604. FIG. 25 shows an X-ray diffraction pattern of the obtained structure. No peak due to the γ phase was observed in the X-ray diffraction pattern of the structure 1600. The raw material fine particles ($\alpha$-$Al_2O_3$) were not melted because they were not heated to a temperature of about 2000° C. or higher which is the melting point of the fine particles and were not rapidly cooled, that is, they did not undergo any crystal phase transformation, so that the fine particles in the obtained structure 1600 were not converted to the γ phase. A structure maintaining the crystal structure of the α phase of the raw material fine particles was formed, and a dense coating layer 1605 made of $\alpha$-$Al_2O_3$ having a thickness of about 50 μm was formed on SUS304 as the base material 1604. The crystallite diameter in the obtained structure 1600 was about 30 nm when estimated using the Scherrer formula for calculating the crystallite diameter using the peak width of the X-ray diffraction pattern. The Vickers hardness of the obtained structure was from Hv700 to Hv1300.

Figure 28:
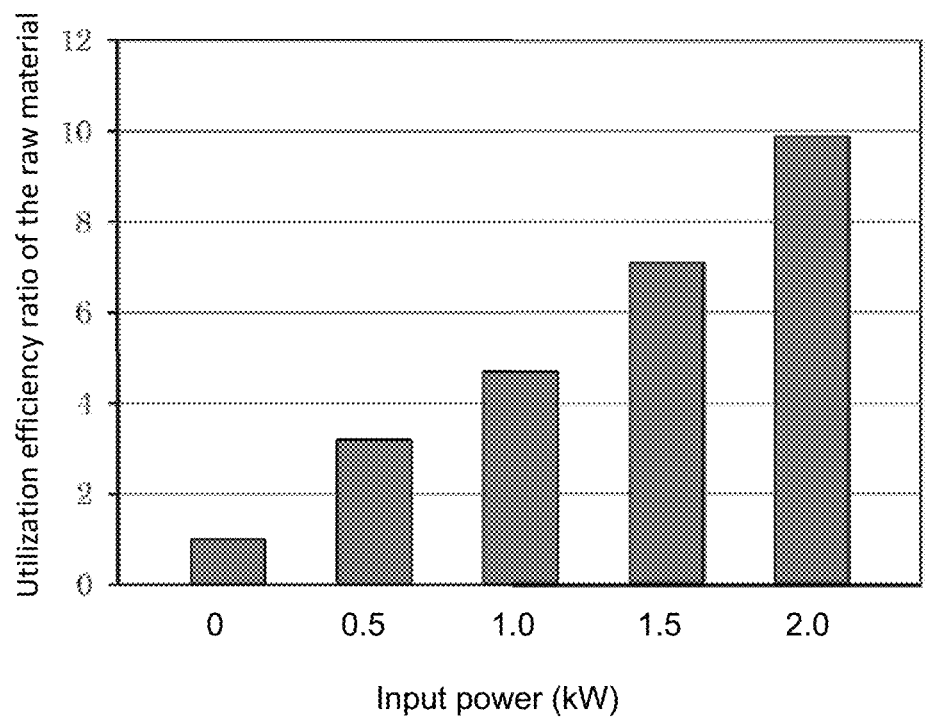
FIG. 28 shows a usage efficiency ratio of raw fine particles according to an example of the present invention.

FIG. 28 shows the utilization efficiency ratio of the raw material fine particles in Example 9. The utilization efficiency of the raw material fine particles was calculated using the weight of the used raw material fine particles as a denominator and the weight of the base material increased by forming the structure as a numerator. As is shown in FIG. 28, by utilizing the non-thermal equilibrium plasma and activating the surface layer of the fine particles at a temperature lower than the melting point, the utilization efficiency of the fine particles forming the structure 1600 is improved by 10 times.

Example 10

In order to form the structure according to the present invention, an example in which $\alpha$-$Al_2O_3$ is used for fine particles and SUS304 is used for the base material to form the structure in a reduced pressure environment is explained. Argon gas was used as the gaseous species that aerosolizes fine particles, feeds and transports them, generates non-equilibrium plasma that activates the surface of the fine particles at a temperature below the melting point, and accelerates and ejects fine particles that serve as impact forces on the base material. The high-frequency input power for generating non-equilibrium plasma was in the range of 0.5 to 2 kW. The hardness of the structure was measured using a hardness tester in which a dynamic hardness tester (SHIMADZU DUH-211) is equipped with a Vickers indenter.

Figure 24B:
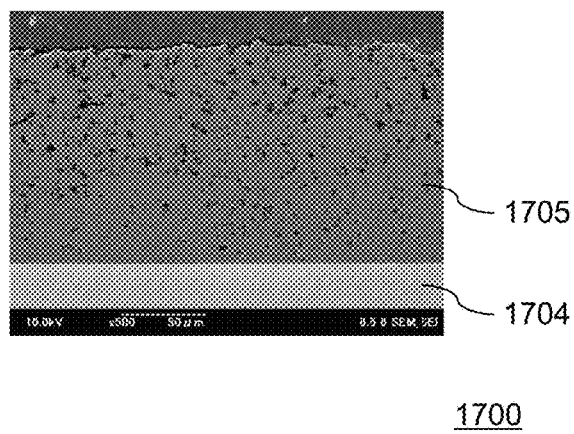
FIG. 24B shows a cross-sectional SEM image of the structure 1700 according to one example of the present invention.
Figure 26:
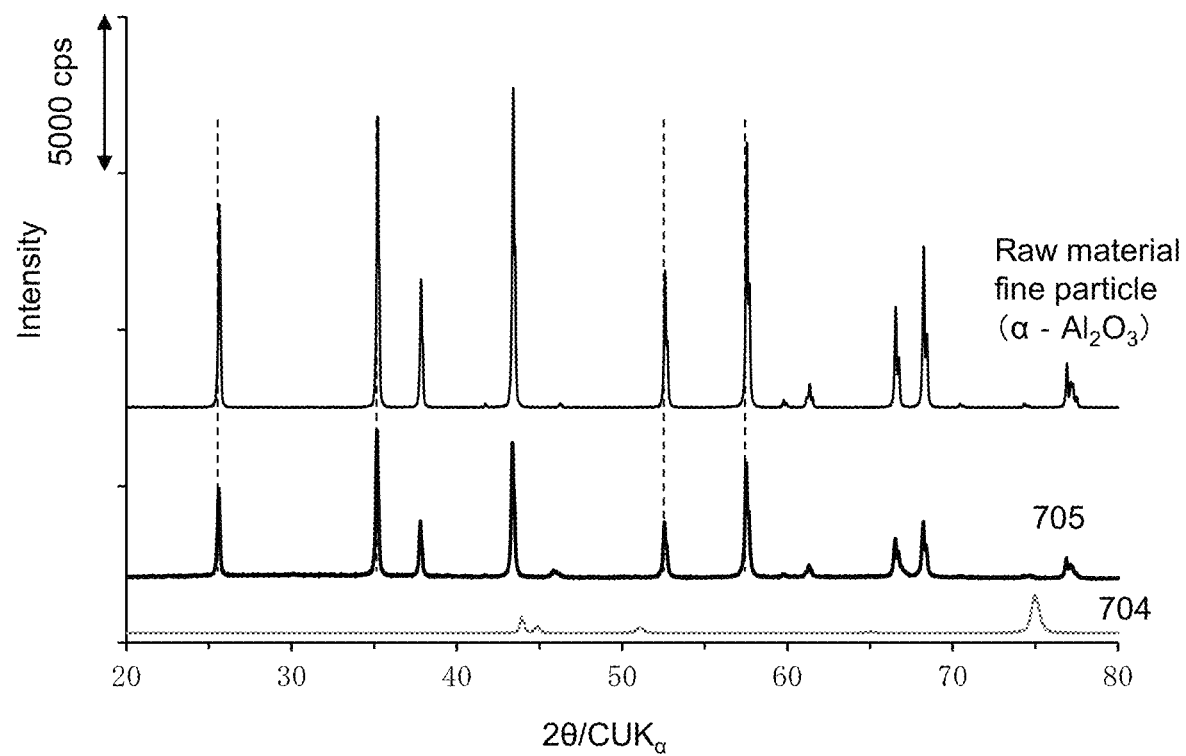
FIG. 26 shows an x-ray diffraction pattern of a structure 1700 according to one example of the present invention.
Figure 29:
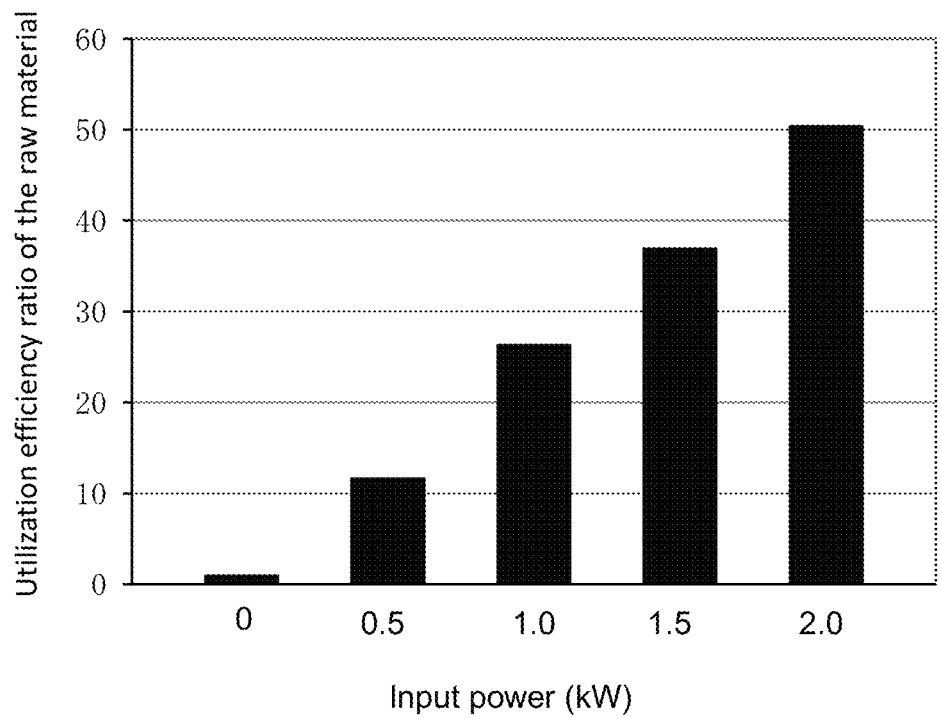
FIG. 29 shows a usage efficiency ratio of raw fine particles according to an example of the present invention.

FIG. 24B shows a cross-sectional SEM image of the obtained structure 1700. In the structure 1700, it was observed that the coating layer 1705 was formed on the base material 1704. FIG. 26 shows an X-ray diffraction pattern of the obtained structure. No peak due to the γ phase was observed in the X-ray diffraction pattern of the structure 1700. The raw material fine particles ($\alpha$-$Al_2O_3$) were not melted because they were not heated to a temperature of about 2000° C. or more, which is the melting point of the fine particles, and were not rapidly cooled, so that the fine particles in the obtained structural body 1700 did not undergo a crystal transformation and were not converted into the γ phase. That is, a structure maintaining the crystal structure of the α phase of the raw material fine particles was formed, and a coating layer 1705 made of $\alpha$-$Al_2O_3$ having a thickness of about 150 μm was formed on SUS304 as the base material 1704. The crystallite diameter in the obtained structure 1700 was about 70 nm, which was estimated using the Scherrer formula for calculating the crystallite diameter using the peak width of the X-ray diffraction pattern. The Vickers hardness of the obtained structure was from Hv300 to Hv900. FIG. 29 shows the utilization efficiency ratio of the raw material fine particles in Example 10. The utilization efficiency of the raw material fine particles was calculated using the weight of the used raw material fine particles as a denominator and the weight of the base material increased by forming the structure as a numerator. As is shown in FIG. 29, by utilizing the non-thermal equilibrium plasma and activating the surface layer of the fine particles at a temperature lower than the melting point, the utilization efficiency of the fine particles forming the structure 1700 is improved by 50 times.

Figure 27:
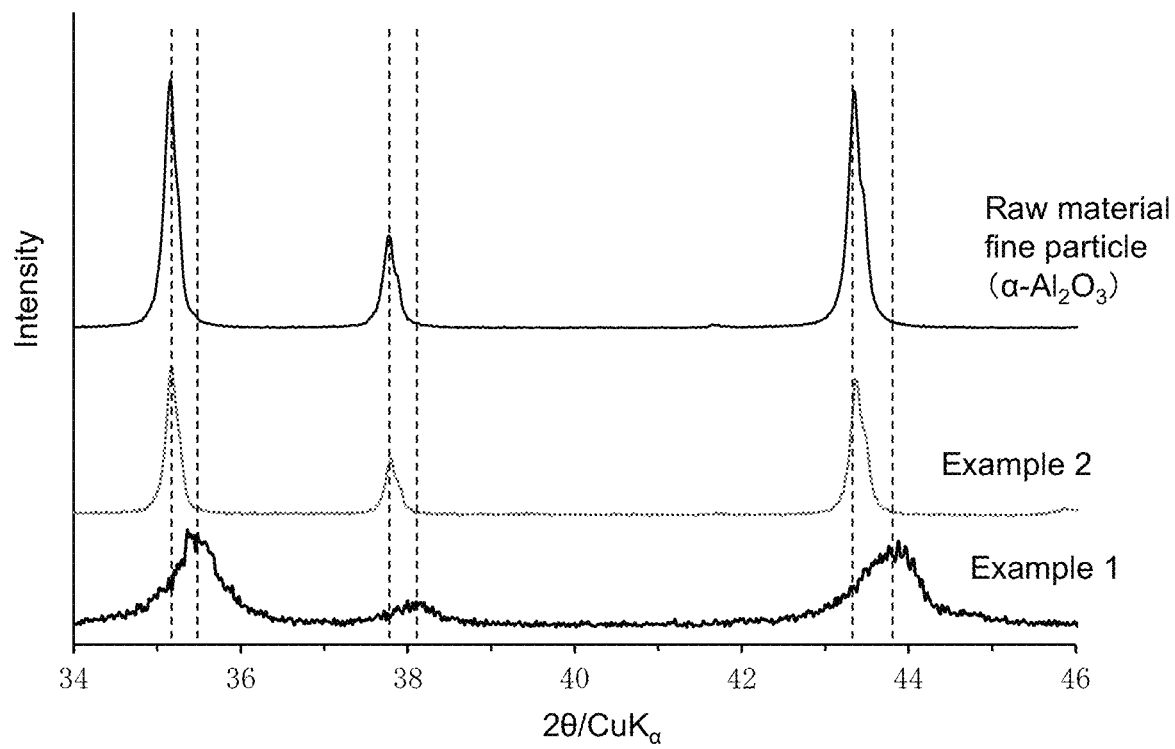
FIG. 27 shows an x-ray diffraction pattern of diffraction of a structure obtained by Example 9 and Example 10.

FIG. 27 shows the X-ray diffraction patterns of the structures obtained in Example 9 and Example 10. All the $\alpha$-$Al_2O_3$ peaks in the X-ray diffraction patter of the structure 1600 of Example 9 are shifted to the wide-angle side. On the other hand, in Example 10, the aforementioned shift of the $\alpha$-$Al_2O_3$ peak was not observed. In the X-ray diffraction patter described above, in Example 9, it is considered that the $\alpha$-$Al_2O_3$ peak was shifted to the wide-angle side because the compressive stress introduced into the inside of the structure and the crystal lattice spacing in the fine particles was narrowed. An increase in compressive stress was confirmed. On the other hand, in Example 10, a large shift of the $\alpha$-$Al_2O_3$ peak toward the wide-angle side as in Example 9 was not observed, and it was confirmed that the internal stress was smaller than that in Example 9.

Example 11

According to the present invention, a structure obtained when joining between fine particles by the joining region through the active region including the amorphous phase given to the surface of the fine particle or the surface of the base material is performed, and the displacements are introduced into the inside of the crystal grain by the joining between the fine particles by the collision crushing (crystal refining) of the fine particle and a high compressive residual stress is applied to the bonding between fine particles to strengthen the bonding between fine particles is explained, and an example in which the Vickers hardness and electrical properties of the structure are measured is explained. Since in general, the higher the density of a structure, the higher the Vickers hardness and the electrical properties, the Vickers hardness is used as an indicator presents density in the example. The Vickers hardness of a structure formed in a reduced pressure environment using α-Al$_2$O$_3$ as fine particles and SUS304 as a base material is described. The hardness of the structure was measured using a hardness tester in which a dynamic hardness tester is equipped with a Vickers indenter (SHIMADZU, DUH-211). The electrical properties of the structure were measured using a two-terminal method by depositing a gold electrode (1 mm$^2$) on the structure by sputtering using an apparatus (Model 6252 Rev. C) manufactured by TOYO Corporation. Helium gas and argon gas were used as gaseous species that aerosolizes fine particles, feeds and transports them, generates non-equilibrium plasma that activates the surface of the fine particles at a temperature below the melting point, and accelerates and ejects fine particles that serve as impact force on the base material. Table 1 summarizes the Vickers hardness of the obtained structure, the gas flow rate, the plasma power, and the temperature in the manufacturing part 2107 for the structure of the fine particles measured using a thermocouple when the structure was obtained. Table 2 summarizes the volume resistance and withstand voltage as electrical properties of the obtained structure.

TABLE 1

| Gaseous species | Supplied power [kW] | Gas flow rate [L/min] | Temperature [° C.] | Vickers hardness |
|---|---|---|---|---|
| He | 2 | 10 | 300 | 700 |
|  | 1.5 | 10 | 200 | 900 |
|  | 1 | 10 | 150 | 1100 |
|  |  | 5 | 125 | 800 |
|  | 0.5 | 10 | 125 | 1300 |
|  |  | 5 | 100 | 700 |
| Ar | 2 | 10 | 1300 | 200 |
|  | 1.5 | 10 | 1000 | 250 |
|  | 1 | 20 | 300 | 900 |
|  |  | 15 | 500 | 700 |
|  |  | 10 | 400 | 500 |
|  |  | 5 | 500 | 300 |
|  | 0.5 | 10 | 300 | 750 |

TABLE 2

| Gaseous species | volume resistance Ω · cm | Withstand voltage kV/mm |
|---|---|---|
| He | 10$^{12}$-10$^{15}$ | 100-300 |
| Ar | 10$^{12}$-10$^{15}$ | 50-200 |

As is described in Table 1, the temperature of helium gas is lower than that of argon gas. In addition, helium gas has a higher flight speed when the fine particles described above are accelerated and ejected than when argon gas is used. Here, the higher the temperature is, the higher the surface activation energy of the active region given to the outmost layer of the fine particles is, and the joining between the fine particles or the joining between the fine particles and the base material is promoted. In addition, as the flying speed of the fine particles increases, the kinetic energy of the fine particles increases, and the compressive stress applied to the finer particles and the joining region increases. As shown in Table 1, a dense structure was formed by the total of the surface activation energy and the kinetic energy. For example, in Table 1, when the gaseous species is helium gas, the gas flow rate is 10 L/min, the plasma power is 0.5 kW, a structure is formed having high compressive residual stress accompanied by collision crushing of fine particles (crystal refining). As a result, a structure having a high Vickers hardness is formed. For example, in Table 1, when the gaseous species is argon gas, the gas flow rate is 10 L/min, the plasma power is 2 kW, and the joining between the fine particles is strengthened by the surface activation energy of the fine particles, and a structure having a compressive residual stress is formed. As a result, a structure having a low Vickers hardness was formed. When helium gas was used, the structure had a withstand voltage of 100 kV/mm or more and 300 kV/mm or less. When an argon gas was used, the withstand voltage of the structure was 50 kV/mm or more and 200 kV/mm or less. As an example, a structure in which a coating layer is laminated may be formed. The withstand voltage test can be performed with direct current or alternating current. In the present example, even when argon gas is used, the structure in which the coating layer is laminated can have a withstand voltage of 20 kV/mm or more in both a direct current and alternating current measurement. For example, when the gas flow rate was set to 20 L/min and the plasma power was set to 0.5 kW to 2 kW using argon gas, a withstand voltage of 2 kV or more was exhibited even with a film thickness of about 20 μm (FIG. 36). A structure having a high compressive residual stress is formed with the collision crushing of the fine particles (crystal refining). As a result, a structure having a higher insulating property than a bulk alumina sintered body generally showing an electric field strength of 12 to 15 kV/mm is formed.

The structure according to the present invention can ensure a high withstand voltage of 1 kV or more, preferably 2 kV or more, even if an insulating layer is formed of a thin coating layer having a thickness of 50 μm or less. Therefore, by using the structure according to the present invention, it is possible to form a high-withstand-voltage circuit board having a lower thermal resistance (good heat dissipation) than a bulk material or a thermal spray coating, and it is suitable as a heat dissipation base material for a vehicle-mounted power module or a high-power LED.

Example 12

An example in which the structure of the present invention is formed using α-Al$_2$O$_3$ as the fine particles and a ceramic porous base material having an average pore diameter of 20 μm as the base material is explained. Argon gas was used as the gaseous species that aerosolizes fine particles, feeds and transports them, generates non-equilibrium plasma that activates the surface of the fine particles at a temperature below the melting point, and accelerates and ejects fine particles that serve as impact forces on the base material. The high frequency input power for generating non-equilibrium plasma was 1 kW.

Figure 30A:
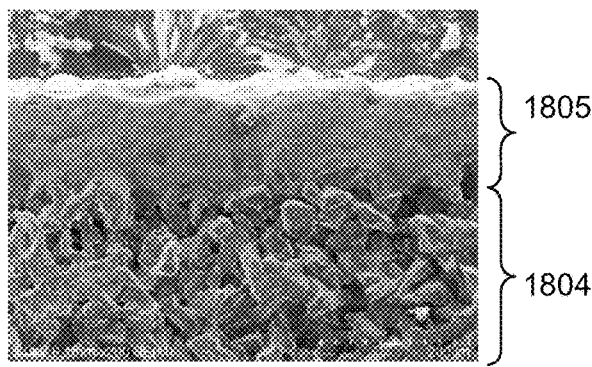
FIG. 30A shows a cross-sectional image of the structure 1800 using a porous ceramic as the base material 1804 by a scanning transmission electron microscope according to one example of the invention.
Figure 30B:
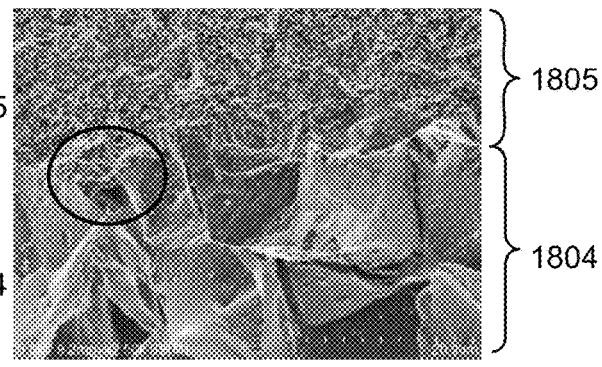
FIG. 30B is an enlarged view of FIG. 30A.

FIGS. 30A and 30B show a cross-sectional image of a structure 1800 using the porous ceramic of Example 12 as the base material 1804 by a scanning transmission electron microscope. FIG. 30B is an enlarged view of FIG. 30A. As is shown in FIGS. 30A and 30B, even on a base material having a surface shape which is difficult to form a structure in the past, a structure 1800 including a dense coating layer 1805 was formed, according to the present invention, by joining the fine particles with each other and the fine particle and the base material through the joining region via an active region containing an amorphous phase provided on the fine particle surface and the base material interface, and introducing displacements into the inside of the crystal grains by collision crushing of the fine particles (crystal refining), and applying a high compressive residual stress to the joining between the fine particles to strengthen the joining between the fine particles. As is shown by the circled part in FIG. 30B, the fine particles of the starting material come into contact with the outer wall of pores, with respect to the pores present on the surface of the base material 1804, and the fine particles and the base material 1804 are joined. The coating layer 1805 was formed so as to close the pores starting from the contact and the joint.

Example 13

Figure 31A:
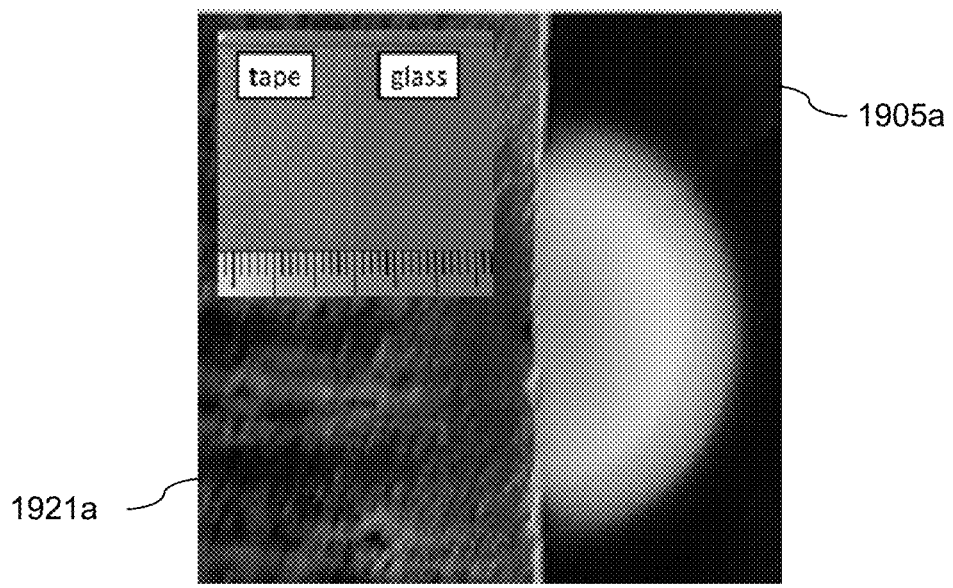
FIG. 31A shows the results of masking using cello tape according to an example of the present invention.
Figure 31B:
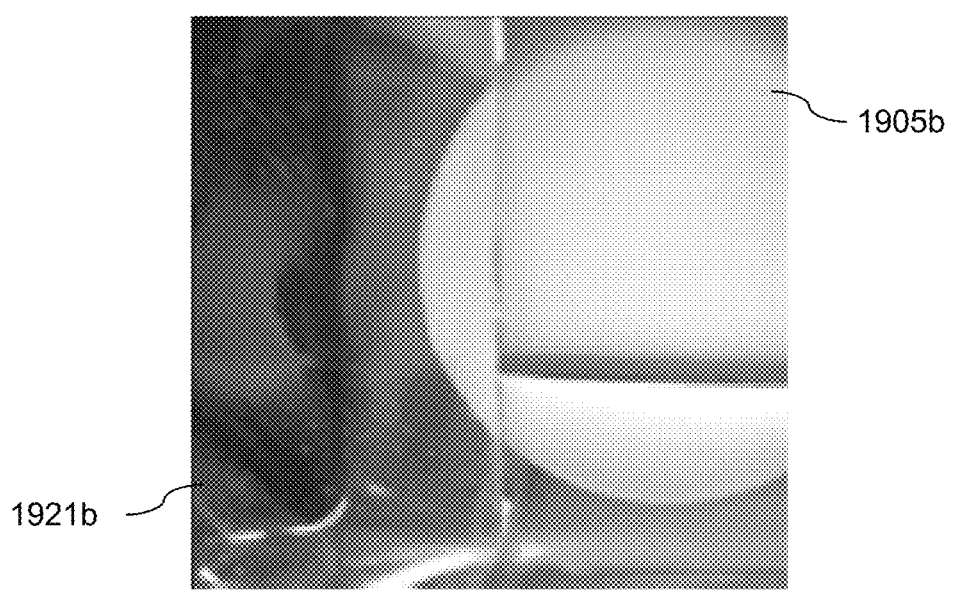
FIG. 31B is an enlarged view of FIG. 31A.
Figure 32A:
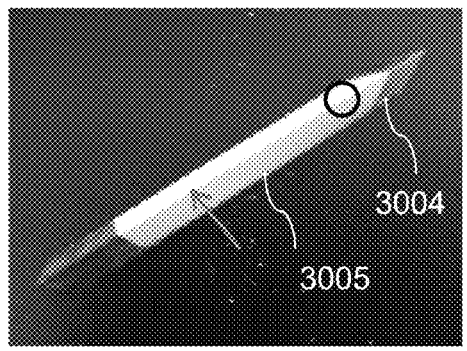
FIG. 32A shows a structure according to an example of the present invention.
Figure 32B:
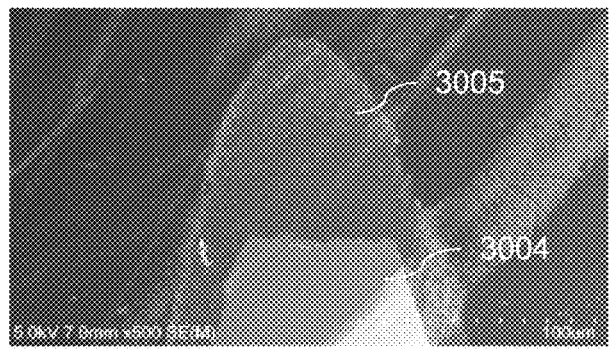
FIG. 32B shows a structure according to an example of the present invention.
Figure 32C:
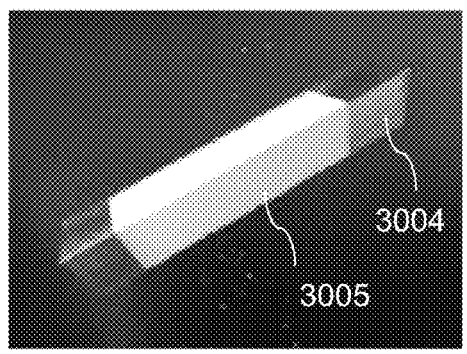
FIG. 32C shows a structure according to an example of the present invention.
Figure 32D:
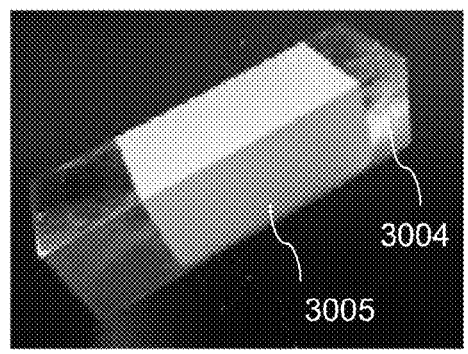
FIG. 32D shows a structure according to an example of the present invention.
Figure 32E:
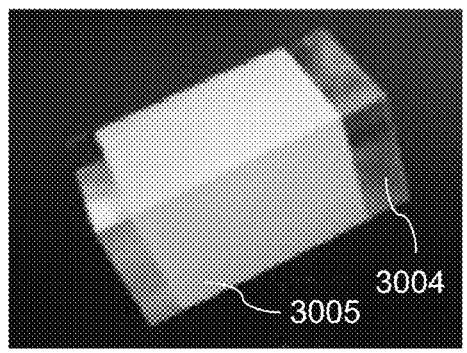
FIG. 32E shows a structure according to an example of the present invention.
Figure 32F:
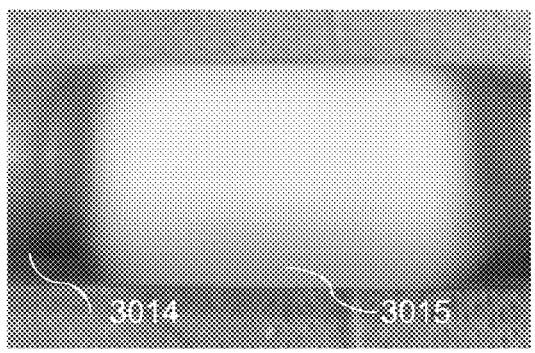
FIG. 32F shows a structure using a base material having a curved shape according to an example of the present invention.
Figure 33:
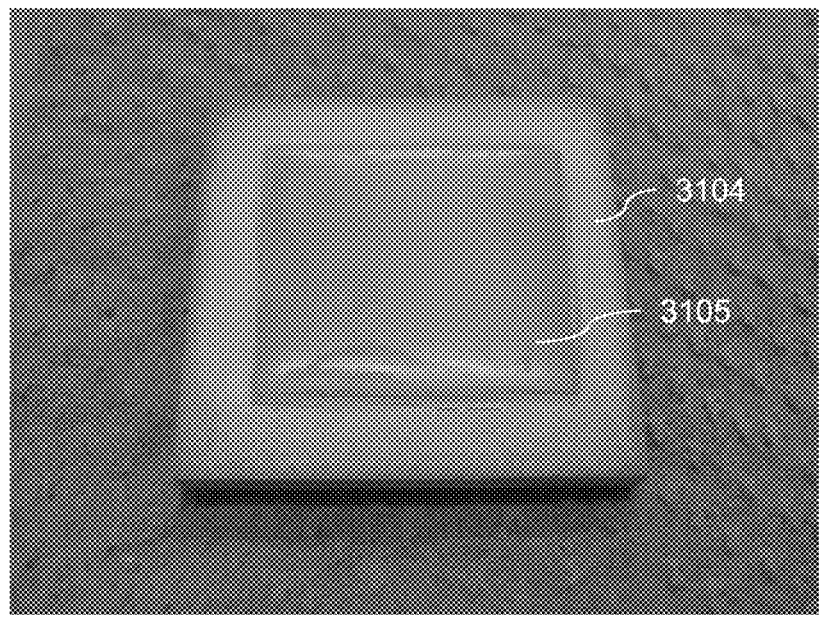
FIG. 33 is a photograph of a structure using a ceramic porous base material according to an example of the present invention.
Figure 34A:
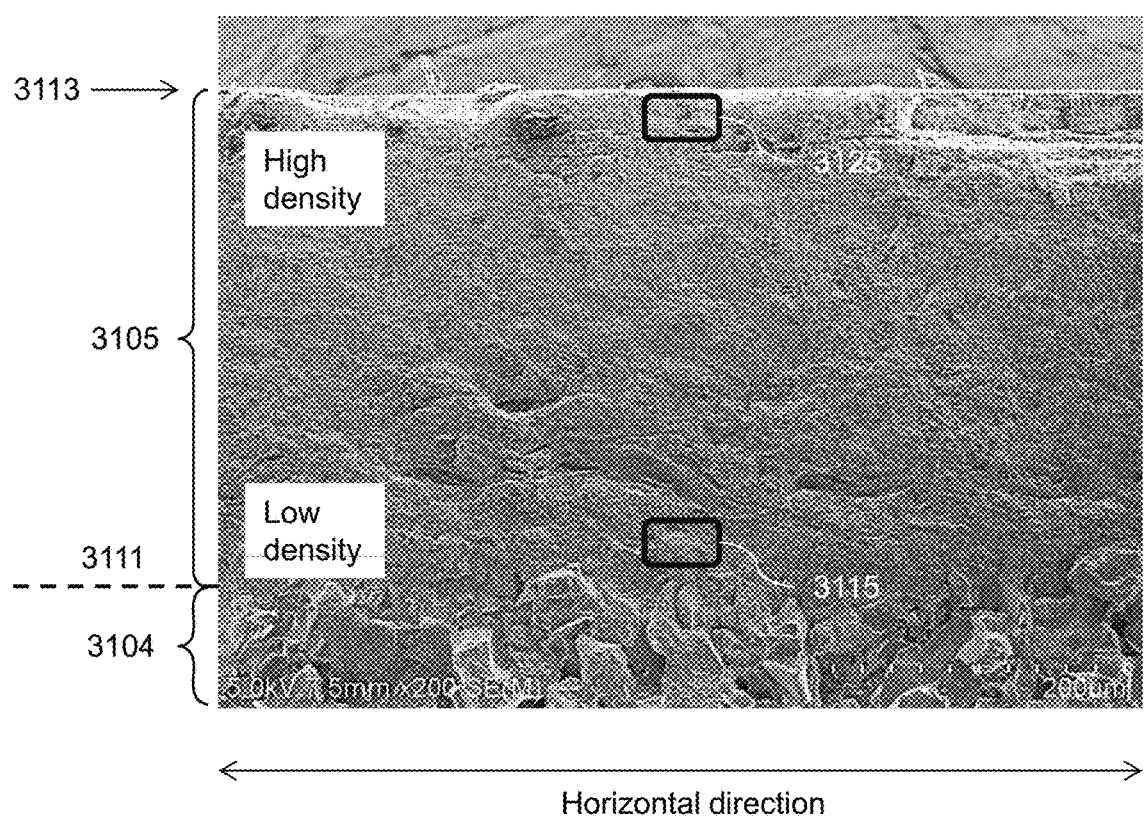
FIG. 34A is an image observed with a FE-SEM of a broken cross section of a structure according to an example of the present invention.
Figure 34B:
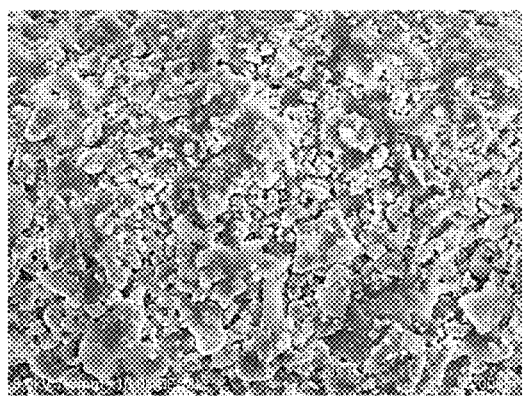
FIG. 34B is an enlarged photographic view of the base material interface vicinity 3114 in FIG. 34A.
Figure 34C:
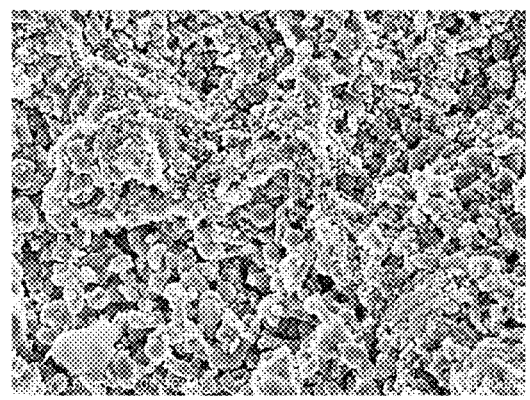
FIG. 34C is an enlarged photographic of the surface vicinity 3113.

An example in which a structure is formed on a surface using $Y_2O_3$ (yttrium oxide) or $\alpha$-$Al_2O_3$ as the fine particles, and masking the base material for forming the structure with cellophane tape (Scotch tape) or a polyimide tape (Kapton (registered trademark) tape) is explained. FIG. 31A shows the result of using cellophane tape for masking, and FIG. 31B shows the result of using polyimide tape for masking. The heat resistance of the polyimide tape is about 260° C. and that of the cellophane tape is about 100° C. FIG. 31A shows a case where plasma is generated using helium gas when forming a structure according to an example of the present invention using $Y_2O_3$ (yttrium oxide) as a fine particle and a slide glass as a base material. Under the condition of forming the covering part 1905a on the slide glass as the base material, no thermal damage was observed on the cellophane tape 1921a. In addition, when forming a structure according to one example of the present invention using $\alpha$-$Al_2O_3$ as fine particles and SUS304 as a base material, when plasma is generated using argon gas, as shown in FIG. 31B, there is no thermal damage to the polyimide tape 1921b under the condition that the coating part 1905b is formed on the base material SUS304. No corrosion, cracking, or destruction was observed in the glass or SUS304 as a base material. When forming a structure according to one example of the present invention, an active region of a fine particle surface layer is generated inside an aerosol supply path or a nozzle which becomes a high energy region by plasma. At this time, since the temperature of the plasma flame reaching the base material was low, the masked tape and base material were not damaged. Further, since the fine particles having the active region fly in the plasma flame and reach the base material, the generated active region can be maintained and a structure can be formed. Therefore, in the present invention, thermal and physical damage to the base material are suppressed. Further, in FIG. 31B, the covering part 1905*b* is also formed on the polyimide tape. When forming the structure according to one example of the present invention, it is also possible to use a heat-sensitive resin or the like as a base material, and it is also possible to directly form a structure without the need for a pre-process or the like on the base materials described above.

Example 14

An example in which a structure according to the present invention is formed using $\alpha$-$Al_2O_3$ as fine particles and a SUS304 base material 3004 having apical angles of 30°, 60°, 90° and 120° as a base material is explained (FIG. 32A to FIG. 32E). An example in which a structure according to an example of the present invention is formed using a SUS304 base material 3014 having a curved shape (radius of curvature R=25 [mm]) is described (FIG. 32F). Argon gas was used as the gaseous species that aerosolizes fine particles, feeds and transports them, generates non-equilibrium plasma that activates the surface of the fine particles at a temperature below the melting point, and accelerates and ejects fine particles that serve as impact forces on the base material. The high frequency input power for generating the non-equilibrium plasma was 0.5 to 2 kW. The supply rate of the argon gas was 5 L/min to 20 L/min.

FIG. 32A to FIG. 32F show a structure according to one example of the present invention formed under the conditions described above. In the conventional method, the covering part is peeled off from the vertex (for example, the part indicated by the arrow in FIG. 32A). However, in the structure of the Example 14, the covering part 3005 was not peeled from the vertex which is the end and good adhesion to the base material 3004 was exhibited. In the conventional method, peeling was performed at a position where uneven stress was applied to the curved surface. However, the structure of Example 14 showed good adhesion to the base material 3014 without peeling of the covering part 3015. FIG. 32B is a cross-sectional image obtained by observing a circled part in FIG. 32A with an FE-SEM. Although the end part of the base material 3004 is actually a flat part of about 80 μm, the coating part 3005 and the base material 3004 were closely bonded to each other, and the dense coating part 3005 having a thickness of about 50 μm was formed on the end face.

Example 15

An example in which a structure according to an example of the present invention is formed using $\alpha$-$Al_2O_3$ as fine particles and a ceramic porous base material having an average pore diameter of 20 μm as a base material is explained. Argon or helium gas was used as the gaseous species that aerosolizes fine particles, feeds and transports them, generates non-equilibrium plasma that activates the surface of the fine particles at a temperature below the melting point, and accelerates and ejects fine particles that serve as impact forces on the base material. The high frequency input power for generating the non-equilibrium plasma was 0.5 to 2 kW. The supply amount of the argon or helium gas was set to 5 L/min to 20 L/min. The hardness of the structure was measured using a hardness tester in which a dynamic hardness tester (SHIMADZU DUH-211) is equipped with a Vickers indenter.

FIG. 33 is a photograph of the structure formed on the base material. FIG. 34A is an image obtained by observing the fracture surface of the structure by FE-SEM. FIG. 34B is an observation image in which the vicinity 3114 of the base material interface in FIG. 34A is enlarged, and FIG. 34C is an observation image in which the vicinity 3113 of the surface layer in FIG. 34A is enlarged. In the case of forming the structure 3100 including the covering part 3105 having the inclined structure as shown in FIG. 34A, the compressive stress in the joining region of the fine particles in the structure 3100 becomes higher toward the surface layer by setting the ratio between the activation energy of the fine particles and the kinetic energy in the present invention such that the ratio of the kinetic energy increases toward the surface of the structure to apply energy to the fine particles so as to increase the ratio As a result, a structure 3100 including a high-density surface layer can be formed from a low-density base material. The deformation of the fine particles in the structure 3100 is smaller in the vicinity of the base material interface 3114 and larger in the vicinity of the surface layer 3113, and the average crystal diameter of the fine particles in the structure 3100 is larger in the vicinity of the base material interface 3114 and smaller in the vicinity of the surface layer 3113. As a result, the structure 3100 of Example 15 has a Vickers hardness of Hv300 near the interface with the base material, and the Vickers hardness increases toward the surface layer to Hv1000.

Figure 35:
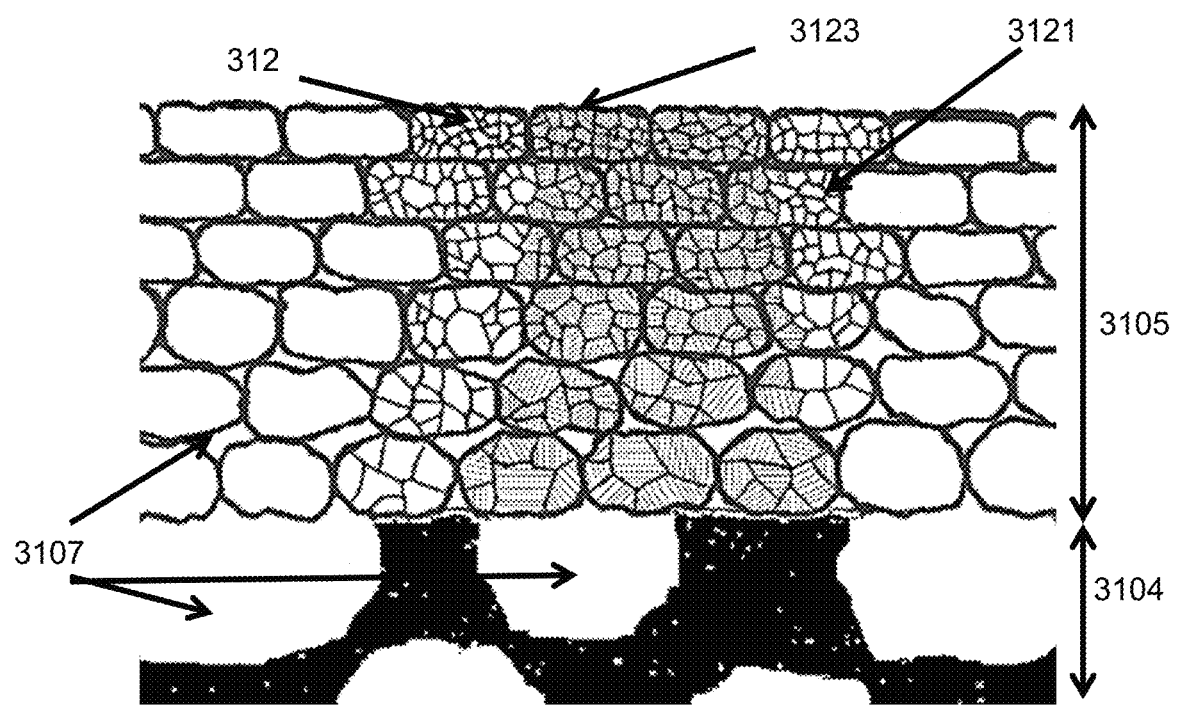
FIG. 35 is a cross sectional model of an inclined structure 3100 according to one example of the present invention.

Here, the inclined structure 3100 refers to a structure in which the distribution of the particle size of the raw material fine particles, the distribution of the average crystallite size in the fine particles, and the distribution of the ratio of the short side/long side of the fine particles due to residual compressive stress from the base material 3104 toward the surface layer of the covering part 3105. As is shown in FIG. 35, the fine particles 3121 of the covering part 3105 are composed of crystallites 3122, and the surface of the fine particles 3121 has an active region 3123 containing an amorphous phase. At this time, the average crystallite size of the fine particles 3121 near the base material 3104 is larger than the average crystallite size of the fine particles 3121 near the surface layer 3113 (on the upper side of the coating part) of the coating part 3105. In addition, the value of the short side/long side representing the deformation of the fine particles 3121 is smaller in the fine particles 3121 in the vicinity 3113 of the surface layer of the covering part 3105 than in the fine particles 3121 in the vicinity of the base material.

From the above examples, it is possible to confirm the novelty and inventive step of the structure.

INDUSTRIAL APPLICABILITY

The brittle material structure according to one example of the present invention can be applied to semiconductor manufacturing equipment-related members, environmental purification members, automobile-related members, fuel cells, gas turbines, and general brittle material coatings.

By using the structure according to one embodiment of the present invention, it is possible to easily obtain a brittle material structure having a target crystal phase. That is, according to one embodiment of the present invention, in order to provide a high-quality and inexpensive structure of a brittle material and a laminate thereof, adopting a structure in which brittle material particles as a main phase are connected by the brittle material region, which are called brittle material crosslinked structure regions, having a high free energy or the same state as a brittle material particles as a main phase, a brittle material structure as an intermediate between a porous structure and a dense structure can be produced.

Since the brittle material structure according to one embodiment of the present invention has small anisotropy, it is possible to form it on a surface having a complicated shape. At this time, since the three-dimensional network structure according to one embodiment of the present invention is in an active state because the Gibbs free energy is high, it is possible to form the brittle material structure with a high adhesion force on the porous structure. In addition, the brittle material structure itself according to one embodiment of the present invention has a function for improving sealing performance so that a three-dimensional network structure of the brittle material can be formed. Further, since the surface has high smoothness, a dense brittle material can be laminated on the surface and the laminate can have a sealing function. For these reasons, the brittle material structure according to one embodiment of the present invention can also be used as a structure that plays the role of an intermediate adhesive layer which bonds a porous structure and a dense structure. In addition, the brittle material structure according to one embodiment of the present invention can have meso-scale gaps which are sandwiched between three-dimensional network structures, so that it is possible to control mechanical properties such as apparent Young's modulus and thermal conductivity and the thermal properties of the structure. This is advantageous in that cracks such as long-period cracks can be prevented, and the sealing function of the structure is prevented from decreasing. In addition, as a secondary effect, the brittle material structure according to one embodiment of the present invention has excellent lamination abilities due to its structure, and therefore, can be formed earlier than a structure manufactured by a conventional brittle material structure manufacturing process. As a result, it can be easily manufactured at low cost.

In addition, according to one embodiment of the present invention, it is possible to form a structure without causing heat and physical damage to the base material which forms the structure. In addition, since the crystal structure of the raw material fine particles can be maintained, it is possible to form a dense structure while maintaining the characteristic function of the fine particles. In addition, by having the structural characteristics of the present invention in the fine particle joining region and the base material joining region between the fine particle and base material in the structure, it is possible to obtain a structure having excellent mechanical/electrical properties and good coverage and adhesion. Furthermore, according to one embodiment of the present invention, a manufacturing method is provided which is capable of forming a structure without causing heat and physical damage to a base material which forms the structure. In addition, according to one embodiment of the present invention, a manufacturing device is provided which can form a structure without causing heat and physical damage to a base material which forms the structure.

What is claimed is:

1. A structure comprising:
   a brittle particle assembly including:
   particles;
   brittle material regions having substantially the same composition ratio of metal elements as the brittle particles, the brittle material regions covering each surface of the brittle particles; and
   a brittle material crosslinked structure region having an amorphous structure having substantially the same composition ratio of metal elements as the brittle particles and a ratio of a metal element to a nonmetal element different from a ratio of the metal element to a nonmetal element in the brittle particles, the brittle material crosslinked structure region arranged on at least a part of the periphery of the brittle material particles, and the brittle material crosslinked structure region linking the brittle material particles arranged adjacently to each other with the brittle material regions arranged adjacently to each other,
   wherein
   the brittle particles include crystallites of 1 nm or more and 300 nm or less;
   the brittle material crosslinked structure region has a shape along each surface of the brittle particles,
   the brittle material crosslinked structure region prevents the mobility of the brittle particles, and
   the structure has a compressive residual stress.

2. The structure according to claim 1, wherein the brittle material crosslinked structure region has a three-dimensional network structure between the brittle particles.

3. The structure according to claim 1, wherein the brittle material crosslinked structure region is arranged with a gap.

4. The structure according to claim 1, wherein the brittle material crosslinked structure region is formed from the same element as the constituent element of the brittle particle.

5. The structure according to claim 1, wherein the size of the brittle particles is less than 5 μm.

6. The structure according to claim 1, wherein the hardness of the structure is 0.1 or more and less than 1 with respect to the hardness of the brittle particles.

7. A laminated structure comprising:
the structure according to claim 1 arranged on a base material.

8. The laminated structure according to claim 7, wherein the brittle particles have a flat shape in a direction perpendicular to the base material.

9. The laminated structure according to claim 7, wherein the base material is a porous body.

10. The laminated structure according to claim 8, wherein the structure has the following relationship 0.02<internal compression stress/Vickers hardness.

11. The laminated structure according to claim 8, wherein a value representing deformation of a short side/long side of the brittle particles becomes a value representing deformation of the brittle particles in an interface vicinity of the base material >a value of the brittle particles in the surface vicinity of the laminated structure.

12. The laminated structure according to claim 11, wherein the laminated structure has a withstand voltage of 20 kV/mm or more.

13. The structure according to claim 1, wherein the brittle particles have a ratio calculated by dividing the short side as the numerator and the long side as the denominator in the range of 0.1 to 0.99.

14. A manufacturing method of a laminated structure comprising:
crushing agglomerated particles in which primary particles in brittle particles of a raw material are agglomerated into primary particles;
activating a surface of the primary particles at a temperature range equal to or lower than a melting point of the primary particles under a reduced pressure atmosphere by using helium gas or argon gas as gaseous species to generate an active region;
ejecting the primary particles arranged with a plurality of the active regions to the base material; and
joining the primary particles arranged with the plurality of active regions via the active region,
wherein a gas flow rate is set to 5 L/min or more and 10 L/min or less when the helium gas is used to eject the primary particles or 5 L/min or more and 20 L/min or less when the argon gas is used to eject the primary particles,
the laminated structure includes a brittle particle assembly including:
the brittle particles;
brittle material regions having substantially the same composition ratio of metal elements as the brittle particles, the brittle material regions covering each surface of the brittle particles; and
a brittle material crosslinked structure region having an amorphous structure having substantially the same composition ratio of metal elements as the brittle particles and a ratio of a metal element to a nonmetal element different from a ratio of the metal element to a nonmetal element in the brittle particles, the brittle material crosslinked structure region arranged on at least a part of the periphery of the brittle material particles, and the brittle material crosslinked structure region linking the brittle material particles arranged adjacently to each other with the brittle material regions arranged adjacently to each other,
the brittle particles include crystallites of 1 nm or more and 300 nm or less;
the brittle material crosslinked structure region has a shape along each surface of the brittle particles,
the brittle material crosslinked structure region prevents the mobility of the brittle particles, and
the structure has a compressive residual stress.

15. The manufacturing method of the laminated structure according to claim 14, wherein an active region is formed on the primary particle surface by a collision crushing effect of the primary particles and a thermal effect of a plasma.

16. The manufacturing method of a laminated structure according to claim 14, wherein the surface of the primary particles is activated by an inductively coupled high-frequency plasma.

17. A manufacturing device of a structure comprising:
an aerosol generator, a crusher, vacuum pump, a plasma generator and a nozzle connected to the plasma generator:
wherein the crusher is arranged at a front stage of the plasma generator, the crusher crushes agglomerated particles sent from the aerosol generator in which primary particles in brittle particles of a raw material are agglomerated, and the crusher sends the primary particles to the plasma generator,
a surface of the primary particles is activated at a temperature range equal to or lower than a melting point of the primary particles under a reduced pressure atmosphere by using helium gas or argon gas as gaseous species to generate an active region,
the primary particles arranged with a plurality of the active regions are ejected to the base material by using the helium gas or the argon gas,
a gas flow rate is set to 5 L/min or more and 10 L/min or less when the helium gas is used to eject the primary particles or 5 L/min or more and 20 L/min or less when the argon gas is used to eject the primary particles, and
the primary particles having a plurality of the active regions are blown from the nozzle,
wherein the structure includes a brittle particle assembly including:
the brittle particles;
brittle material regions having substantially the same composition ratio of metal elements as the brittle particles, the brittle material regions covering each surface of the brittle particles; and
a brittle material crosslinked structure region having an amorphous structure having substantially the same composition ratio of metal elements as the brittle particles and a ratio of a metal element to a nonmetal element different from a ratio of the metal element to a nonmetal element in the brittle particles, the brittle material crosslinked structure region arranged on at least a part of the periphery of the brittle material particles, and the brittle material crosslinked structure region linking the brittle material particles arranged adjacently to each other with the brittle material regions arranged adjacently to each other,
the brittle particles include crystallites of 1 nm or more and 300 nm or less,
the brittle material crosslinked structure region has a shape along each surface of the brittle particles, the brittle material crosslinked structure region prevents the mobility of the brittle particles, and the structure has a compressive residual stress.

18. The manufacturing method of a laminated structure according to claim 17, wherein the plasma generator includes an induction coil, and the surface of the primary particles is activated by an inductively coupled high-frequency plasma.

* * * * *